United States Patent [19]

Brian

[11] 4,005,349
[45] Jan. 25, 1977

[54] CONTROL SYSTEM FOR CONVEYING APPARATUS

[75] Inventor: Michael A. Brian, St. Clair Shores, Mich.

[73] Assignee: Oxy Metal Industries Corporation, Warren, Mich.

[22] Filed: May 25, 1973

[21] Appl. No.: 363,788

Related U.S. Application Data

[62] Division of Ser. No. 122,820, March 10, 1971, Pat. No. 3,764,990.

[52] U.S. Cl. .............................. 318/569; 318/602; 235/151.11; 340/172.5
[51] Int. Cl.$^2$ ........................................ G05B 19/18
[58] Field of Search ................ 340/172.5, 174.1 U, 340/174.1 K; 235/151.1, 151.11; 318/602, 569

[56] References Cited

UNITED STATES PATENTS

| | | | |
|---|---|---|---|
| 3,154,770 | 10/1964 | Schwab et al. | 340/174.1 K |
| 3,166,736 | 1/1965 | Heminger | 340/174.1 K |
| 3,167,646 | 1/1965 | Giroux | 340/174.1 U |
| 3,212,074 | 10/1965 | Daniels et al. | 340/174.1 U |
| 3,375,507 | 3/1968 | Gleim et al. | 340/174.1 U |
| 3,465,298 | 9/1969 | La Duke et al. | 340/172.5 |
| 3,573,730 | 4/1971 | Andrews et al. | 340/172.5 X |
| 3,611,315 | 10/1971 | Murano et al. | 340/172.5 |
| 3,614,741 | 10/1971 | McFarland et al. | 340/172.5 |
| 3,701,106 | 10/1972 | Loshbough | 340/172.5 |

*Primary Examiner*—James R. Scott
*Assistant Examiner*—John J. Feldhaus
*Attorney, Agent, or Firm*—Harness, Dickey & Pierce

[57] ABSTRACT

A control system for a conveying apparatus of a type consisting of one or more independently movable carriages supported on a rail extending along a series of treating stations, and wherein each carriage has one or more independently movable lift mechanisms thereon for depositing and removing racks with workpieces at the stations. In one embodiment, the programming device on the carriage for providing sequentially-phased movement of the carriage and lift mechanisms is advanced by a transferring motor which is actuated in response to the tripping of sensing devices on the carriage indicating the position of the carriage relative to the stations and the up and down position of the lift mechanism.

The programming devices of each carriage, if a plurality of carriages are used, are interlocked to maintain them in sequence and a timer is employed to control portions of the operating cycle duration. In an alternate embodiment, the advancement of the programming device is achieved electronically in response to the carriage travel and the tripping of the lift mechanism sensing devices.

10 Claims, 44 Drawing Figures

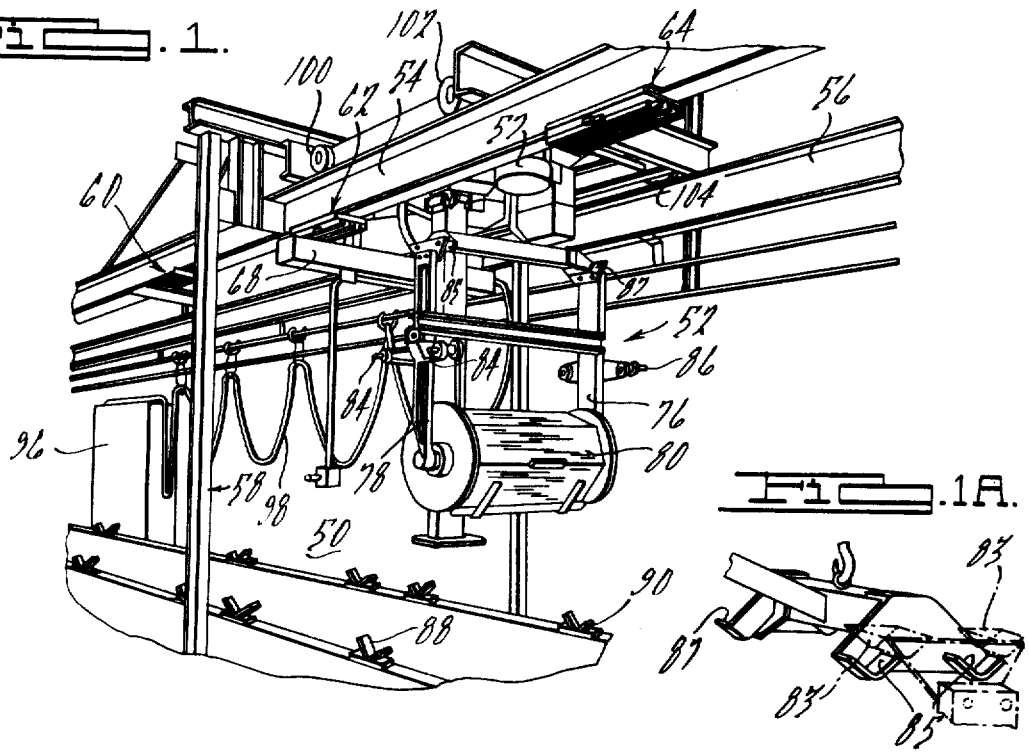
FIG. 1.
FIG. 1A.
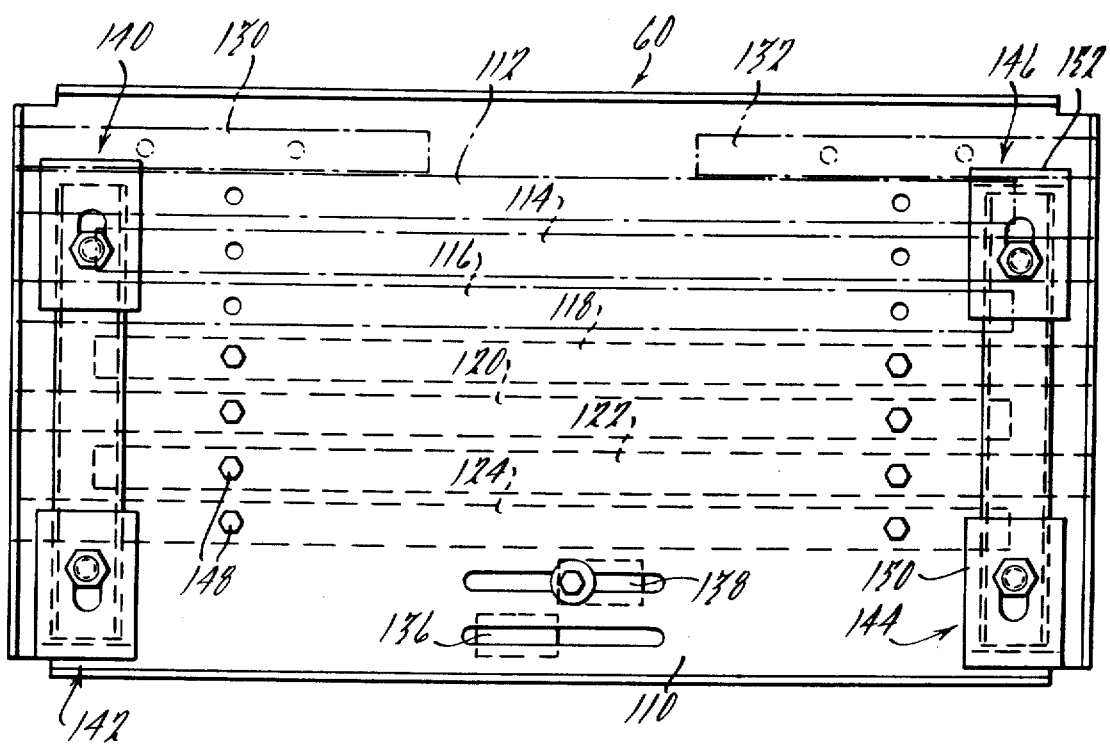
FIG. 2.

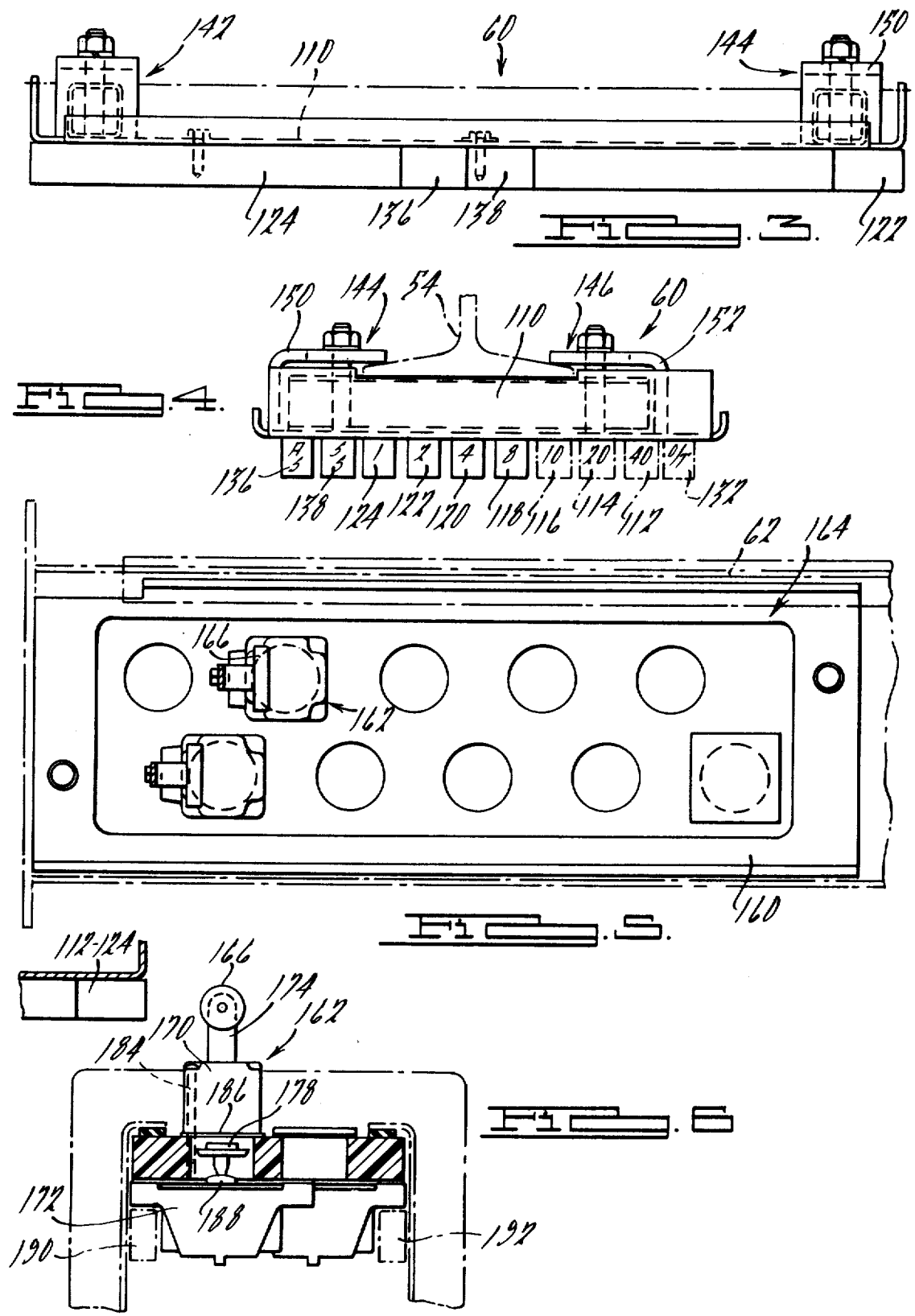

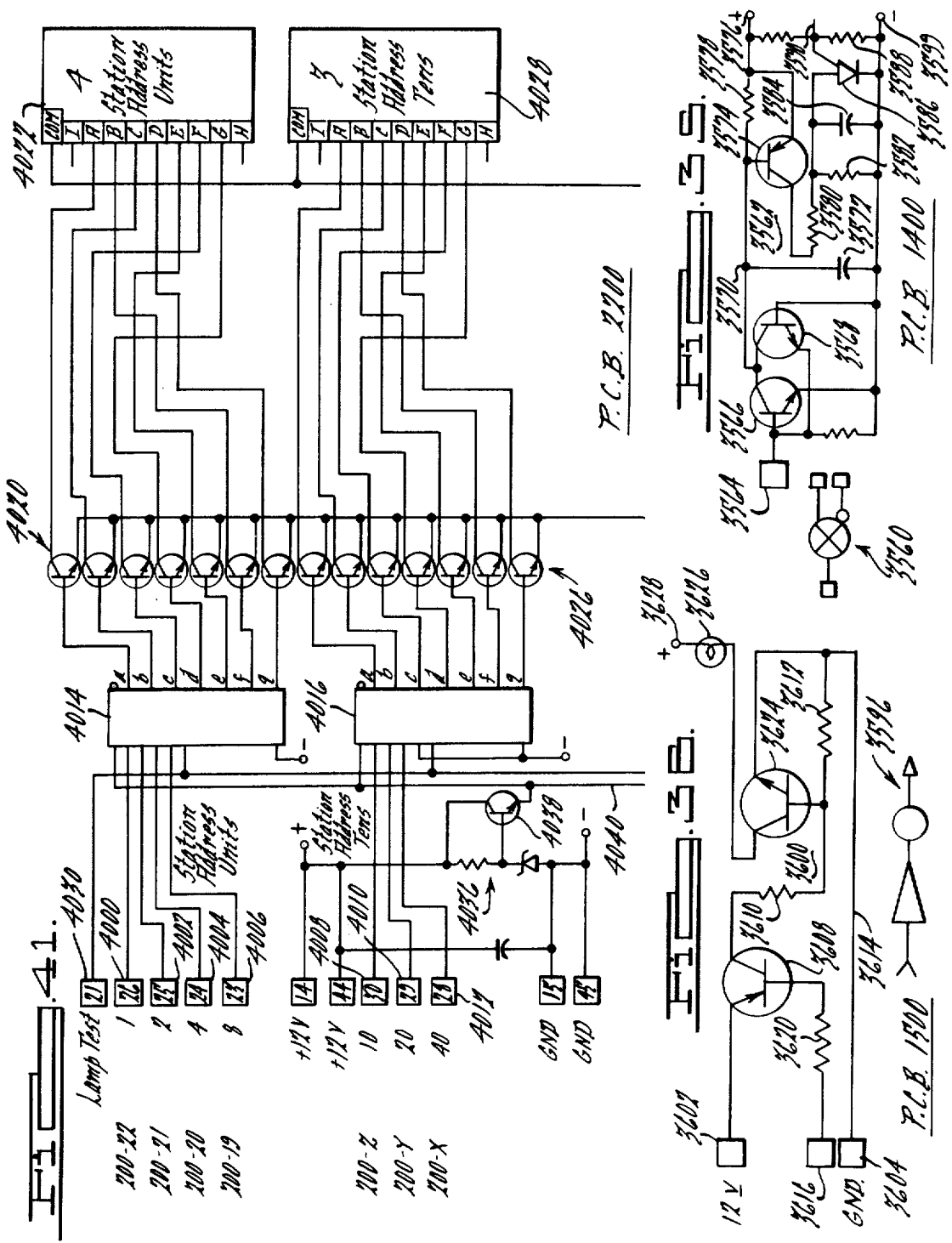

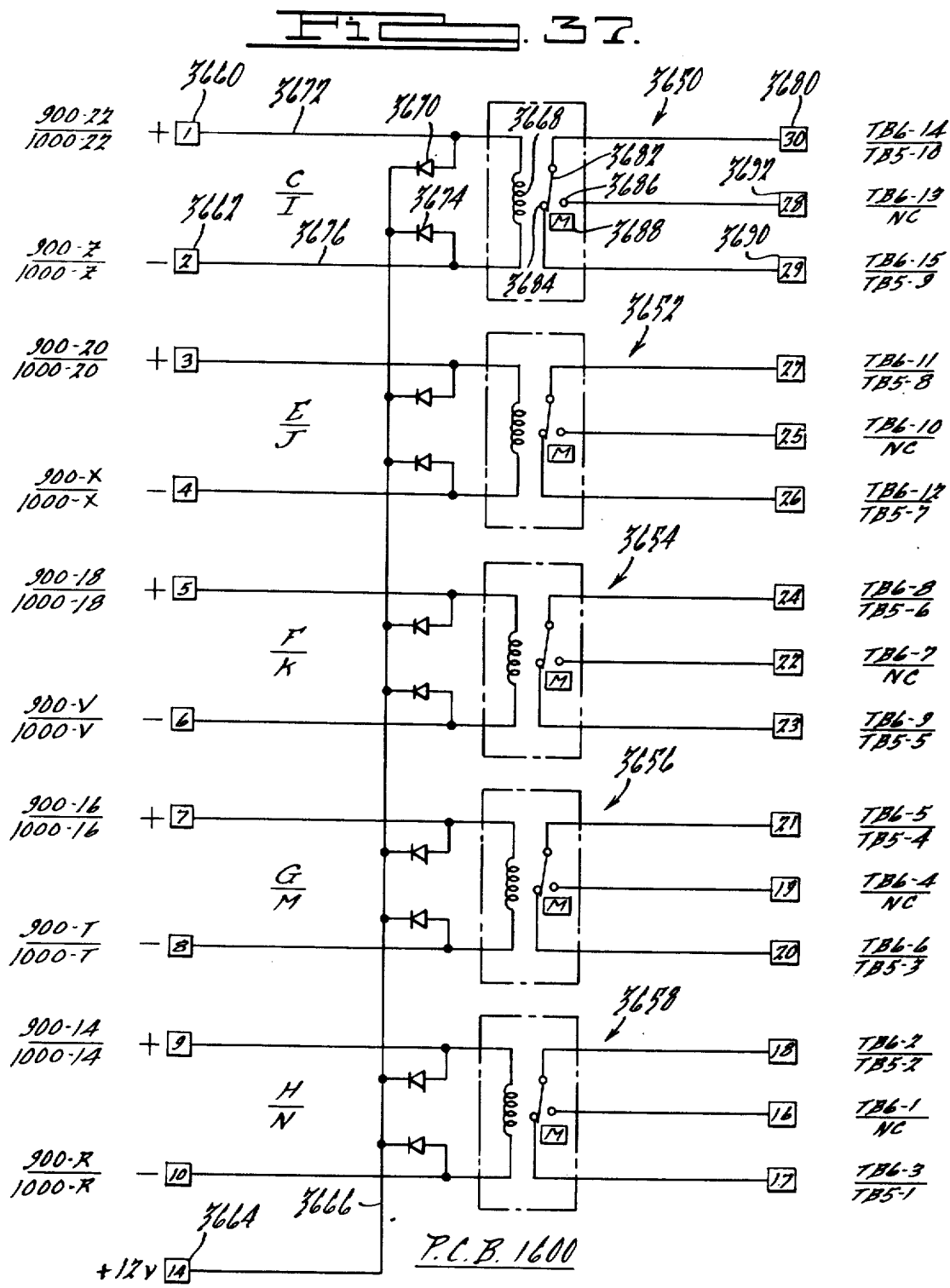

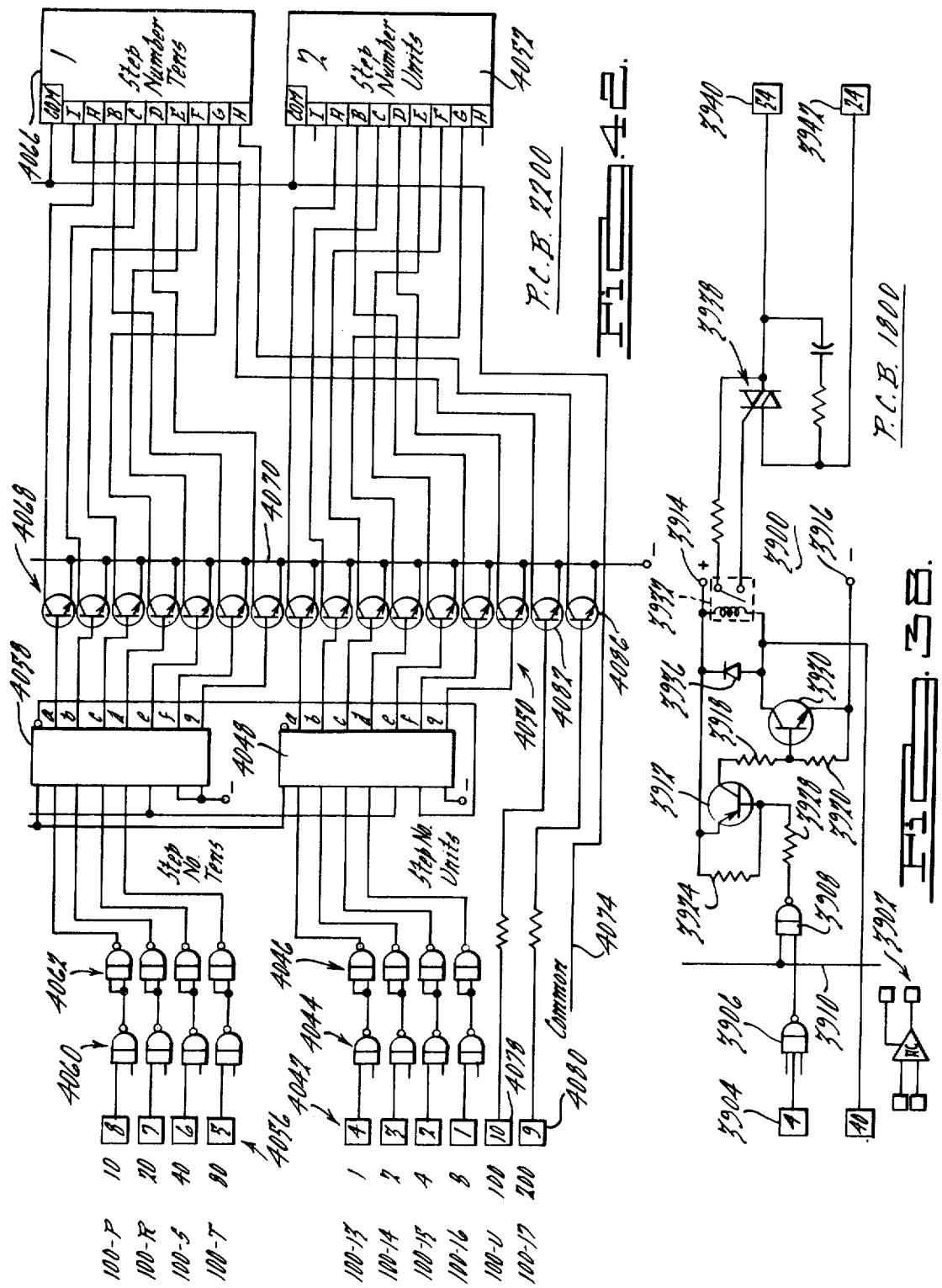

CONTROL SYSTEM FOR CONVEYING APPARATUS

This is a division of application Ser. No. 122,820, filed Mar. 10, 1971 now U.S. Pat. No. 3,764,990.

BACKGROUND AND SUMMARY OF THE DEVELOPMENT

The present invention broadly relates to a work-handling apparatus, and more particularly to an improved control system for a conveying apparatus of the so-called straight-line type employing one or a plurality of carriages which are independently movable with respect to each other along an aligned series of treating stations and which carriages incorporate one or a plurality of lift mechanisms thereon providing therewith an automatic transfer of work-pieces through the treating stations in a preselected ordered sequence.

Work handling apparatuses, of the general type to which the present invention is applicable, are in widespread commercial use for automatically transporting workpieces between successive manufacturing or treating operations. Conveying apparatuses of this type have been found particularly suitable for conveying workpieces automatically through a sequentially phased chemical treating process which frequently includes one or more electro-chemical or electroplating operations. In conveying apparatuses of the preferred type to which the control system comprising the present invention is applicable, one or a plurality of work carriages are mounted on suitable rails or tracks extending along a series of treating stations which are independently driven and independently movable with respect to each other. Each work carriage incorporates one or a plurality of lift mechanisms, thereon including work-engaging means for independently raising and lowering the work-pieces or work racks on which the workpieces are suspended into and out of the treating stations disposed therebelow. The longitudinal travel of each carriage and the elevating and descending movement of each of the lift mechanisms thereon are automatically controlled so as to provide a preselected transfer the workpieces from one station to the next succeeding station in a preselected order sequence.

In conveying apparatuses of the foregoing preferred type, it is frequently desirable to employ a cell-type plating operation along certain portions of the treating stations and a conventional sequential transfer of the work racks through other portions of the treating stations. In machines of considerable length requiring a large number of work carriages each incorporating at least one lift mechanism thereon, the controls for providing an automatic and independent movement of the work carriages and the lift mechanisms thereon becomes relatively complex which is further aggravated by the necessity of providing means to assure coordination of the several work carriages to avoid physical conflict therebetween along those portions of the treating stations where an overlapping movement of adjacent work carriages occurs.

Control systems of the type heretofore known have been found inadequate in providing the requisite flexibility and versatility to permit modifications in the operating sequence of the several machine components as is required from time to time to adapt the work-handing apparatus to an alternative operating cycle. Additionally, control systems of the type heretofore known are further characterized by their relatively cumbersome circuitry requiring a multitude of operative components, substantially increasing the susceptibility of malfunction of the control system as well as increasing the difficulty of servicing the control system and effecting desired modifications in the operating cycle provided thereby as may be required from time to time.

The system of the present invention basically comprises a fully automatic control for a conveying apparatus, for example, an electrochemical plating machine, the entire operation of the plating machine being preprogrammed in a simple, inexpensive form. The recording may take the form of a punch-paper tape, magnetic tape, or the like, which is capable of being read by suitable tape reader, card reader, etc.

This system is provided with suitable sensing and control subsystems which are capable of automatically conveying a piece of apparatus, for example, a plating barrel, through a series of plating steps so that an operator need merely provide the system with a plating barrel including the work pieces stored therein, and a suitable position for removing the work from the plating line. The system will automatically sequence the barrel through the various tanks in the plating line, including timing certain portions of the cycle, and deposit the barrel at the end of the line when the plating process is complete.

The system will be described in accordance with a breakdown of subsystems which were evolved by grouping certain systems on a single circuit board. The system of the present invention will be described in conjunction with a tape reader and a binary coded address system utilized in conjunction with an electrochemical plating apparatus. However, it is to be understood that other systems may incorporate features of the present invention and other types of input storage devices may be utilized. Listed below is the presently assigned letters, their use in the system and the code. The code used is the standard ASCII code.

| SYM | FUNCTION | | 1 | 2 | 3 | 4 | 5 | 6 | 7 |
|---|---|---|---|---|---|---|---|---|---|
|   |   | 0 | O | O | O | O | O | O | X | O |
| : | Read Flag Switches & Reset Block Ctr. | 1 | X | O | O | O |   |   |   |   |
| " |   | 2 | O | X | O | O |   |   |   |   |
|   |   | 3 | X | X | O | O |   |   |   |   |
| $ |   | 4 | O | O | X | O |   |   |   |   |
| % |   | 5 | X | O | X | O |   |   |   |   |
| & | Incoming Interlock Interrogate | 6 | O | X | X | O |   |   |   |   |
| ' |   | 7 | X | X | X | O |   |   |   |   |
| ( | Open Timer Register | 8 | O | O | O | X |   |   |   |   |
| ) | Close Timer Register | 9 | X | O | O | X |   |   |   |   |
| * | 2nd Digit-Multi Stations | 10 | O | X | O | X |   |   |   |   |
| + | Turn on-interlock (outgoing) | 11 | X | X | O | X |   |   |   |   |
| , | Index Block Counter | 12 | O | O | X | X |   |   |   |   |
| − | Turn off-interlock (outgoing) | 13 | X | O | X | X |   |   |   |   |
| . | Reset Block Counter | 14 | O | X | X | X |   |   |   |   |

-continued

| SYM | FUNCTION | | 1 | 2 | 3 | 4 | 5 | 6 | 7 |
|---|---|---|---|---|---|---|---|---|---|
| | | 15 | X | X | X | X | O | X | O |
| 0 | | 0 | O | O | O | O | O | X | X | O |
| 1 | | 1 | X | O | O | O | O | | | |
| 2 | | 2 | O | X | O | O | O | | | |
| 3 | | 3 | X | X | O | O | O | | | |
| 4 | Station Address Numbers | 4 | O | O | X | O | O | | | |
| 5 | (Always 2-"21" or "06" etc. | 5 | X | O | X | O | O | | | |
| 6 | | 6 | O | X | X | O | O | | | |
| 7 | Or timer selector | 7 | X | X | X | O | O | | | |
| 8 | -with "("and")" | 8 | O | O | O | X | O | | | |
| 9 | | 9 | X | O | O | X | O | | | |
| : | | 10 | O | X | O | X | O | | | |
| ; | | 11 | X | X | O | X | O | | | |
| < | Not Used | 12 | O | O | X | X | O | | | |
| = | | 13 | X | O | X | X | O | | | |
| > | | 14 | O | X | X | X | O | | | |
| ? | | 15 | X | X | X | X | X | X | O |
| LF | "Line Feed" | 10 | O | X | O | X | O | O | O |
| 0 | Tape Home | 0 | O | O | O | O | O | O | O | X |
| A | Auxiliary Stop | 1 | X | O | O | O | | | | |
| B | Second Lift System | 2 | O | X | O | O | | | | |
| C | Interlock No. 1 | 3 | X | X | O | O | | | | |
| D | Hoist (S) Down | 4 | O | O | X | O | | | | |
| E | Interlock No. 2 | 5 | X | O | X | O | | | | |
| F | Interlock No. 3 | 6 | O | X | X | O | | | | |
| G | Interlock No. 4 See "+","-","&"&" | 7 | X | X | X | O | | | | |
| H | Interlock No. 5 | 8 | O | O | O | X | | | | |
| I | Interlock No. 6 01,2,3,&4 also | 9 | X | O | O | X | | | | |
| J | Interlock No. 7 incomming | 10 | O | X | O | X | | | | |
| K | Interlock No. 8 | 11 | X | X | O | X | | | | |
| L | Left Transfer | 12 | O | O | X | X | | | | |
| M | Interlock No. 9 | 13 | X | O | X | X | | | | |
| N | Interlock No. 10 | 14 | O | X | X | X | | | | |
| φ | | 15 | X | X | X | X | O | O | X |
| P | | 0 | O | O | O | O | O | X | O | X |
| Q | | 1 | X | O | O | O | | | | |
| R | Right Transfer | 2 | O | X | O | O | | | | |
| S | Slow Speed Only-Lifts or Trans. | 3 | X | X | O | O | | | | |
| T | | 4 | O | O | X | O | | | | |
| U | Hoist (s) Up | 5 | X | O | X | O | | | | |
| V | Intermediate Stop No. 1 top | 6 | O | X | X | O | | | | |
| W | Intermediate Stop No. 2 bottom | 7 | X | X | X | O | | | | |
| X | | 8 | O | O | O | X | | | | |
| Y | | 9 | X | O | O | X | | | | |
| Z | Reset Step-No Counter | 10 | O | X | O | X | | | | |
| [ | Open Alternate Cycle Register | 11 | X | X | O | X | | | | |
| \ | | 12 | O | O | X | X | | | | |
| ] | Close Alternate Cycle Register | 13 | X | O | X | X | | | | |
| ↑ | | 14 | O | X | X | X | | | | |
| ← | | 15 | X | X | X | X | X | O | X |
| CR | "Carriage Retrun" & Stop Tape | 13 | X | O | X | X | O | O | O |

One portion of the system includes a tape reader control circuit which is adapted to control the operation of the tape reader by providing stepping pulses to step the reader through a sequence of codes and also means is provided to initially home the tape at a preselected starting position. This circuit also includes a circuit for reading the various coded holes in the punched tape and transmitting the sensed code in a usable form to the remainder of the system. Also, a circuit is provided to record the number of steps which have occurred since the start or home position of the tape and display the result.

Another portion of the system includes a station address register circuit which is adapted to read a particular station from the tape and store this address in the circuit. Subsequently, when the conveying mechanism is moving down the line, reading each address as it approaches the station, the read address will be compared to a stored address and an output signal will be provided when a coincidence is achieved. Also, a converter circuit is included to convert the binary coded decinal representation of the set address and provide an indication of this set address to the operator. Upon achieving the specified station, an output signal is generated to change the motor speed to low speed and enable a stop switch circuit so that the motor may be stopped exactly at the point on the station wherein the conveying mechanism is directly above the work.

The next circuit included in the system of the present invention is a multi-station register which is utilized in conjunction with a tank having a plurality of stations therein when it is desired to store an address code within the system to signal when a particular station within the multi-station tank is to be utilized. A code has been selected, in this case an asterisk, to indicate to the system that a particular stored number within the system is to be utilized and fed back into the system as the next address to which the conveying apparatus is to proceed. In this way, the length of tape required for a specific program will be substantially reduced. This is because a group of tanks referred to as a multi-cell tank are, for this purpose, considered as one tank. The system is thus capable of providing an address for the conveyor apparatus from within the system rather than reading the address on the storage tape or the like. The system also includes a circuit for indexing the stored address to permit the carrier unit to deliver a plating barrel to a first address in a multi-station tank and subsequently pick up a second plating barrel from another address and deliver a third plating barrel to that same address.

The system further includes a transfer control circuit which responds to left and right commands from the tape and also responds to an auxiliary stop signal and a slow speed only signal. With this circuit, the system is commanded to go either left or right to a particular address which is either generated by the reader tape or is generated within the system as described above.

The system further includes a lift control system which responds to up and down commands from the tape and also responds to two commands for intermediate stopping positions. With this circuit the lifting mechanism can be commanded to go up, down or to either of two intermediate stopping positions. These intermediate stopping positions may be used as necessary to align with a load stand that is not at either the full up or full down position.

As is common in the electroplating arts, certain portions of the electroplating process must be timed in order to achieve the desired results. To this end, suitable timers, certain being fixed and certain being variable, are provided to time these portions of the precess. The system also includes an alternate cycle register which renders the system capable of performing a secondary program in response to external signals and subsequently returning to the main program and completing the steps of the main program.

Accordingly, it is one object of the present invention to provide an improved control system for a conveyor apparatus.

It is another object of the present invention to provide an improved control system which is particularly adaptable for use in conjunction with a plural position electrochemical plating apparatus.

It is another object of the present invention to provide an improved completely automatic system for controlling the operation of a conveying apparatus including longitudinal and vertical travel.

It is still a further object of the present invention to provide an improved preprogrammed control system for a work conveying apparatus which includes an increased simplification of the preprogrammed apparatus.

It is still another object of the present invention to provide an improved control system wherein the system incorporates a system for controlling the longitudinal travel of the work carriage and actuation of the lifting mechanisms thereon to provide an interlocking system to correlate the movements of adjacent carriages.

It is still another object of the present invention to provide an improved control system for conveying apparatus which substantially simplifies the circuitry as well as eliminating a substantial number of subsystems required for effecting a controlled automatic sequentially phased operation of each of a plurality of work carriages.

A further object of the present invention is to provide an improved control system for a conveying apparatus which is more versatile than systems of the type heretofore known enabling modifications to be made in the programmed movement of the work carriages in order to adapt the carriages to alternate processing cycles without encountering difficulty or sustaining excessively long machine down time periods during modification.

It is still a further object of the present invention to provide an improved control system for a work handling apparatus wherein the programming device operates independently of the movement of the work carriage except at preselected points.

It is still another object of the present invention to provide an improved programmed control system for a work carriage, including a longitudinal travel and boisting mechanism, wherein the program storage device is greatly simplified and may be preprogrammed remote from the conveying apparatus, such as a printed tape, magnetic tape or a punched paper tape.

It is still a further object of the present invention to provide an improved preprogrammed control system for a work conveying apparatus wherein the programmed travel of the conveying apparatus may be easily changed by merely replacing one preprogrammed device by a modified preprogrammed device.

It is still a further object of the present invention to provide an improved preprogrammed automatic control system for a work conveying apparatus which is extremely high speed in operation and is substantially completely electronically controlled.

It is still a further object of the present invention to provide an improved automatic control system for a work conveying apparatus which incorporates improved position indicating systems for the position of the longitudinal movement of the conveying apparatus or the hoisting movement of the apparatus.

It is still a further object of the present invention to provide an improved addressing system for a conveying apparatus which is utilized to automatically switch the conveying apparatus from one speed to a second speed in response to a sensed position which approaches the ultimate position.

It is still a further object of the present invention to provide an improved control system for a work conveying apparatus. such as an electrochemical plating apparatus, which utilizes extremely simplified command signals, as for example single letter commands, controlling the operation of the system.

It is still a further object of the present invention to provide an improved control system for conveying apparatus which is capable of insuring that the conveying mechanism for the work is at the proper position, both in the longitudinal and up and down direction, during the operation of the system.

It is still a further object of the present invention to provide an improved control system for an electroplating or other work conveying apparatus which is capable of automatically carrying a work load through a system including providing timing for various portions of the operations being performed on the work.

It is a further object of the present invention to provide an improved control system for a work conveying apparatus which is reader controlled and includes a system for automatically homing the data storage device within the reader at a preselected starting position, certain data being retained within the system during the homing process.

It is a further object of the present invention to provide an improved system for storing and displaying the number of steps which have been fed into the system for control of the conveying apparatus from the reader.

It is another object of the present invention to provide an improved system for use in a work conveying apparatus which incorporates an improved desired address as compared to actual address comparison circuit to establish when the conveying apparatus has achieved the desired position within the system.

It is still a further object of the present invention to provide an improved control system for use in conjunction with a multi-station section for a system performing work on a work piece wherein the system stores within itself the data as to when a particular portion of the multistation area is being utilized or not being utilized.

It is a further object of the present invention to provide an improved control system for a work conveying apparatus incorporating a multi-station position wherein the system is capable of generating addresses for the work conveyor within the system to command the conveyor to retrieve or deposit a piece of work at a particular address within the system.

It is still a further object of the present invention to provide an improved control circuit for a conveying apparatus usable in a multi-station system such as described above wherein the system includes a circuit for indexing the address generated within the system.

Further objects, features and advantages of this invention will become apparent from a consideration of the following description, the appended claims and the accompanying drawings in which:

FIG. 1 is a perspective view of a preferred apparatus which is adapted to be utilized in conjunction with a control system of the present invention and particularly illustrates a conveying mechanism for an electrochemical process plating barrel and various stations which may receive the plating barrel;

FIG. 1A is a detail view of the barrel assembly-work carrier combination;

FIG. 2 is a plan view of a preferred form of encoded addressing system which may be utilized in conjunction with the system of the present invention;

FIG. 3 is a side view of the encoded addressing apparatus of FIG. 2;

FIG. 4 is an end view of the encoded addressing apparatus of FIG. 2;

FIG. 5 is a plan view of the switch assembly incorporating rollers which are adapted to engage the camming surfaces of the encoded address apparatus of FIGS. 2–4;

FIG. 6 is an end view of the switch apparatus of FIG. 5;

FIG. 35 is a schematic diagram illustrating a typical input converter circuit used in conjunction with the system of the present invention;

FIG. 36 is a schematic diagram illustrating the details of a preferred form of light driver circuit;

FIG. 37 is a schematic diagram illustrating the details of a retentive inner interlock relay circuit;

FIG. 38 is a schematic diagram illustrating the details of a preferred form of alternating current output inner interface circuit including an inhibit circuit;

FIG. 41 is a schematic diagram illustrating the circuit details of the station address units and tens output circuit, the readout drivers and the wiring harness;

FIG. 42 is a schematic diagram of the circuit details of the step number units and tens output circuit including the driver circuitry therefore;

Figure 7:
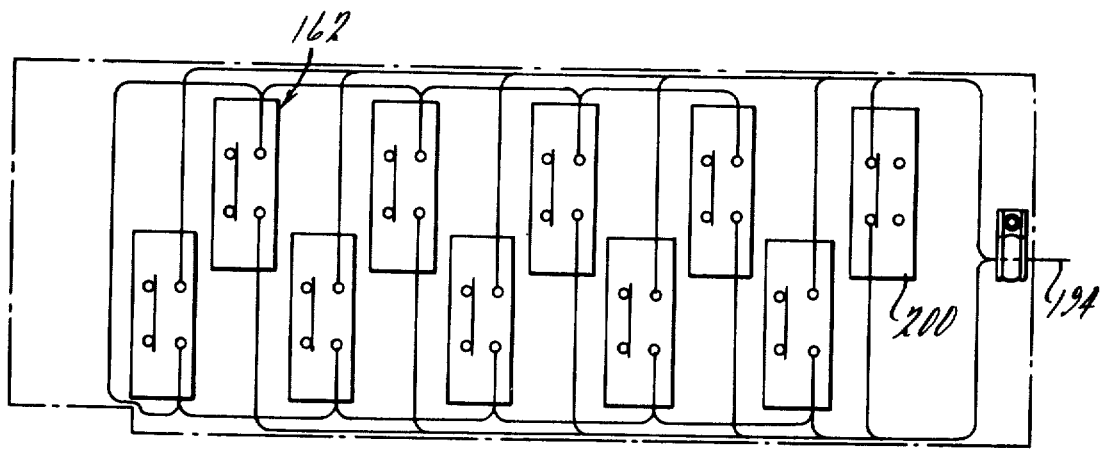
FIG. 7 is a schematic view illustrating the input connections and cabling for the various switches of FIG. 6.

The objects of the present invention are accomplished, in the preferred embodiment, by providing one or more work carriages with a control circuit incorporating individual programming means associated therewith so programmed as to provide a preselected operating sequence of the reversible drive means and lift means on the carriage, thereby effecting automatic and independent movement of each of the plurality of carriages, if a plurality are provided, or a single carriage along a series of treating stations as well as independent raising and lowering of the lift means in order that workpieces can be selectively deposited and removed from the series of treating stations.

It is to be further understood that a plurality of work carriages may be provided which overlap in the area served by the work carriages thereby permitting a workpiece to be sequenced along a preselected program in a first series of, for example, plating tanks and subsequently picked up by the second work carrier from the first sequence of plating tanks to be deposited in one or more of a second series of plating tanks. The addressing of the work carriage is accomplished by means of a plurality of sensing means attached to the carriage which are actuated by cooperating coded means disposed at spaced intervals, particularly at the specified stations or portion of a station in the case of a multistation tank, along the path of travel of the carriage.

Referring now to the mechanical details of the preferred embodiment of the present invention, namely an electrochemical plating apparatus, reference is made to FIGS. 1-8 of the accompanying drawings. Referring particularly to FIG. 1, there is illustrated an electrochemical plating apparatus 50 such as may be utilized in conjunction with the control system of the present invention. The apparatus 50 includes a single hoist carriage 52 which is movable along a pair of rails 54, 56, the rails 54, 56 extending longitudinally and being supported by a series of longitudinally spaced inverted U-shaped frames, a single frame 58 being illustrated. The carriage 52 is typically moved along the frame 54 by means of a reversible motor 57 as is common in this art.

The rails 54, 56 extend continuously along a plurality of series aligned work stations, to be explained hereinafter, the work stations being indicated by a series of coded address modules 60, 62, 64. The particular addresses of each work station are sensed by means of a plurality of micro switches positioned in a channel rail 68, the channel rail 68 being adapted to be movable with the work carriage 52. The address stations are illustrated in detail in FIGS. 2-4 and the switch arrangements are illustrated in detail in FIGS. 5-7. These figures will be more fully explained hereinafter.

The work assembly 52 also includes a pair of work supporting arms 76, 78 which are adapted to engage, in the illustrated example, a plating barrel 80 at either end thereof. When the plating barrel is being traversed, two pairs of projections, projections 83 being shown in phantom in FIG. 1A, engage corresponding V-shaped grooves 85, 87 on the motor driven carriage and when the assembly 52 is lowered into position two pairs of projections 84, 86 mounted on channels 76, 78 respectively are adapted to be received into two pairs of work supporting V-shaped channels 88, 90 as is typical in the art. The movement of the horizontal travel of the carrier 52 and the vertical raising and lowering of the barrel 80 is controlled from a control panel 96, the signals being fed to the various horizontal travel and hoisting motors by means of an umbilical cord 98. Also, the umbilical cord 98 carries the various addressing and vertical position signals from the work carrier 52 to the control panel 96 to indicate the various positions of the work carrier.

The entire carriage 52 is supported on the horizontal rails 54, 56 by means of a plurality of wheels 100, 102, 104 and a fourth wheel (not shown) at least one pair of the wheels being driven by the horizontal drive motor.

The raising and lowering of the rack or barrel apparatus is accomplished by pulley and cable assembly which is driven by the reversible two speed motor (not shown) controlling the movement of the assembly along a vertical guide channel beam 105. The system also includes a plurality of position indicating switch assemblies, one of which is to be described in conjunction with the description of FIG. 8. The system, as will be seen from a description of the control circuitry, includes an intermediate stop position or a plurality of intermediate stop positions as may be desired for the particular use to which this system is being applied. For another typical system or apparatus to which the features of the present invention may be applied, reference is made to the patent issued to Davis et al. U.S. Pat. No. 3,338,437 issued Aug. 29, 1967, the description of which is incorporated herein by reference.

The reversible drive motors for affecting longitudinal and vertical travel of the carriage and work carrying apparatus preferably are of the two speed type, a high and slow speed, and are energized selectively as to speed, thus permitting a slowdown in the speed of travel of the carriage as it approaches a station at which the carriage is to stop or to the raised or lower position at which the work is to stop. In this way, an abrupt deceleration of the carriage and/or work is avoided and a corresponding avoidance of any swinging movement imparted to the work rack or an up and down jolting of the work. In processes where the inertia of the workpiece is low or the speed of travel of the carriages is not great or not critical, a single speed reversible drive mechanism may be satisfactorily employed.

The energization of the reversible drive motors and the movement of the shuttle carriage in the proper direction along the supporting rails is achieved in accordance with the programmed sequence of the control circuit. The selective deenergization of the drive motors and subsequent achievement of the slow speed, affecting a stoppage of the carriage such that one of the lift mechanisms thereof is in vertical alignment with the work rack supports indicated at 88 and 90 is achieved by suitable sensing means described as being positioned within the channel rail 68 and cooperating coded means indicated at 60, 62, 64 to affect a signaling of the control system of the arrival of the carriage at the appropriate station.

In accordance with a typical embodiment of sensing means for effecting a control slowdown stoppage of the carriage, reference is made to FIGS. 2–7. Referring particularly to FIGS. 2–4, there is illustrated the details of a typical coded station address device, as described above in conjunction with the reference numerals 60, 62, 64, which includes a base plate 110 suitably mounted on the underside of the longitudinal rail 54. The base plate 110 supports seven coded binary position elements 112-(BCD-1), 114-(BCD-2), 116-(BCD-4), 118-(BCD-8), 120-(BCD-10), 122-(BCD-20) and 124-(BCD-40) which are aligned in the longitudinal direction along the path of travel of the work carriage 52. The coded elements 112 to 124 are illustrated in dotted lines due to the fact that the view is taken from the top, the top being the side of the support member 110 attached to the rail 54. Coding is achieved in BCD fashion, any combination from 1 through 79 may be used.

As is seen from the following description of the coded address circuit, any combination of strips 112 to 124 may be utilized in connection with designating an address for a particular station. For example, strip 112(BCD-40), 118(BCD-8) and 124(BCD-1) may be provided for address 49 while the remaining strips are left vacant. It is to be noted that when the strips are approached, it is possible for certain of the strips to engage the corresponding strip sensing means on the carriage slightly before the entire group of strips for a particular address are engaged. This slight misalignment is compensated for by an ambiguity timer circuit to be described with FIG. 14. When the coincidence match circuit in conjunction with the sensing means detects the desired station, the indexing motor is caused to change from high to low speed. At this time the stop circuit for 138 or 136 is activated. The carrier then progresses at slow speed to a point where the carriage mechanism 52 is directly over the particular station specified, at which time stop block 138 is engaged to cause the mechanism to stop directly over the specified station. The same block 138 is used for stopping from the right. Stop block 136 is the auxiliary stop block and may be accessed by a tape code. When suitably addressed the stopping characteristics of 138 is nullified and replaced by 136. The block assembly 60 is mounted to the I-beam 54 by means of suitable mounting assemblies 140, 142, 144 and 146 and the strips 112 to 124 and the auxiliary strips 130, 132, 136 and 138 are mounted by suitable bolts 148 fastened through the base member 110 and into members 150, 152 which, in turn, squeezingly engage, in conjunction with base 110, the I-beam 54. This arrangement for attaching the address strips 60 permits the sliding movement of the address strips 60 along the I-beam 54 to exactly position the address strip over the selected station.

However, as will be seen from a description of FIGS. 5, 6 and 7, in order to conserve space and facilitate the mounting of the switches, the switch sensing elements are offset in a manner similar to the configuration of the strips 112, 122. In the particular embodiment illustrated, it is to be noted that the block, as it is approached from the left, is engaged by the switch sensors in the same order as occurs when the address assembly 60 is approached from the right. For example, the strip 112 extends further to the left than the strip 122 and thus the switch corresponding to strip 112 would be offset more to the left than the switch corresponding to the strip 122. As the block approached from the right, the switch corresponding to the strip 122 is more to the right than the switch corresponding to the strip 112. Thus, the switches will engage the ends of the strips 112, 122 substantially simultaneously whether the strips 112, 122 are approached from the right or the left.

Referring now to FIGS. 5–7, there are illustrated the mechanical details of the switch assembly 164 associated with the work carriage for engagement with a coded address assembly such as that illustrated in FIG. 4. Particularly, two switches have been illustrated in their mounted position on a base member 160, the base member 160 being mounted to the channel beam 68 described in conjunction with FIG. 1. However, it is to be noted that the switch assembly 164 includes a possible ten switches which are capable of engaging strips mounted in any of the ten positions described in conjunction with FIG. 2, the ten positions including one position for strips 130, 132, seven positions for strips 112–124 and two positions for strips 136 and 138.

The switches are of the typical type used in conjunction with sensing the presence of a particular fixed element and includes a roller member 166 which is adapted to engage, be displaced by and roll along the associated strip in the assembly 160. The switch assembly 164 is formed in two major portions, the head or actuator portion 170 and the switch contact portion 172. The head 170 includes the bidirectional roller 166 which is mounted to the outer casing of the head assembly 170 by means of an arcuately movable shaft 174. The contact section 172 includes a pair of normally open and normally closed contacts 178, 180, the movement of the arm 174 in either the left or right direction as viewed from FIG. 6 causing the contacts to be switched to the opposite state. The head section 170 is mounted to the contact section 172 by means of a plurality of bolts 184 and a gasket 186 is provided to insure that moisture and dirt do not enter the switch assembly. The connections for the various switches are led along either side of the lower portion thereof and are illustrated in schematic form as a pair of square cables 190, 192.

The bottom view of FIG. 7 illustrates the various wiring connections from the switches to a common output cable at 194, the cable 194 being made up of connections from the normally open contacts of each of the first nine switches, taken from the left, and a set of normally closed contacts from the tenth switch, this latter switch being given reference numeral 200. The switch 200 is utilized as the switch which engages the strips 130, 132 to provide overtravel stopping. Strip 130 is only installed on the left hand end plate and strip 132 installed on the right hand end plate. Strips 130 and 132 are not installed on the other stopping position plates.

Figure 8:
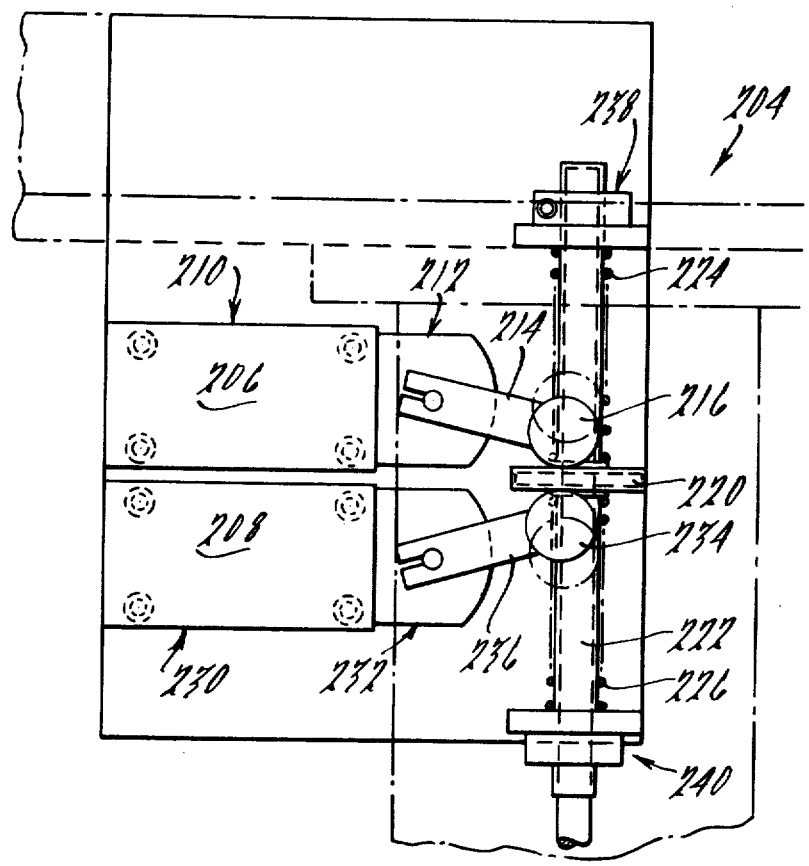
FIG. 8 is a side view of a preferred form of a vertical position sensing apparatus which senses when the work hoist is in the up or down position as used on a one speed lift.

Referring now to FIG. 8, there is illustrated a verticalposition sensing switch assembly 204 which is utilized to provide an indication of whether the carrier assembly is in the fully-up or fully-down position on single speed lifts only. Two speed lifts also have a slowdown signal switch for up and down. Particularly, the assembly 204 includes a pair of microswitches 206, 208, switch 206 being utilized to indicate when the conveying assembly is in the fully-up position and switch 208 being utilized to indicate when the assembly is in the down position.

The switch 206 includes a switch contact assembly 210, the details of which are not important to this disclosure, and a head assembly 212. The head assembly is provided with an arm 214 for mounting a roller 216, the roller 216 being adapted to engage a slidable collar 220. The slidable collar 220 is mounted on a shaft member 222 and is spring loaded to a central position by means of a pair of spring members 224, 226. Relative movement of the shaft 222 and the switch assembly 206 will cause the collar 220 to move either upwardly or downwardly along shaft 222 and against the respective springs 224, 226. When the bias of the switch arm 214 has been overcome due to sufficient force being exerted by the spring 226 and collar 220, the switch will be actuated to provide an indication.

The switch 208 is similar in construction in that it includes a switch contact assembly 230, and a head assembly 232. The head assembly 232 also includes the roller 234 which is mounted on a shaft 236, as was described in conjunction with switch 206. It is to be noted that each of the switches 206, 208 are utilized to indicate one direction of movement only. The spring members 224, 226 and the centered collar 220 are held in place by means of a pair of lock nut assemblies 238, 240.

Figure 9:
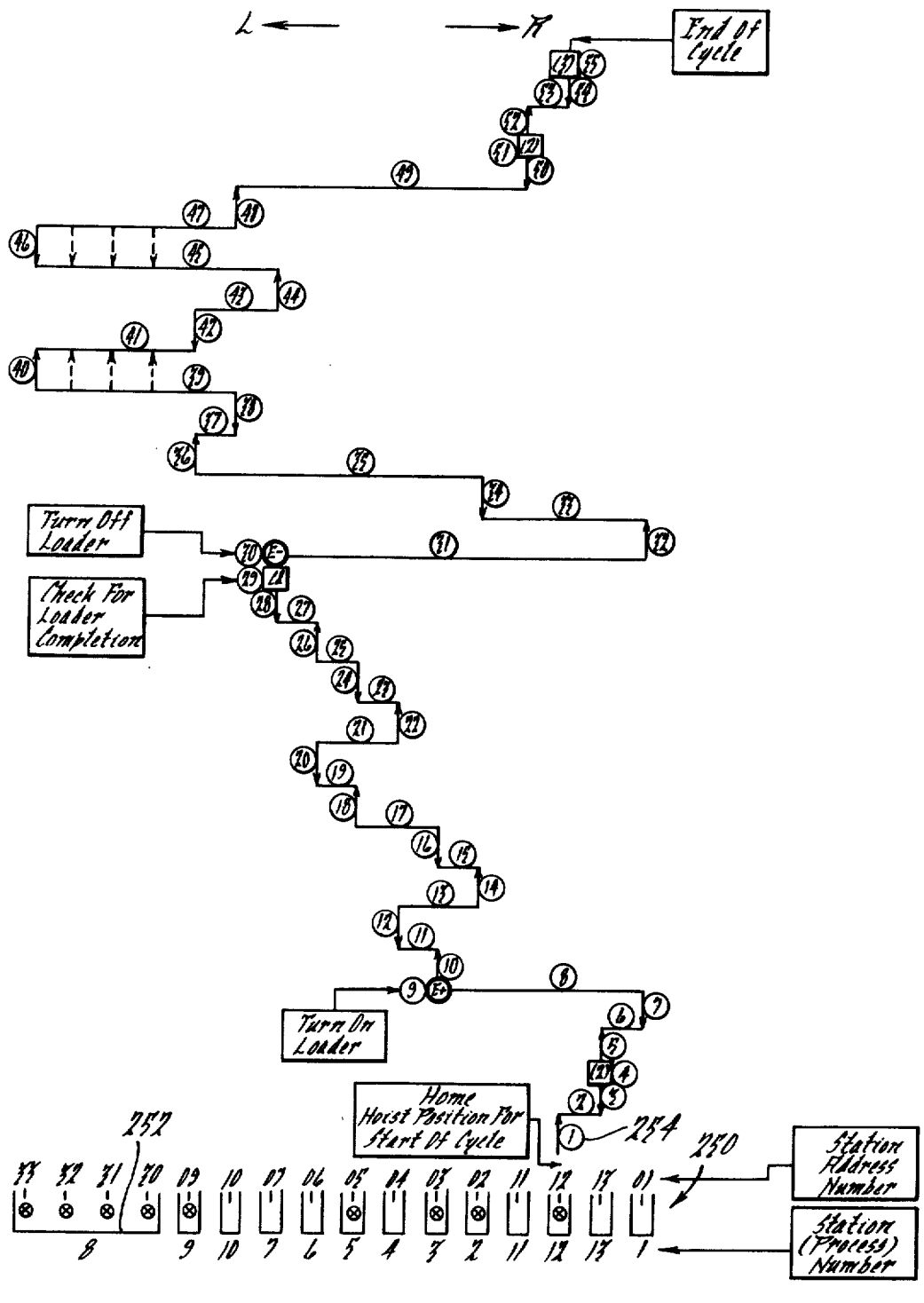
FIG. 9 is a flow chart illustrating a typical program of movement of a work carrier as particularly applied to an electrochemical plating assembly embodying the principles of the present invention.

Referring now to FIG. 9, there is illustrated a typical program for the orderly sequencing of a work carrier, in this case a plating barrel, through an electrochemical plating sequence. Typically, the electrochemical plating apparatus includes a plurality of tank units 250, which include a plurality of individual tanks and, in this case, a single multi-station tank 252. The individual tanks are numbered at the bottom of the Figure with designated station numbers and start at the left from number nine and proceed through to the right to end with number one, these tank numbers being arbitrarily assigned. The multistation tank is designated number eight, all of the numbers appearing below the respective tanks 250. Additionally, each tank 250 is provided with a station address number which is the binary address for the particular tank and generally corresponds to the tank number. However, in the case of the multistation tank number eight, the binary addresses are assigned from 30 to 33. Again, these numbers are arbitrarily selected, from group 30 through 39.

For purposes of the following description, the particular tanks will be referred to by the station address number (the binary coded address). As is stated above, the tape is initially homed, in the illustrated example a paper tape, and the hoist position is assumed down, and the carriage positioned directly over tank 12. As stated above, alphanumeric characters have been selected which are coded to commands capable of being sensed by the reader unit and decoded by the logic provided in the system to command the machine to perform selected functions.

Certain single letter codes have been chosen to represent the programmed functions. For example the letter Z has been selected to reset certain counters within the system and the letter @ has been designated as the character which is recognized by the system to sense that the tape being read is in the home or starting position. Note that as the tape is read on its way to home position, it is setting and resetting various memory elements in the system. In this manner the last lift command and the last transfer and address command remain in the registers for checkout before starting.

Thus, the operator causes the home button to be actuated, which in turn causes the tape to index until such time as an @ is sensed. Subsequent to this, the letter Z is entered into the tape to cause the step number counters to be reset. Once the tape is homed, the programmed sequence illustrated in FIG. 9 may be commenced. It is necessary to actuate the automatic and run pushbuttons. This signals the control system that the automatic operation of the system may commence. The next command provided is the letter U which commands the work carrier to rise, this being the first instruction noted in the sequence of events indicated by the numeral 1. Thus, the first command would take the form Z@U or, in the alternative, @ZU it being immaterial whether the @ or the Z occurs first.

The second command, is indicated by the numeral 2, would take the form of R13 which commands the carrier to go right to station number thirteen, that is, having the binary address of thirteen. 3 would be a D or down to command the carrier to lower to the bottommost position. The next command, 4, is indicated as a (2) which has been selected as the signal to actuate the number two timer which in the present system, is an adjustable timer which may be varied from zero to ninety-nine seconds. Steps 5, 6 and 7 would take the form of a U, R01 and D to command the carrier to lift, go right to station number one and lower the work into tank number one.

Commands 8, 9 and 10 instruct the carrier, after the work has been placed in tank number one, to go left to station number three, close the interlock of relay E and raise to the up position. The command to go left to station number three would be designated L03 and the interlock closure command would be designated E+.

Thus far, the following commands have been used: Z to reset certain counters, @ to stop the tape at its home position, a U to command the carrier to raise, an R to command the carrier to go right followed by a two-digit number to indicate the address, a D to command the carrier to lower, a set of parentheses with a number therein to designate a specific timer, an L to command the carrier to go left to a certain designated address following the L and an E with a plus sign following the E which commands the system to close a certain interlock relay. The system also includes further commands such as the letter C followed by an &, which designates an incoming interlock signal, an E with a minus sign thereafter which commands the system to turn off the relay E interlock and a system for deriving a particular address from the logic circuit, this latter command being indicated by either an L or an R followed by a tens digit, the particular example to be illustrated being three, followed by an asterisk. The asterisk indicated that a particular digit is to be extracted from a circuit to be described in conjunction with FIGS. 15, 16 and 17.

Figure 15:
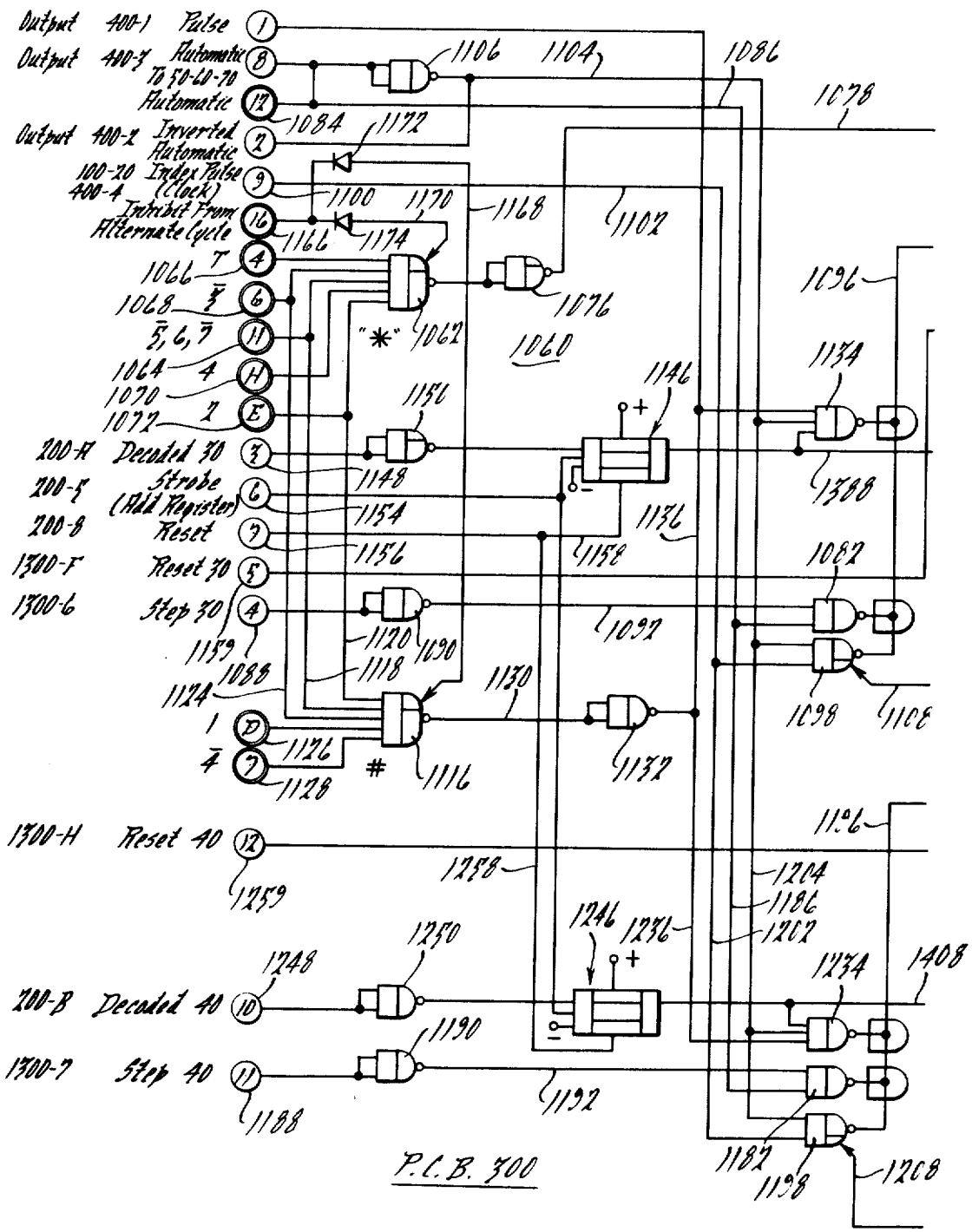
FIG. 15 is a portion of a multi-station register schematic diagram and particularly illustrating the input section thereof.
Figure 16:
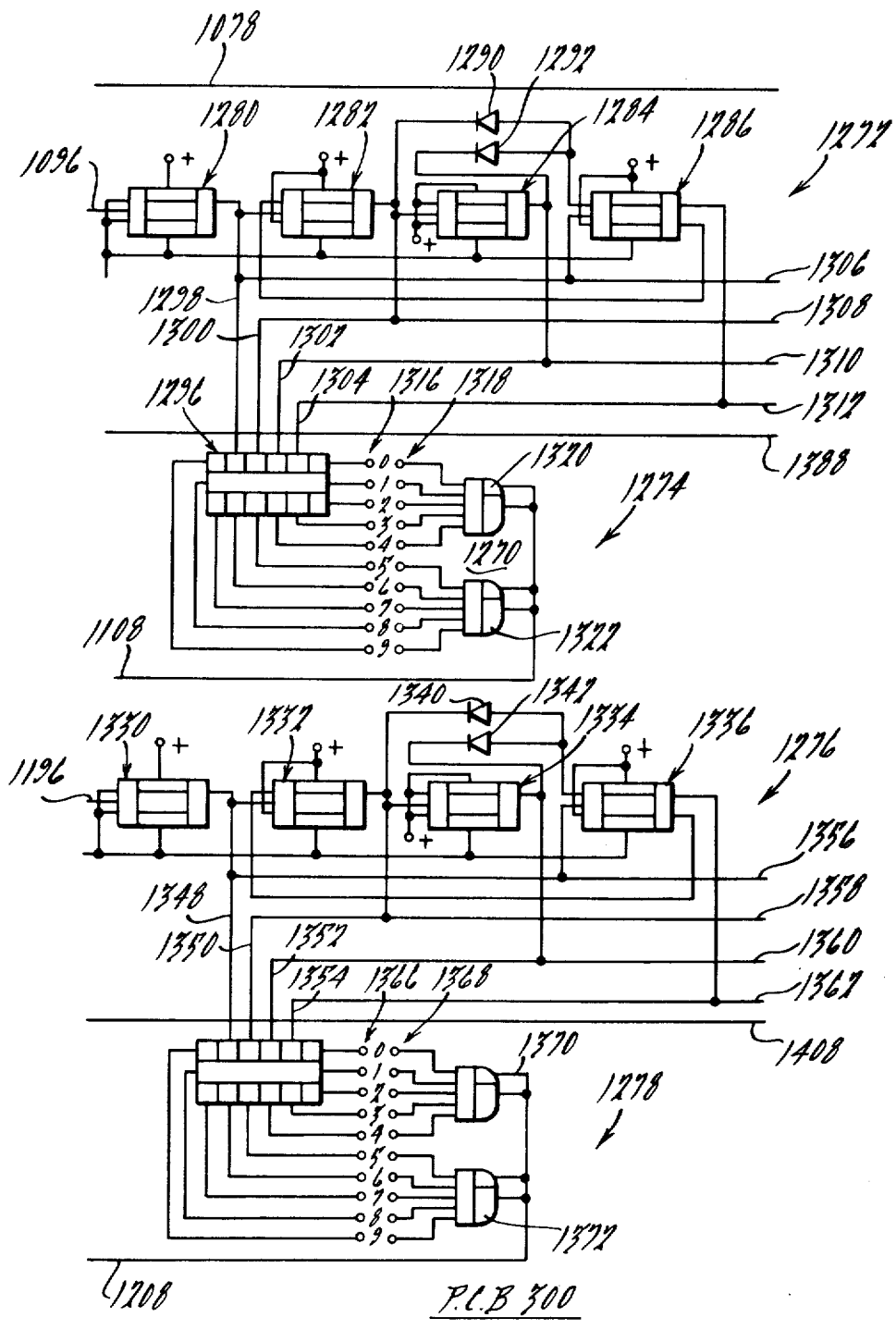
FIG. 16 is another portion of the multi-station register schematic diagram and particularly illustrating the binary coded decimal counter portion thereof.
Figure 17:
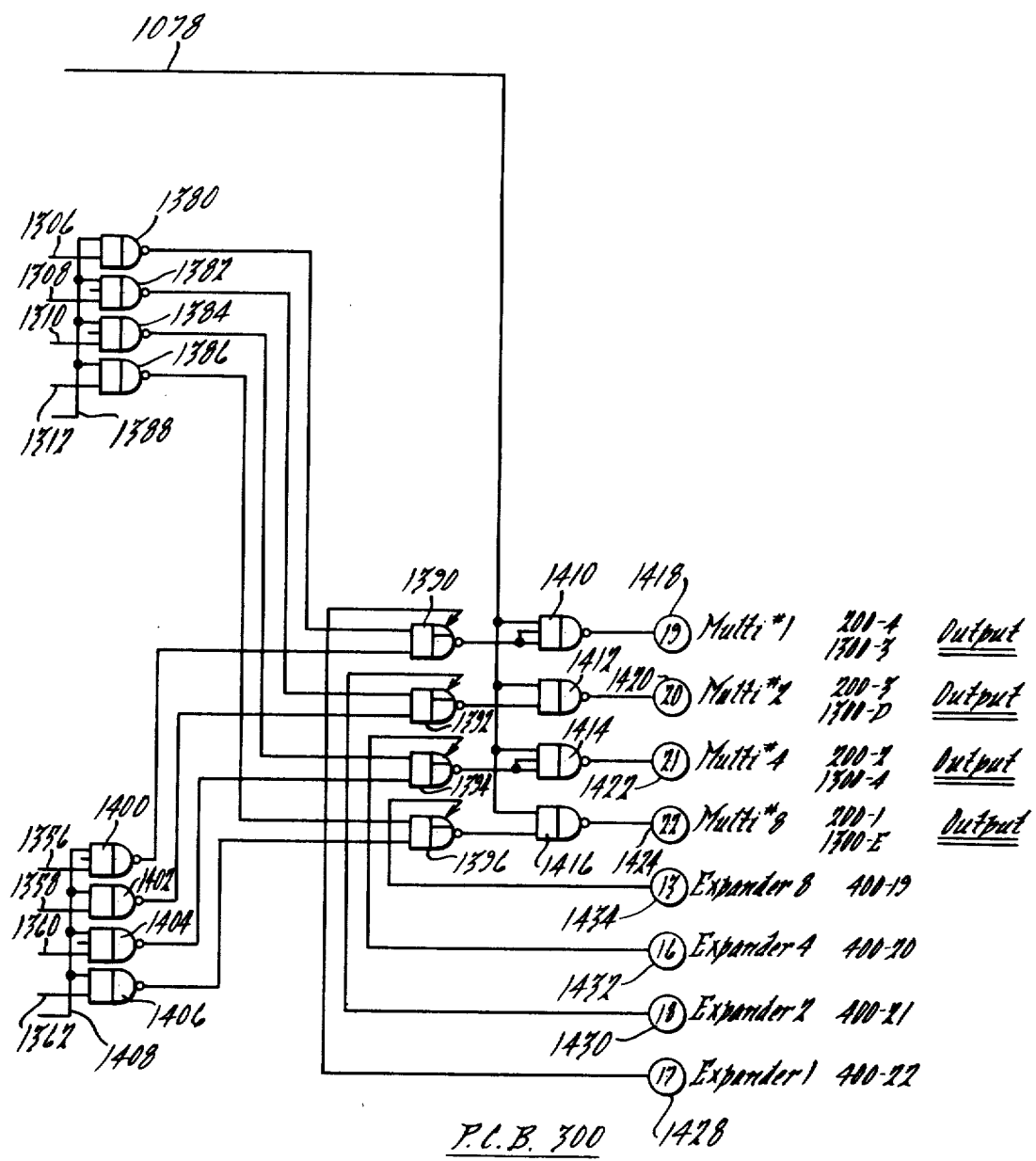
FIG. 17 is the final portion of the multi-station register schematic diagram and particularly illustrating the output section thereof.

A further symbol is utilized, namely # which causes the units address number stored in the circuits of FIGS. 15, 16 and 17 to be incremented by a count of one. With these latter signals, a work barrel may be delivered to a particular multistation address and subsequently picked up from that same address. The address is then incremented by a count of one to index the number stored to permit the system to go to the next address and perform some function, such as delivering the piece of work on the work carrier.

Continuing with the sequence of events illustrated in FIG. 9, step 11 commands the carrier to go left to station number four followed by the commands to lower, go right to station number two and rise, thus picking up a piece of work at station number two. The work at station two is then delivered left to station number three and the carrier lowers to drop the piece of work at that station. The carrier then proceeds left to station five and raises the piece of work there and goes left to station number six wherein the work is lowered into the tank. The carrier then continues right to station four and raises removing the work at station four and, transversing the work left to station five, it is lowered therein.

Step 27 causes the work picked up at station number six, to be carried left to station number seven and lowered and an incoming interlock is sensed in step 29. The interlock can take any form such as sensing the energization of a relay or a limit switch, etc. Step 30 tells the system to turn off the relay E energized in step 9 above.

Step 38 commands the carrier to lower to drop a plating barrel into station number ten and thence to go left to an address designated 3*. In this particular address, the three designates the tens position of the address and the asterisk designates an unknown address which is stored within the system, particularly in a circuit to be described in conjunction with FIGS. 15-17. Thus, when the system senses the asterisk, an address is evolved from the circuit of FIGS. 15-17 and fed to the address coincidence circuit as the designated or commanded address, for example tank number thirty-one. The carrier then picks up the load or plating barrel at tank number thirty-one and goes right to station number nine and lowers to drop the workload at this latter station number. The carrier then goes left to station number seven and picks up the plating barrel at station seven and delivers it to address designated step 45, which is R3* (the same address as was indicated in step 39). Thus, the carrier will go to station number thirty-one. However, the command 45 is further designated with the symbol # which commands the system to increment the address stored in the circuit of FIGS. 15-17. Thus, the stored address is now station number thirty-two and the next time the tape contains an address of 3*, the carrier will automatically go to station number thirty-two.

Following is given a complete tape with the associated codes to perform the sequence of events illustrated in FIG. 9.

| Step Number | Tape Code | Step Number | Tape Code |
|---|---|---|---|
| 1 | Z at U | 29 | C& |
| 2 | R13 | 30 | E− |
| 3 | D | 31 | R01 |
| 4 | (2) | 32 | U |
| 5 | U | 33 | L02 |
| 6 | R01 | 34 | D |
| 7 | D | 35 | L09 |
| 8 | L03 | 36 | U |
| 9 | E+ | 37 | R10 |
| 10 | U | 38 | D |
| 11 | L04 | 39 | L3* |
| 12 | D | 40 | U |
| 13 | R02 | 41 | R09 |
| 14 | U | 42 | D |
| 15 | L03 | 43 | L07 |
| 16 | D | 44 | U |
| 17 | L05 | 45 | R3 |
| 18 | U | 46 | D |
| 19 | L06 | 47 | R10 |
| 20 | D | 48 | U |
| 21 | R04 | 49 | R11 |
| 22 | U | 50 | D |
| 23 | L05 | 51 | (2) |
| 24 | D | 52 | U |
| 25 | L06 | 53 | R12 |
| 26 | U | 54 | D |
| 27 | L07 | 55 | (3) |
| 28 | D | | |

Figure 10:
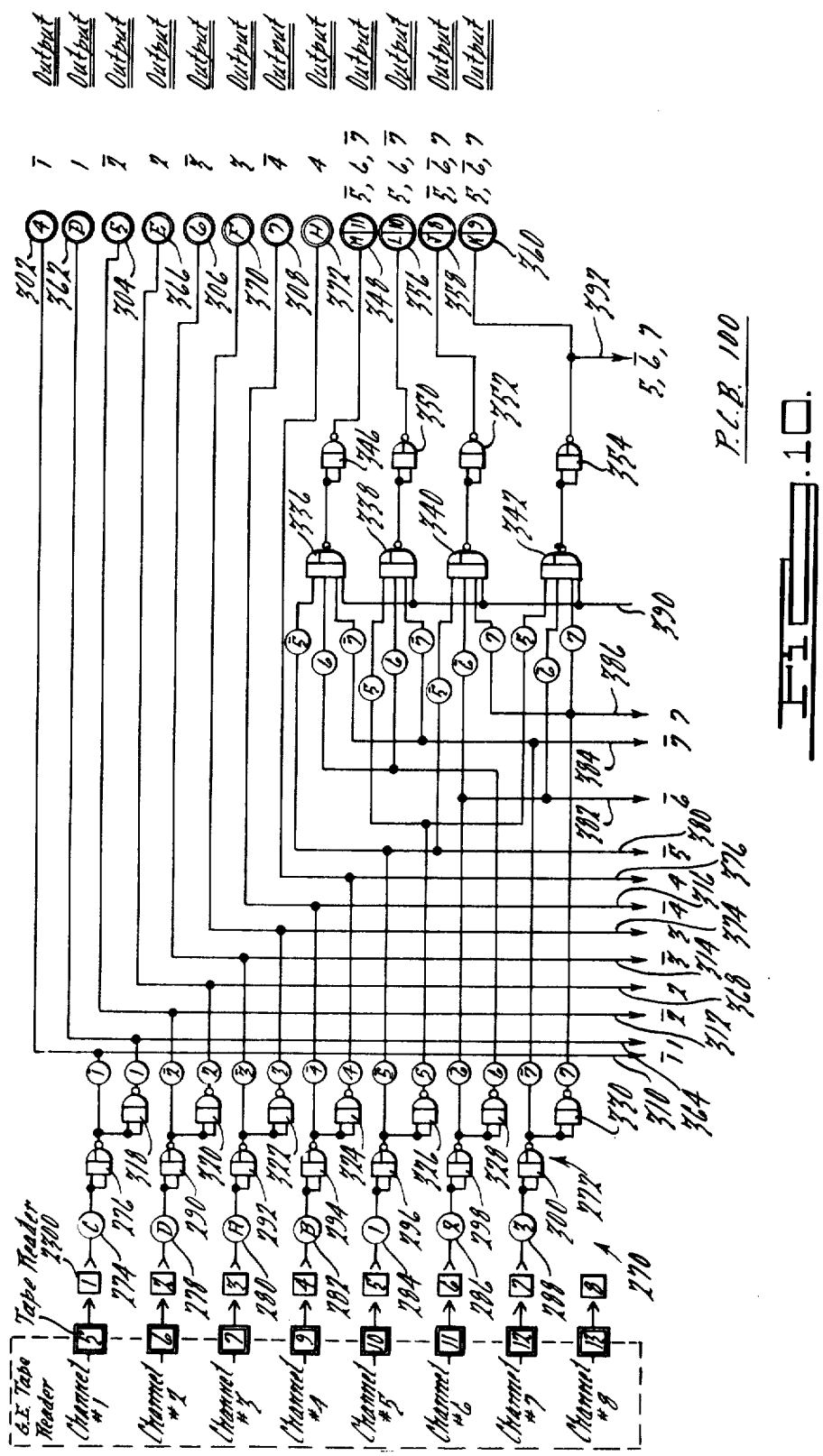
FIG. 10 is a portion of a schematic diagram of a tape control, tape decoder and step number counter and particularly illustrating the tape decoder section of the circuit.

Referring now to FIG. 10, there is illustrated the tape reader input section which provides channel coded signals for the various portions of the system. It is to be noted that the input circuit includes channels 1-7 and does not include a signal for channel 8.

Channel 8 would normally be the parity channel. In this system a previously checked tape is always used and it is not deemed necessary to check the parity under normal operation. It is possible that a parity checking system could be adapted.

Specifically, the input signals from the various reader channel positions are fed to a set of input terminals 270 and from there to a plurality of input inverter gates 272. Specifically, channel 1 is fed to input terminal 274 and thence to inverter buffer gate 276, this latter gate inverting the channel 1 signal to a channel $\bar{1}$ signal. Similarly, channels 2-7 are fed to specific input terminals 278, 280, 282, 284, 286 and 288 and these signals are in turn fed to inverter circuits 290-300 respectively. The outputs from gates 276, 290, 292, and 294 are fed to output terminals 302, 304, 306 and 308 corresponding to outputs for channels $\overline{1}, \overline{2}, \overline{3}$ and $\overline{4}$. The outputs of these gates 276, 290, 292 and 294 are also fed to a second pair of output conductors 310, 312, 314 and 316 corresponding to the not sides of each of channels 1 to 4 for use on PCB 100. The outputs from gates 276 and 290-300 are also fed to a second set of inverter - buffer circuits 318 to 330 respectively which perform a second inversion of the signals received from channels 1 to 7 respectively and also provide additional current gain for the signals. Thus, the output signals from gates 318 to 330 are exact replicas of the signals presented on input terminals 274 to 288 respectively corresponding to channels 1-7.

The output of gate 296 is fed to the input circuit of a nand gate 336 as are signals from gate 328 and gate 300 corresponding to $\overline{5}$, 6 and $\overline{7}$ input signals. Similarly the output of gates 326, 328 and 300 are fed to the input circuit of nand gate 338 corresponding to channels 5, 6 and $\overline{7}$. A similar gate 340 is provided with input signals from the output circuits of gates 296, 298 and 330 corresponding to channels $\overline{5}, \overline{6}$ and 7 and a gate 342 is provided with input signals from gates 326, 298 and 330 corresponding to channels 5, $\overline{6}$ and 7.

The output of gates 336 is inverted through an inverter circuit 346 to provide a $\overline{5}$, 6 and $\overline{7}$ output signal on output terminal 348. Similarly the outputs of gates 338, 340 and 342 are fed through inverter circuits 350, 352 and 354 to provide output signals at corresponding output terminals 356, 358 and 360 to provide output signals corresponding to channels 5, 6 and $\overline{7}$, channels $\overline{5}, \overline{6}$ and 7 and channels 5, $\overline{6}$ and 7 respectively. These latter codes are commonly used codes in the circuit and for simplicity of wiring it has been found that the cost of providing gates 336, 338, 340 and 342 are warranted.

The output of gate 318 is provided to an output terminal 362 and also an output conductor 364 corresponding to channel 1. The output of gate 320 is connected to an output terminal 366 and also to an output conductor 368 corresponding to channel 2. Similarly gates 322 and 324 are connected to output terminals 370, 372 and output conductors corresponding to channels 3 and 4 respectively. Output conductors 364, 368, 374 and 376 are for use on PCB 100 only. The $\overline{5}$, $\overline{6}$, $\overline{7}$ signals generated at the output terminals of gates 296, 298 and 300 are also connected to output conductors 380, 382 and 384 to provide channel $\overline{5}, \overline{6}$ and $\overline{7}$ signals respectively and also the output of gate 330 is connected to a channel 7 output conductor 386, these signals being used in FIG. 11. The operation or data forwarding function of gates 336, 338, 340 and 342 is controlled by a signal on a stroke line 390, the strobe signal being generated in the circuit to be described in conjunction with FIG. 11. However, the strobe signal is normally a low signal which rises to a high level at the time that the data is to be strobed through the gates 336, 338, 340 and 342.

Figure 11:
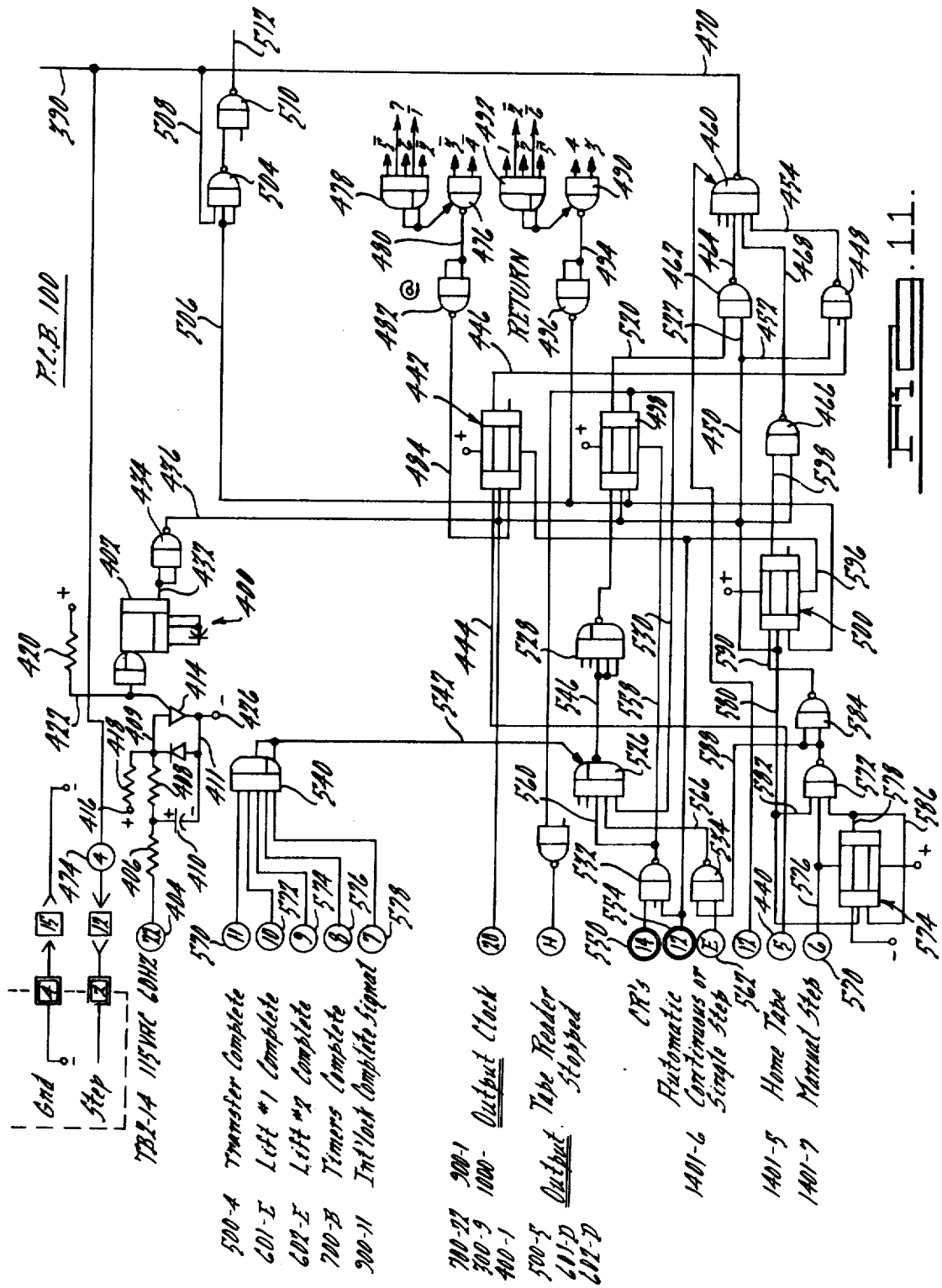
FIG. 11 is another portion of the schematic of the tape control, tape decoder and step number counter schematic diagram and particularly illustrating the tape control portion thereof.
Figure 12:
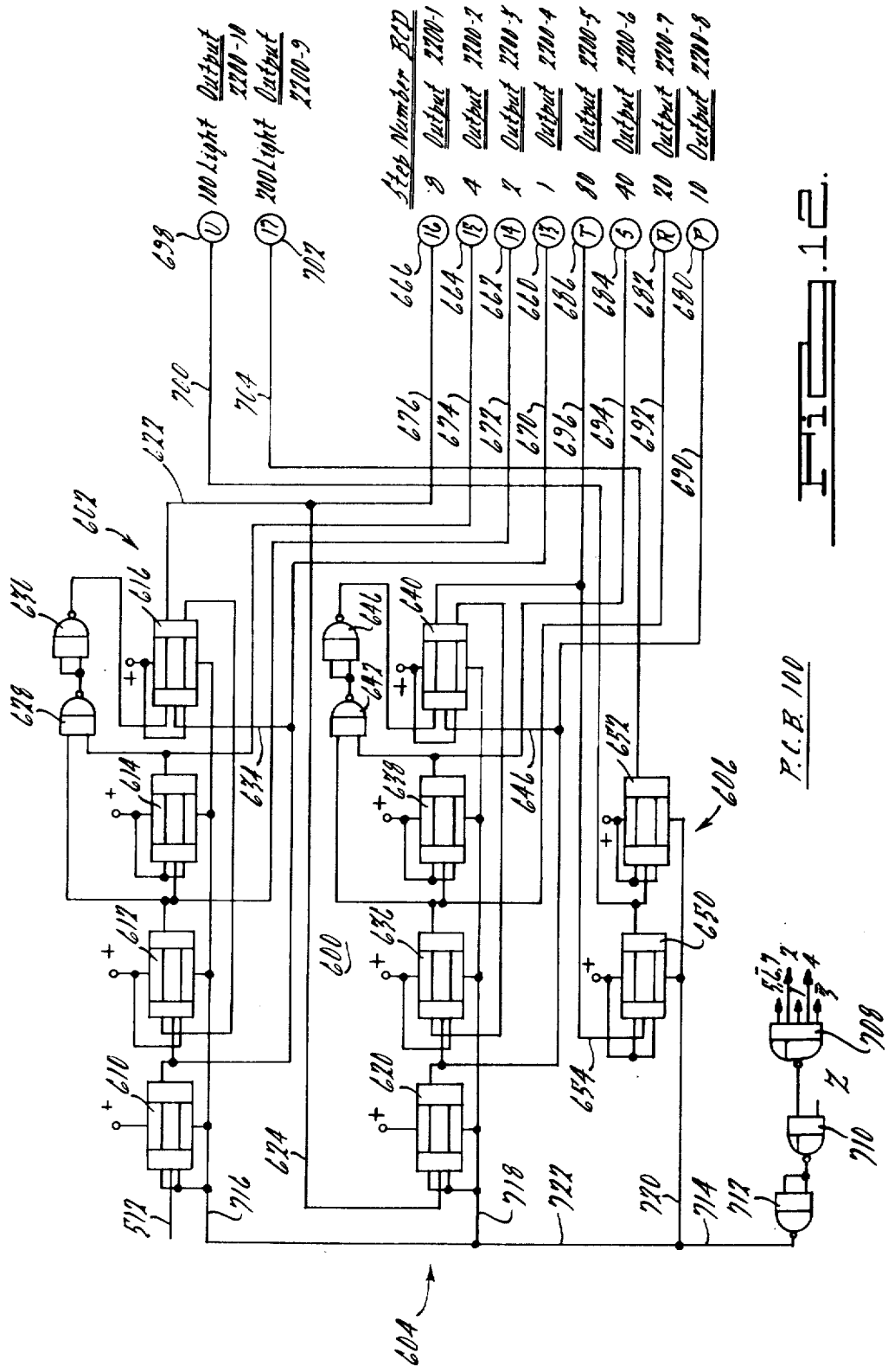
FIG. 12 is the final portion of the tape control, tape decoder and step number counter circuit diagram and particularly illustrating the step number counter portion of the circuit.

The signals on conductors 310-316, 364, 368, 374, 376 and 380-386 and an additional channel 5, $\overline{6}$ and 7 signal on conductor 392 are fed to the circuits to be described in conjunction with FIGS. 11 and 12. The circuits below will not be designated by the conductor numbers but rather will be designated by the channel designations, for example channel 1 or channel $\overline{1}$.

Referring now to FIG. 11, there is illustrated a second portion of the tape control and decoder system, which includes a clock pulse generating circuit, a home circuit, an automatic and single step circuit. Particularly, a clock pulse generating circuit 400 is provided, which includes a forty microsecond single shot multivibrator circuit 402 of the type which is typical in the art. Particularly, the single shot multivibrator circuit 402 receives an input at input terminal 404 connected to a source of alternating current potential, particularly a 115 volt alternating current sixty hertz source. The input terminal 404 is connected to a phase shift network including resistors 406, 408 and a capacitor 410. The phase shift circuit shifts the phase of the incoming wave by approximately 90°, the shifted wave being fed to the anode electrode of a programmable unijunction transistor 414, the unijunction transistor also being connected to a source of positive potential at input terminals 416 through a resistor 418.

The gate electrode of the unijunction transistor 414 is connected to a source of positive 12 volt potential by means of a resistor 420 and a conductor 422 to provide a 12 volt reference for the gate electrode of the unijunction transistor 414. Thus, as the potential at the anode electrode builds up to the point where it exceeds the potential of the gate electrode, the unijunction transistor will then fire, pulling the gate electrode down to a potential very near ground potential at input terminal 426. Diode 411 clamps the voltage in conductor 409 to a maximum of −1 volt. The firing of unijunction transistor 414 causes a pulse to trigger the single shot multivibrator circuit 402. The output voltage at conductor 432 is normally at a positive potential and drops to a low potential during the time that the single shot multivibrator 402 is conducting. This output is fed through a buffer gate 434 to provide a positive going pulse on clock conductor 436, the pulse occurring each 16 and ⅔ milliseconds and being of a forty microsecond duration.

Referring now to the home tape circuit, a home tape input signal is provided on an input terminal 440, the signal being generated at the panel board, illustrated in the left end of FIG. 1, by pushing a home tape button, the signal at terminal 440 is fed to the J input circuit of a homing flip flop 442, the homing flip flop being of the JK type integrated circuit. This home tape signal is fed by means of a conductor 444 and causes the flip flop 442 to switch states coincident with the clock pulse to provide a positive signal on an output conductor 446 during the period between the time that the home button has been pushed and the tape is not in the home position. The plus signal or high signal on conductor 446 is fed to the input circuit of a homing gate 448, the gate also including an input from the clock pulse circuit 400 by means of the conductor 436 and conductors 450, 452. The gate 448, as are the other gates in this system, is such that any low signal to the input thereof would create a high signal and, if all signals to the input of the gate are high, a low will be created at an output conductor 454.

During homing, the conductor 446 is high and the conductor 452 is alternately going from low to high, the high pulse occurring when the clock pulse is being generated. Thus, the output of the gate 448, on conductor 454, is alternately going from a high to a low signal each time the clock pulse occurs. The signal on conductor 454 is fed to an output strobe gate 460, the gate also including an input signal from an auto gate 462 by means of a conductor 464 and a second gate 466 by means of a conductor 468. For the present time it is sufficient to state that the signal levels on conductors 464 and 468 are both high thus not affecting the operation of the gate 460.

Accordingly, when the signal on conductor 454 goes from a high to a low level at the time the clock pulse occurs, and with the signals on conductors 464 and 468 being high, the output signal on output conductor 470 goes from a low to a high level thus producing a series of output pulses which are synchronized with the series of clock pulses being generated in the clock circuit 400. The pulses on conductor 470 are fed to an output terminal 474 which is connected to the reader step circuit, thus stepping the reader. Thus, each time a pulse is produced on conductor 470, the reader is stepped to the next instruction and the system searches for the code indicating that the tape is at the home position.

The tape continues to index until such time as the at home position is sensed by the system, the at home position being indicated by an, the code for the at home position being $\bar{1}, \bar{2}, \bar{3}, \bar{4}, \bar{5}, \bar{6}$ and 7. These coded signals are fed from the circuitry of FIG. 10 to the input circuit of a gate 476 and an expander 478, the coincidence of all these signals producing a low signal on output conductor 480. This low signal is inverted by an inverter gate 482 and fed to the K input of the flip flop 442 by means of a conductor 484. Thus the flip flop 442 is reset to provide a low signal on conductor 446 and discontinue the stepping of the reader through gates 448 and 460.

Referring now to the return portion of the circuit, there is provided a return gate 490 which includes an input from channels 3 and 4 and also an expander 492 which includes inputs from channels 1, $\bar{2}$, 7, $\bar{6}$ and $\bar{5}$. The coded indication at the input to gates 490, 492 is the code for the carriage return function and, when a coincidence of the coded signals occurs, an output signal is provided on conductor 494 which is in turn fed to an inverter circuit 496. The output of gate 496 is fed to the input circuit of an automatic mode flip flop 498 and the output of a manual mode flip flop 500 is also fed to the input circuit of a step number gate 504 by means of a conductor 506. Each time a carriage return is sensed, thus indicating the end of a step, a high signal is impressed on conductor 506 and the strobe signal on conductor 470 will gate the signal through the gate 504 by the strobe signal being impressed on the conductor 508. The output of gate 504 is inverted by means of a gate 510 and a stepping pulse is provided on output conductor 512.

Referring now to the automatic circuit, the automatic gate 462 receives an input signal from the automatic flip flop 498 by means of a conductor 520, the gate 462 also receiving an input clock signal on conductor 450 by means of a conductor 522. Thus, each time the flip flop 498 is caused to have a high signal on conductor 520, the clock pulse will create a low pulse on conductor 464 which in turn is transmitted through gate 462 to conductor 470 to step the reader and strobe the subgroups provided at output terminals 348, 356, 358, 360. The flip flop 498 is set in response to a pulse generated from a gate 526, the output of gate 526 being fed through an inverter gate 528 and then to the set (J) side of flip flop 498. The gate 526 includes an input signal from one output of the flip flop 498 by means of a conductor 530 and an input from an automatic gate 532 and a continuous or single step gate 534. The gate 526 also includes an input from a function-complete gate 540 which provides an input to the expander section of gate 526 by means of a conductor 542.

In order to provide a low output from gate 526, the input from the flip flop 498, on conductor 530, and the inputs from the gates 532 and 534 must be high. The signal on conductor 542 also must be high. This occurs when all functions are complete, as will be seen from a more complete explanation hereafter. The signal on conductor 542 will drop to a low level and provide a high output on conductor 546 when there is a function to be performed, signalled by a low input at 570, 572, 574, 576 or 578.

The gate 532 includes an input from CRS which is low when the run (CRS) relay is energized and also an input from the automatic mode switch which is low when the system is in the automatic mode. Either of these signals being low causes the output from gate 532 to be high. This signal goes, through conductor 560, to gate 526 enabling the auto-step circuit to be utilized, and also through conductor 558 to the direct reset terminal of automatic mode flip-flop 498. It should be noted here that when the signal on conductor 558 being fed to flip-flop 498 is low, the operation of flip-flop 498 is inhibited. This signal is fed to the input circuit of gate 526 by means of a conductor 560. The gate 534 includes an input from a continuous or single step terminal 562, the signal on terminal 562 being low when the system is in continuous mode, and being high when the system is in the single step-mode. Assuming that the system is in continuous, a high signal which has been inverted by gate 534, is fed to the input of gate 526 by means of a conductor 566.

Assuming that the flip flop 498 is in the reset condition, a high signal will be impressed on conductor 530. The signals on conductors 560 and 566 will also be high. Thus, the gate 526 will be enabled to pass a signal which drops from low to high on conductor 542 through the gate 528 and ultimately to set the flip flop 498.

Referring back to expander 540, the gate includes five inputs, which inputs include a transfer-complete signal on terminal 570, a lift-one, complete signal on terminal 572, a lift-two, complete signal on terminal 574, a timer-complete signal on terminal 576 and an interlock-complete signal on terminal 578. When that particular function is complete, the input signals on terminals 570-578 are high. This input system senses the completion of a commanded signal, for example moving the work carrier in the transfer mode, the completion of the lifting or lowering of the work, the timing out of a particular energized timer on the fact that an interlock has been completed will be indicated by that particular signal going high. All operations being complete, will render the input signals to expander 540 high thereby providing a high signal at the output thereof. Normally all of the input signals to the expander 540 will be high with the exception of the commanded function which is incomplete. Note that it is possible to combine timers or interlocks with either transfer or interlocks, although this is not normally done. When the reader senses a command for transfer, lifting, timing or sensing an interlock and the apparatus commences performance of that work, one of the input signals to the gate 540 will be low. This will render the output signal on conductor 542 low. Upon completion of that command function, all of the input signals to expander 540 will again be high to render the signal on conductor 542 high. Thus high signal is transmitted to gate 526, since all the remaining input to gate 526 are high, through gate 528 to the flip flop 498. The next clock pulse sets the flip flop 498 and causes the signal on conductor 520 to go high, the high signal being fed to gate 462 which then waits for the next clock pulse which renders the signal on conductor 464 low. The remaining signals on conductors 468 and 454 are high thereby providing a stepping pulse on conductor 470 to step the reader for the next command. The setting of flip flop 498 causes the signal on conductor 530 to go low thereby changing the input signal to gate 526. This causes the set input, through conductor 546 and gate 528 to go low. At this time both inputs to flip flop 498 are low which precludes any change in the state of the output conductor 520. The output of flip flop 498, through conductor 520 being high and the clock signal going high and low, cause the tape reader to continue to read data. It should be noted here that at the end of each coded command there is a return code 1, $\bar{2}$, 3, 4, $\bar{5}$, $\bar{6}$, 7. As the reader reads the coded information an operation is assigned to a portion of the system. For example if a timer is turned on, the timers complete signal 576 will go low. The next character to be read is the return. The return character causes a coincidence of high signals to expander 492 and gate 490 causing the output from gate 492 to go low, and through conductor 494 to gate 496 causing output from 496 to go high. This high signal goes to the reset input of flip flop 496, and, on the next clock pulse, will reset flip flop 496 to its reset condition. When reset the output conductor 520 will go low, inhibiting any further stepping of the reader by gate 462.

When the signal step mode is in effect and input signal to 562 is high, this signal is fed to gate 534. The other input signal to 534 comes from gate 572 which at this time is high. Both inputs to gate 534 being high cause output conductor 566 to be low, and as previously described prevents the automatic stepping function to operate. To initiate a step, the following conditions must be satisfied. First-all signals to expander 540 high, automatic on (conductor 560 high), flip flop 498 reset (conductor 530 high) and output from gate 534 going high. The following is the sequence that provides a momentary high signal to allow the reader to step. When the manual step button is actuated, input signal 570 goes high to the direct set input to set flip flop 574 and also causes one of the inputs to gate 576 to be high. The other two inputs to gate 572 are a) clock, and b) the set output from flip flop 574. At the next clock pulse the input signal from terminal 582 to gate 572 goes high, input terminal 582 also goes to clock input of flip flop 574, because the set output 578 is high and is connected to reset input of flip flop 574 the flip flop 574 is reset after one clock pulse. The output from gate 572 goes low for the duration of only one clock pulse. This low signal goes through conductor 588 to gate 534 causing the output of gate 534 to go high for one clock pulse. This high signal goes through conductor 560 to gate 526 causing the normal reading sequence to begin. The manual step input to terminal 570 must be allowed to go low to reset flip flop 574 before the above sequence may be repeated.

Referring now to the manual step portion of the circuit, a manual step input signal is provided on manual step input terminal 570 the input signal being fed to a manual step gate 572 and a flip flop circuit 574 by means of a conductor 576. The signal on input terminal 570 is normally low when the manual step signal is not present and is raised to a high level when the manual step button is pushed. Thus, the normally low signal is fed to the upper input of flip flop 574, rendering the output of conductor 578 high. This latter input is also fed to the gate 572, as is a clocking pulse signal by means of conductors 580, 582. When the manual step button is pushed all the inputs to gate 572 are rendered high, thereby providing a low output signal to a gate 584. The output on conductor 578 is also fed back to the lower input of flip flop 574 by means of a conductor 586 and the output of gate 572 is fed to the input circuit of gate 534 by means of a conductor 588.

The output of gate 584 is fed to the upper input of the not-on-automatic flip flop 500 by means of a conductor 590 and the fact that the system is not in automatic provides a high level signal on a conductor 596 being fed to the lower biasing input to the flip flop 500. All of the high inputs of gate 572 produce a low output to gate 584 this low output being inverted by gate 584 to produce a high input to gate 590. The clocking pulse being fed on conductor 450 switches the flip flop 500 to produce an output pulse at gate 466, the output of flip flop 500 being fed thereto by means of a conductor 598. The output of gate 466 produces a strobe pulse at the output of gate 460, the strobe pulse stepping the reader and also strobing the information passing through the circuit described in conjunction with the description of FIG. 10. Thus, each time the manual step button is pushed, a stepping pulse is produced on conductor 470 to step the reader until a return character is decoded through gates 490 and 496 causing the reset input to flip flop 500 to be high, resetting the 500 flip flop on the next clock pulse.

Referring now to FIG. 12, there is illustrated a binary-coded, decimal, step-number counter which records and provides an output of the number of steps from the home position which the tape has taken as it progresses through the sequence of sensing coded instructions. As was stated above, at the initial home position, the letter Z is provided in the coded tape to reset the step number counters.

The binary coded decimal counter circuit 600 includes a units counter 602, a tens counter 604 and a hundreds counter section 606 to provide an output indication of a count of up to 399 and then recycling, count 400 is zero.

Referring specifically to the units counter, the counter consists of a 1, 2, 4 and 8 bistable flip flop circuit 610, 612, 614 and 616 respectively, the input to the units section 602 being provided from an input conductor 512. It will be remembered from the description of FIG. 11, the conductor 512 is provided with pulses corresponding to the number of times the return character has been read.

As is obvious in order to provide a one count, the flip flop 610 is set and the flip flops 612, 614 and 616 remain in their reset state. For a two count the flip flop 610 is reset and the flip flop 612 is set while the flip flops 614, 616 remain reset. For a three count the flip flops 610 and 612 are set and the flip flops 614, 616 remain reset. The count progresses up through and including the count of nine wherein the output of the final gate 616 is fed back to the input circuit of the first unit 620 of the tens section 604 by means of conductors 622, 624. It is to be noted that the output signal condition of gates 612 and 614 are fed to the input circuit of an and gate 628, the output of which is inverted through a gate 630 and fed to the input circuit of the final stage 616. The output signal is coordinated by gate 628 and also coordinated with the set condition of flip flop 610 by means of a signal fed forward from flip flop 610 to the clock input circuit of flip flop 616 by means of a conductor 634. The binary coded decimal circuits 602, 604 and 606 are all typical for circuits of this type.

The tens section 604 includes the flip flop 620 corresponding to the tens count and additional flip flops 636, 638 and 640 corresponding to the twenties, forties and eighties count. Again the correlation of the outputs of the various flip flops within the section 604 are correlated by gates 642, 644 and the fed forward circuit, including conductor 646, as was discussed in conjunction with the section 602.

The 100's and 200's count provided by section 606 and includes flip flips 650, 652, the input to the section 606 being provided by means of a signal on conductor 654 connected between the output circuit of flip flop 640 and the input circuit of flip flop 650.

The signal conditions of the 1, 2, 4 and 8 flip flops 610, 612, 614, 616, respectively, are provided at output terminals 660, 662, 664 and 666 respectively due to the connections between these output terminals and the output circuits of the respective flip flops 610–616 by means of conductors 670, 672, 674 and 676 respectively. Similarly, the set or reset condition of flip flops 620, 636, 638 and 640 are provided at output terminals 680, 682, 684 and 686 respectively, the output circuit of each flip flop 620–640 being connected to each respective output terminal by means of conductors 690, 692, 694, 696 respectively.

The output indication of the reset state of the one hundred flip flop 650 is provided by means of a signal at output terminal 698 fed thereto by means of a conductor 700 and the reset condition of flip flop 652 is provided at output terminal 702 through a connection created by conductor 704. The resetting of all of the stages of the circuit 600 is accomplished by sensing a letter Z which take the code of channels $\overline{1}, 2, \overline{3}, 4, 5, \overline{6}$ and 7. These signals are fed to a gate 708, these signals being inverted twice and provided additional driving current by means of buffer gate 712. Thus, an inverted coded signal is provided on an output conductor 714 and fed to each of the stages of the sections 602, 604, 606 by means of conductors 716, 718, 720 and a common conductor 722. Each of the conductors, and its associated resetting signal, are connected to the input circuits of each stage of the sections 602, 604, 606, to facilitate resetting.

Figure 13:
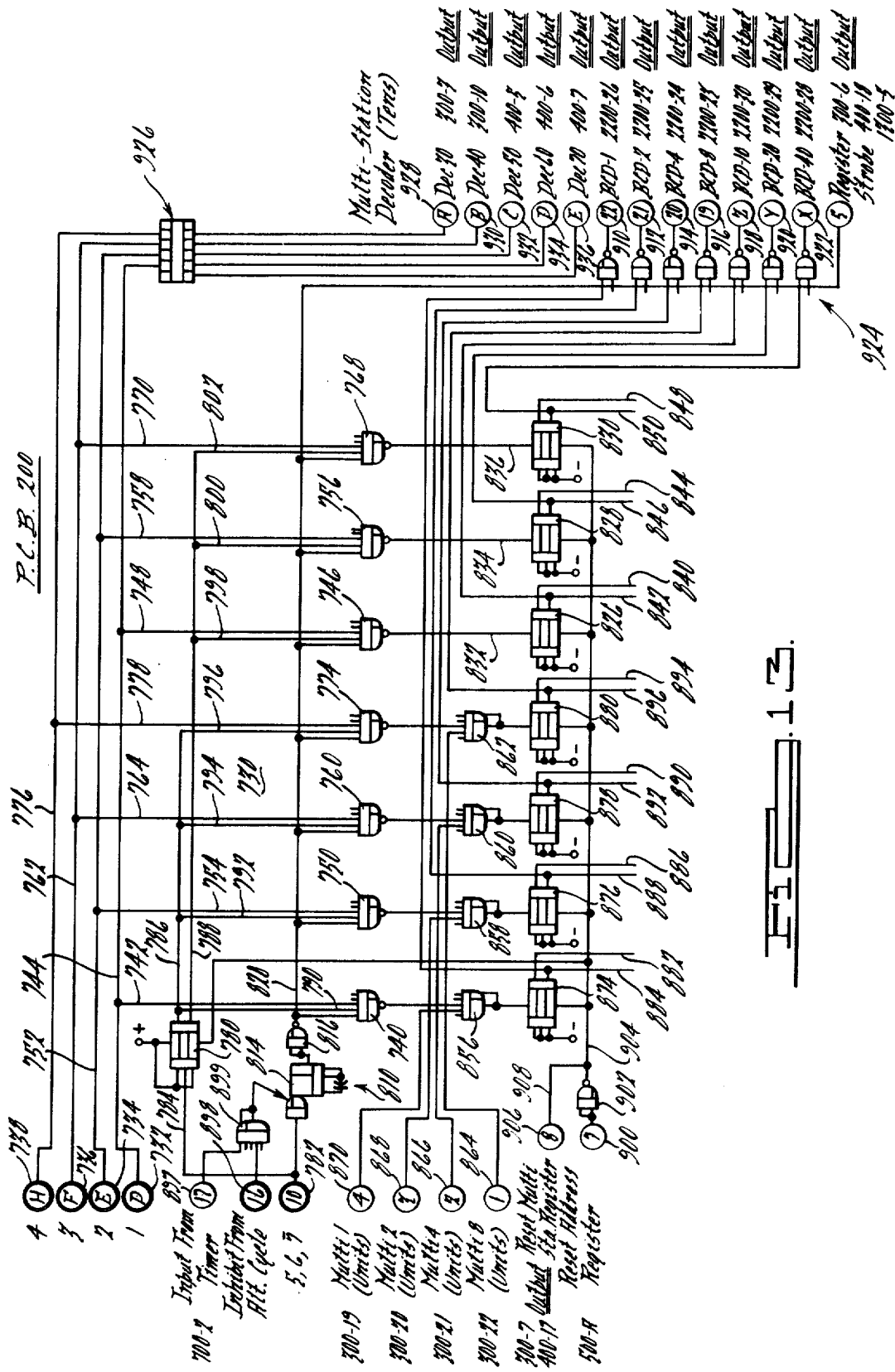
FIG. 13 is a portion of a station address register and coincidence circuit diagrams and particularly illustrating the station address portion of the circuit.

Referring now to FIG. 13, there is illustrated a portion of a station address register and coincidence circuit and particularly illustrating a station address portion 730 of the subsystem. The circuit of FIG. 13 is adapted to generate a station address as sensed from the address sensed from the paper tape in the reader. As was stated above, the address for a particular station will be read as a first digit constituting the tens digit and a second digit constituting the units digit, the two digits following in sequence from the reader circuit. Thus, the system to be described in conjunction with FIG. 13 must differentitate between the tens and units digit of the address.

The input coded address numerals are fed to the input circuit of the station address register 730 from a binary 1, binary 2, binary 4, binary 8 input terminals 732, 734, 736 and 738 respectively. The binary 1 signals is fed to a units gate 740 by means of a conductor 742 and a second conductor 744, the same signal being fed to the input circuit of a tens gate 746 by means of a conductor 744 and a conductor 748. Thus, the binary 1 signal is fed to both the gates 740, in the case of the units digit, and the gate 746, in the case of the tens digit. Similarly the binary 2 is fed to a units gate 750 by means of a conductor 752 and a conductor 754 and is also fed to the twenties gate 756 by means of the conductor 752 and a conductor 758. Further, the binary 4 digits is fed to a units gate 760 by means of a conductor 762 and a conductor 764 and is also fed to a forties gate 768 by means of a conductor 762 and a conductor 770.

Due to the number of addresses being used in the system of the present invention, the tens, twenties and forties digits are the only tens digits utilized. However, it is to be understood that this system could be expanded to include a higher count. The final binary 8 digit is fed to a units gate 774 by means of conductors 776, 778. Thus, the first three digits of the address are fed to two sets of gates, the units set 740, 750 and 760 and the tens set 746, 756 and 768.

The system will differentiate between a tens digit being read by the reader and a units digit. This is accomplished by means of a units-tens, flip flop 780 which is toggled back and forth from the set to the reset state by sensing when the first digit of the address is read by the reader (the tens digit) and when the second digit is read by the reader (the units digit). This is accomplished by sensing the fact that channels 5, 6 and $\overline{7}$ have been sensed which indicates that an address digit has been read. This combination of channels is fed to a 5, 6, $\overline{7}$ input terminal 782, the signal being fed to the clock input of flip flop 780 when the first digit is red. The coding format of the system demands that all station addresses be preceeded by a direction, namely and R or L. This signal comes from the transfer board and will be discussed in FIGS. 20–22. Sufficient to say that when an R or L is decoded the input signal to 900 goes momentarily high and causing buffer gate 902 to make conductor 904 low resetting flip flops 874, 876, 878, 880, 826, 828, 830 and units-tens flip flop 780 to the tens position. The resetting signal is also fed to an output circuit connected to the multistation register to reset the multistation register circuit to be described in conjunction with the circuit of FIGS. 15–17. This pulse is derived from the output circuit of gate 902 and fed to an output terminal 906 by means of conductor 908. The pulse on a conductor 904 sets the flip flop 780 such that the output circuit provides a low signal on an output conductor 786 and a high signal on a second output conductor 788. The low signal on conductor 786 is fed to each of the units gates 740, 750, 760 and 774 by means of conductors 790, 792, 794 and 796 respectively. This low signal inhibits the operation of each of the gates 740, 750, 760 and 774.

However, the high signal on conductor 788 is fed to each of the tens gates 746, 756, 768 by means of conductors 798, 800, 802 which enables each of the tens gates 764, 756, 768. Thus, the first digit fed into the system from the reader will be directed to the tens gates.

The signals being fed to the input circuit are strobed by means of a clock pulse generating circuit 810 which includes a single shot multivibrator circuit 814 and an output buffer gate 816. Thus, when the system senses that a digit is being read by the reader, the pulse on input terminal 782 will cause single shot multivibrator circuit 810 to produce an output pulse on an output conductor 820 to strobe any information being fed to any of the gates 740, 750, 760, 774, 746, 756 and 768. The information will be passed through selected ones of these gates in accordance with the signal condition of the flip flop 780. That is, the tens information will be passed through the gates at the generation of the signal on conductor 820 if the flip flop 780 is in the reset condition generating a high signal on conductor 788.

Assuming that the first digit is being read by the reader, the selected energized terminal 732, 734, 736 will cause data to be passed through corresponding tens gates 746, 756, 768 at the generation of the pulse from the single shot multivibrator circuit 810. It is to be noted that the single shot multivibrator circuit 810 generates a twenty millisecond pulse on the conductor 820. The selected information is fed through to tens flip flops 826, 828, 830 by means of conductors 832, 834, 836 respectively. Assuming, for example, that a 1 signal is fed to gate 746, and the remaining gates 756, 768 are not energized, the flip flop 826 will be switched to its set state to provide an output signal on a tens output conductor 840 and a reset signal or 10 signal on conductor 842.

Both the true and not true signals are generated on conductors 840, 842 respectively for a purpose to be hereinafter described in conjunction with the description of FIG. 14. The twenties and forties flip flops 823 and 830 will remain in the reset state, the condition of the flip flops 828 and 830 being supplied on output conductors 844, 846, and 848, 850 respectively. Thus, a high signal will be generated on conductor 840 and a low signal on conductor 842 and low signals will be generated on conductors 844 and 848 and high signals on conductors 846 and 850. When the first digit is read, thus generating a pulse on input terminal 782, a pulse is generated on conductor 784 to toggle the flip flop 780 thereby reversing the polarity of the signals on conductors 786, 788 to produce a high signal on conductor 786 and a low signal on conductor 788.

The pulse on input terminal 782 also produces another clocking pulse from the single-shot circuit 810 to produce a strobe pulse on conductor 820 as previously described. Thus, any data being fed to the units gates 740, 750, 760 or 774 will be strobed through the gates by means of the pulse generated on conductor 820 in this way the data pulse is shorter than the clock pulse preventing any timing problems created by the changeover of flip flop 780. The output of gates 740, 750, 760 and 774 are fed to a set of expanders 856, 858, 860 and 862 respectively. As was noted above, the system, in the case of a multi-position station, generates a units digit for the address in responde to sensing an asterisk. The system which generates the address will be described in conjunction with the description of FIGS. 15-17. However, the signal generated for the units address is fed to corresponding input terminals 864, 866, 868 and 870, the input terminals corresponding to the input terminals 732, 734, 736 and 738 respectively.

Accordingly, the output of expanders 856, 858, 860, 862 are fed to corresponding flip flop circuits 874-880, irrespective of the source of the input signals, whether they be from the reader by means of terminals 732-738 or by means of internal addressing generated within the system by means of terminals 864-870. As was the case with flip flops 826-830, both of the output signals from the flip flops 874-880 are provided. Specifically, the flip flop 874 provides an output on conductor 882 for the set side and on conductor 884 for the reset side. Similarly, flip flops 876 and 878 provide output signals on conductors 886, 888 and 890, 892 for the set and reset sides of the flip flops respectively. Finally, the output of flip flop 880 is sensed by means of signals on output conductors 894, 896 corresponding to the set and reset sides respectively.

The operation of circuit 730 is also effected by the use of timers and alternate cycle registers. Because group 5, 6, 7 in the subgroup of numbers, if a number were used elsewhere in the system the stored address would be effected. When using the timers a code such a (2) is punched on the tape. When the "(" is decoded the inhibit signal to 897 is low and subsequently a number in subgroup 5, 6, 7 may be used without effecting the information stored in the address register. This is because when input 897 is low operation of single shot 810 is inhibited even though 5, 6, 7 is read. When the ")" character is read the low signal on 897 is removed and replaced by a high signal. Th input 898 is a common signal to all boards and will be described in detail on FIGS. 33 and 34. Sufficient to say that when an inhibit signal is present input 898 is low, and all other times it is high. Thus, the operation of the register is inhibited when a timer or an alternate cycle is being utilized. These inhibit signals are generated in a circuit to be described hereinafter and are fed to a timer inhibit input terminal 897 and an alternate cycle inhibit terminal 898, the signals from each of the terminals being fed to a common expander 899. Thus, a pulse on terminal 782 will not start the generation of a clock pulse from the single shot multivibrator circuit 810.

The outputs of each of the flip flips 874-880 and 826-830 are provided on plurality of output terminals 910, 912, 914, 916, 918, 920, 922, respectively connected to the output circuits of each of the units flip flops 874-880 and the tens flip flops 826-830. The connection is made through a plurality of gate circuits 924 which provide inversion of the reset side signal from the respective flip flips 874-880 and 826-830. These signals go to the decode and driver circuits for the visual display of the stored address.

Also, the circuit 730 includes a binary coded decimal to decimal decoder circuit 926 which includes inputs from the terminals 732-738, as fed thereto by conductors 744, 752, 762 and 776 respectively, the output from the decoder circuit 926 being fed to a plurality of decimal output terminals 928, 930, 932, 934 and 936 corresponding to decimal 30, decimal 40, decimal 50, decimal 60 and decimal 70, respectively. These output signals are fed to boards 300 and 400 to be described in conjunction with FIGS. 15-19 and corresponding to the multistation registers.

Referring to the timing system, the strobe pulses are 40 microseconds in duration and have a period of 16.6 milliseconds, the 40 microsecond clock pulse occurring at the beginning of the data pulse. Accordingly, the subgroup data 5, 6, 7, as fed to FIG. 13, is approximately 40 microseconds in duration. In order to insure that no data is lost or that no false data is generated within the system, the single shot multivibrator circuit 810 produces a 20 microsecond pulse, half the duration of the strobe data pulse. The 20 microsecond pulse is initiated very near the beginning of the strobe data pulse, the delay being of extremely short duration and due only to propagation considerations. Accordingly, the date for FIG. 13 is strobed in response to the single shot multivibrator circuit 810 pulse immediately after the start of the strobe data and terminating approximately in the center of the strobe data pulse.

Figure 14:
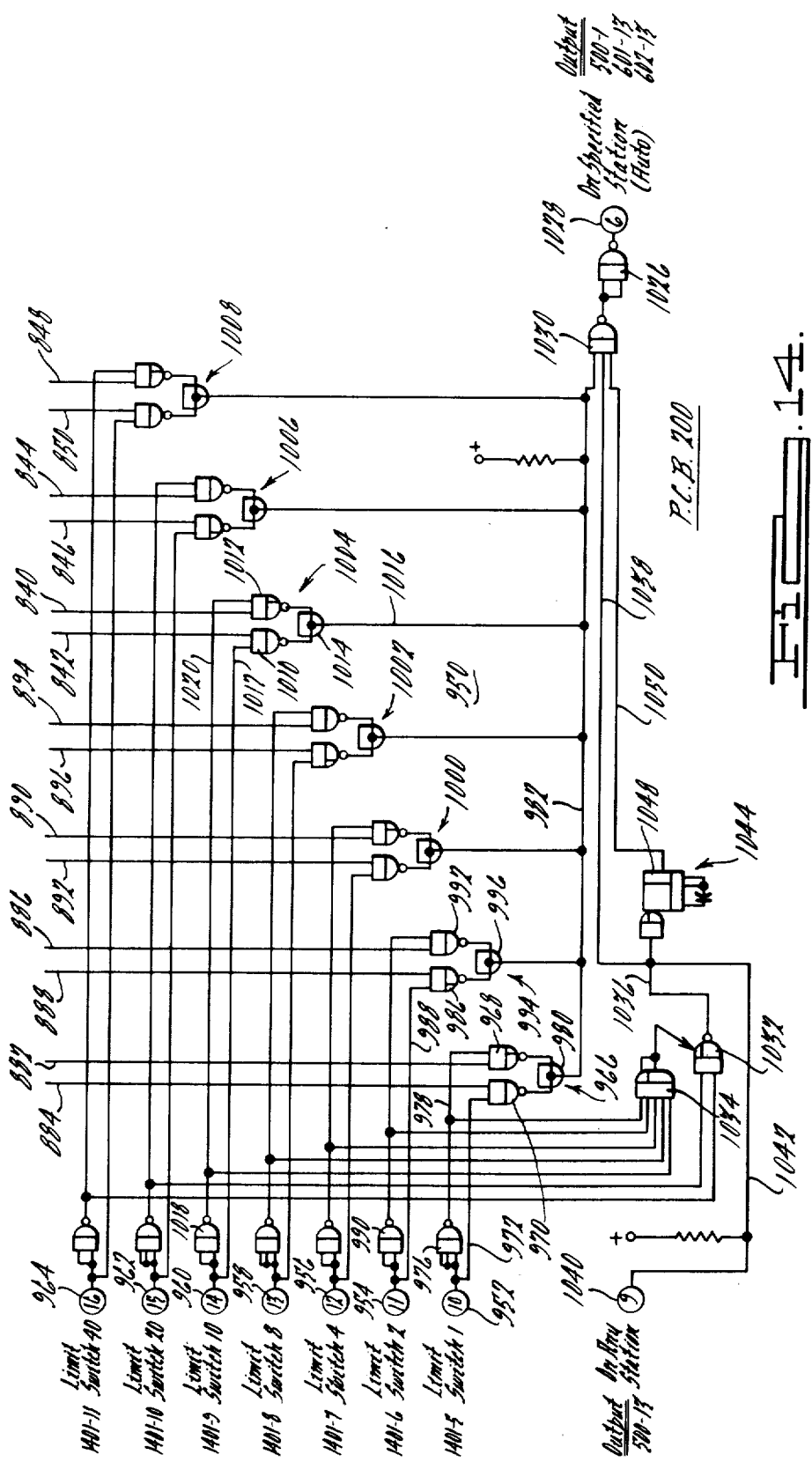
FIG. 14 is the remainder of the station address register schematic diagram and particularly illustrating the concidence circuit portion thereof.

Referring now to FIG. 14 there is illustrated the remaining subsystem 950 of the station address register circuit and particularly illustrating the coincidence circuit 950 thereof. As was described in conjunction with FIGS. 1–7, the carriage or work carrier, as it progresses down the line, will sense the position of the carrier with respect to the plating tanks by means of a coded station address assembly. The signals from the sensing units are fed in coded fashion to a plurality of input terminals 952, 954, 956, 958, 960, 962 and 964 corresponding to binary limit switch 1, 2, 4, 8, 10, 20 and 40 respectively.

For purposes of simplicity, the coincidence circuit 950 will be described in a bit by bit fashion. Referring to the first bit or the binary 1 signal, the set or commanded address is made evident by signals generated on conductors 882 and 884. If the bit No. 1 is desired, the signal level on conductor 882 will be a high level and the signal level on conductor 884 will be low. Each of these signals is fed to the input circuit of a comparator circuit 966, the comparator circuit including a first and gate 968 which includes the input from the set or true side of the flip flop described in conjunction with FIG. 13 and a second gate 970 which is supplied with the signal from the reset or not true side of the flip flop. The incoming sensed address bit, fed to terminal 952, is also fed to the input circuits of gates 968 and 970.

Specifically, the direct signal is fed through the input circuit of gate 970 by means of a conductor 972 and the inverted input signal from terminal 952 is fed to the input circuit of gate 968 by means of an inverter 976 and a conductor 978. If the number one bit has been sensed, the conductor 952 will be at a high level, this high signal being fed to gate 970. The inverted signal is fed by conductor 978 to place a low signal at the input circuit to gate 968 due to the signal on conductor 952. If the bit 1 has been selected, the signal level on conductor 882 will be high due to the setting of the 1 bit flip flop, and the signal on conductor 884 will be low. Thus, each of the gates 968 and 970 have both a high and a low input signal thereby producing a high output signal at the output terminal thereof. Both of these high output signals are fed to a collector or circuit 980 and fed to a common output conductor 982.

Referring now to bit 2 fed to input terminal 954, the signal level on terminal 954 is fed directly to gate 986 by means of a conductor 988 and, indirectly, through an inverter circuit 990, to the input of a second and gate 992. Also, the signal levels on conductors 888 and 886 are fed to the input circuits of gates 986 and 992 respectively. The output circuit from these latter gates are fed to a collector or circuit 996 as was the case with the bit 1 circuit 966.

All of the remaining coincidence circuits, specifically coincidence circuits 1000, 1002, 1004, 1006, 1008, corresponding to bits 4, 8, 10, 20 and 40 are of an identical configuration to those described in conjunction with bits 1 and 2. The sensed address signals are fed to the input circuits of two and gates connected in parallel and the commanded address is also fed to the input circuits of the parallel connected and gates, the bits for the sensed and commanded addresses being both the true and not true signals thereof. Referring to a digit that is not commanded and not sensed, thereby creating a match, coincidence circuit 1004 corresponding to the ten digit includes an input signal from terminal 960 directly to an input gate 1010 and indirectly to a gate 1012. Similarly the signals on conductors 842 and 840 are fed to gates 1010 and 1012 respectively. As was the case with the earlier coincidence circuits, the paralleled outputs of gates 1010 and 1012 are fed to a collector or circuit 1014, the output thereof being fed to conductor 982 by means of a conductor 1016.

Assuming for the moment that the tens digit was not selected, a low signal will be present on input conductor 960, thus low signal being fed to the left input circuit of gate 1010 by means of a conductor 1017. The inverted signal is fed through the gate 1018 to the right input of gate 1012 by means of conductor 1020, this latter signal being high. If the tens bit has not been commanded, the signal level on conductor 840 will be low and the signal level on conductor 842 will be high. Thus, a low and a high input will be present at each input circuit of the gates 1010, 1012. Thus, the output signal levels of these gates 1010, 1012 will be high to produce a high level signal on conductor 1016. Thus, if the particular complex coded address which has been selected exactly matches that which is being sensed, all of the outputs of the coincidence circuits 966, 994, 1000, 1002, 1004, 1006 and 1008 will be at a high level thereby rendering conductor 982 high at coincidence. However, if a particular address binary digit has not been selected but is being sensed, a low signal will be generated on the output conductor of the coincidence circuit. Any low signal will render the conductor 982 low irrespective of the condition of any other output circuit of the coincidence circuit.

In order to establish that assumption, attention is directed again to gate 1004 which includes inputs from the terminal 960 and the conductors 840, 842. Assuming, for example, that a particular address is being sensed but has not been commanded, the signal level on conductor 960 will be high thereby producing a high input to gate 1010. The inverted signal, or a low signal, will be fed to the input circuit of gate 1012 from the inverter 1018. If the particular address bit has not been commanded, the signal level on conductor 840 will be low and the signal level on conductor 842 will be high. Thus, when the situation occurs where a particular address bit is being sensed but has not been commanded or, vice versa, has been commanded but is not being sensed, each of the gates 1010 and 1012 will have identical inputs thereto. In this case gate 1010 includes two high inputs thereto and gate 1012 includes two low inputs. Accordingly, any low imputs produces a high output and two high inputs produces a low output. Any low input to a collector or circuit will produce a low output thereby rendering the signal level on conductor 1016 in the situation given a low signal. Thus, the conductor 982 will be held low.

The output for the coincidence circuits is provided by an output gate 1026 which designates that a particular specified station has been reached. The output signal from gate 1026 is fed to an output terminal 1028, the signal thereon being utilized to change the drive motor speed from high to low speed and to enable the stop switch circuit. It will be recalled that the stop switch circuit is a combination of position indicating means and a switch adapted to engage the position indicating means, the engagement thereof causing the motor to stop at a preselected spot.

However, before a slow speed output signal is generated at output terminal 1028, several conditions are sensed, one being the high level condition of conductor 982 indicating that a match has been achieved. This signal on conductor 982 is fed to the input circuit of nand gate 1030. The nand gate also includes an input from a circuit which designates that any station has been sensed and the system is not sensing false data. This latter signal is generated by and gate 1032 and expander 1034, the input circuits to which are connected to the respective input terminals 952-964 through the inverter gates, for example 976, 990 and 1018, connected to the terminals. Accordingly, when a station address bit switch has been tripped, a low signal will be generated on the input circuit to one of the gates 1032, 1034, to produce a high output signal at an output conductor 1036. This high output signal is fed to the input circuit of the gate 1030 by means of a conductor 1038 and is also fed to an output circuit, designated "on any station," including an output terminal 1040, by means of a conductor 1042.

The third input signal to the gate 1030 is derived from an ambiguity timer circuit 1044 which includes a 100 millisecond single shot multivibrator circuit 1048. During the period that it is timing out, the operation of output 1028 is inhibited. Timer 1044 and the output thereof will remain at a low level until such time as the 100 millisecond timeout cycle is achieved. At the end of the 100 milliseconds, the signal level of an output conductor 1050 will rise to a high level thereby providing all high inputs to the gate 1030. These high signals provide a low signal at the output thereof, this low signal being inverted by gate 1026 to provide a high output signal on terminal 1028.

In the system of the present invention, the on any station signal generated at output terminal 1040 is utilized in the semiautomatic operation of the system as will be seen from a description of board 500. Further, it is to be understood that the system, as presently evolved, will provide only low speed operation when the system is in manual. However, any speed may be achieved in semiautomatic but the work carrier must be either in full-up or full-down position, not an intermediate position, and the work carrier can only stop at a selected station.

Referring now to FIG. 15, there is illustrated the input circuit 1060 for the multi-station register corresponding to addresses 30 and 40, the circuit to be described in conjunction with FIGS. 15-17 being the subsystem which generates the units digit and the multi-station address. As stated above, the multi-station address is generated by sensing a coded right or left and a tens digit followed by an asterisk. The tens digit selects which particular multi-station address is to be utilized. In the situation illustrated, the coded addresses for multistations are 30-79. The circuit to be described in conjunction with FIGS. 15-17 include the addresses 30-39 and 40-49 and the circuit to be described in conjunction with FIGS. 18 and 19 include multistation addresses 50-59, 60-69 and 70-79.

The asterisk symbol following a command to go right or left and a tens digit is decoded by means of an asterisk gate 1062 which includes input signals from a $\overline{5}$, 6 and 7 input terminal 1064 which indicates that the asterisk subgroup has been sensed. The input circuit to gate 1062 also includes a $\overline{1}$ input signal from a terminal 1066 a $\overline{3}$ signal from an input terminal 1068 and a 2 signal from input terminals 1070, 1072. Thus, when a channel $\overline{1}$, 2, $\overline{3}$, 4, $\overline{5}$, 6 and 7 code is generated, the gate 1062 will provide an output pulse to an inverter and buffer gate 1076, the output signal from gate 1076 being impressed on a conductor 1078 which is utilized to enable or strobe the output information as to the units address stored within the system. This output circuit will be described in conjunction with FIG. 17.

A system has been provided for indexing the memory unit which stores the actual address of both the 30-39 and 40-49 storage system. Referring particularly to the 30-39 unit, a manual stepping gate 1082 is provided which includes an input from an automatic input terminal 1084, as fed thereto by means of a conductor 1086, and an input from a step 30 input terminal 1088, as fed thereto by means of an inverter gate 1090 and a conductor 1092. Thus, when the system is not in automatic, a high signal will be generated on conductor 1086 and, when the step 30 switch is actuated, a low pulse will be generated on terminal 1083 which provides a high input pulse to the gate 1082. Thus, a low output signal will be generated on an output conductor 1096. This conductor feeds a signal to the binary coded decimal counter to be described in conjunction with FIG. 15.

A second stepping circuit includes a gate 1098 which includes an input signal from system clock connected to input terminal 1100, the index pulse clock generating pulses on conductor 1102. The gate 1098 also includes an input from an inverted automatic signal which, when the system is in automatic, generates a high signal on a conductor 1104, the automatic signal being inverted by an inverter gate 1106. Thus, clocking pulses being fed to the input circuit of gate 1098 will produce incrementing output pulses on conductor 1096 if an expanded input signal on conductor 1108 is at a high level. This latter circuit, including gate 1098, is used to increment the binary coded decimal counter through a series of unused positions in the multi-station register. When a position is not used, a high signal will be generated on conductor 1108 to permit the clocking pulses on conductor 1102 to increment the counter. When a position in the binary coded decimal to decimal decoder has been utilized, a low pulse will be generated on conductor 1108 to stop the incrementing of the binary coded decimal counter. This will become more apparent from a description of FIG. 16.

A third and final method of incrementing the binary coded decimal counter is an automatic signal generated in response to sensing # coded or programmed into the tape. This code is sensed by means of a gate 1116 which includes input signals from the $\overline{5}$, 6, $\overline{7}$ input terminal 1064, is fed thereto by means of a conductor 1118, a channel 2 signal generated at input terminal 1072 and fed to the input circuit by means of a conductor 1120, a channel $\overline{3}$ signal impressed on input terminal 1068 and fed to gate 1116 by means of a conductor 1124 and a channel 1 and $\overline{4}$ signal impressed on input terminals 1126, 1128 respectively. Thus, when the code of channel 1, 2, $\overline{3}$, $\overline{4}$, $\overline{5}$, 6 and $\overline{7}$ is sensed, an output signal will be generated on an output conductor 1130. This signal is inverted by means of an inverter gate 1132 and fed to the input circuit of an and gate 1134 by means of a conductor 1136. The gate 1134 also includes an input signal from the automatic circuit, specifically from inverter gate 1106 and conductor 1104. The gate 1134 also includes an input from a decoded 30 flip flop unit 1146, the flip flop unit receiving an input from the signal generated at a decoded 30 input terminal 1148 which is present when a 30 address is sensed in the tape. The signal impressed on input terminal 1148 is inverted by means of an inverter circuit 1150, the output of the gate 1150 being impressed on the input circuit of the flip flop unit 1146. Thus, when the decoded 30 signal is sensed, the flip flop 1146 is provided a high signal to enable the flip flop to be set from a strobe pulse at input 1154. The setting of flip flop 1146 enables the gate 1134 by means of a high signal from the output of flip flop 1146. The signal on terminal 1154 is generated from the clock pulse generated on Board 200 (FIGS. 13 and 14).

The flip flop 1146 is reset by a signal being impressed on an input terminal 1156. The reset signal is generated within the system to reset the flip flop, the signal being fed to the lower biased circuit of the flip flop 1146 by means of a conductor 1158. Thus, when the is sensed, a signal is generated on the conductor 1136 and fed through the gate circuit 1134 to increment the circuit to be described in conjunction with FIG. 15.

Referring now particularly to the 40-49 unit, a manual stepping gate 1182 is provided which includes an input from an automatic input terminal 1184, as fed thereto by means of a conductor 1186, and an input from a step 40 input terminal 1188, as fed thereto by means of an inverter gate 1190 and a conductor 1192. Thus, when the system is not in automatic, a high signal will be generated on conductor 1186 and, when the step 40 switch is actuated, a low pulse will be generated on terminal 1188 which provides a high input pulse to the gate 1182. Thus, a low output signal will be generated on an output conductor 1196. This conductor feeds a signal to the binary coded decimal counter to be described in conjunction with FIG. 15.

A second stepping circuit includes a gate 1198 which includes an input signal from an index pulse clock connected to input terminal 1200, the index pulse clock generating pulses on conductor 1202. The gate 1198 also includes an input from an inverted automatic signal which, when the system is in automatic, generates a high signal on a conductor 1204, the automatic signal being inverted by an inverter gate 1206. Thus, clocking pulses being fed to the input circuit of gate 1198 will produce incrementing output pulses on conductor 1196 if an expanded input signal on conductor 1208 is at a high level. This latter circuit, including gate 1198, is used to increment the binary coded decimal counter through a series of unused positions in the multi-station register. When a position is not used, a high signal will be generated on conductor 1208 to permit the clocking pulses on conductor 1202 to increment the counter. When a position in the binary coded decimal to decimal decoder has been utilized, a low pulse will be generated on conductor 1208 to stop the incrementing of the binary coded decimal counter. This will become more apparent from a description of FIG. 16.

A third and final method of incrementing the binary coded decimal counter is an automatic signal generated in response to sensing # coded or programmed into the tape. Thus, when the code of channel 1, 2, $\overline{3}$, $\overline{4}$, $\overline{5}$, 6, and $\overline{7}$ is sensed, an output signal will be generated on an output conductor 1130. This signal is inverted by means of an inverter gate 1132 and fed to the input circuit of an and gate 1234 by means of a conductor 1236. The gate 1234 also includes an input signal from the automatic circuit, specifically from inverter gate 1106 and conductor 1104. The gate 1234 also includes an input from a decoded 40 flip flop unit 1246, the flip flop unit receiving an input from the signal generated at a decoded 40 input terminal 1248 which is present when a 40 address is sensed in the tape. The signal impressed on input terminal 1248 is inverted by means of an inverter circuit 1250, the output of the gate 1250 being impressed on the input circuit of the flip flop unit 1246. Thus, when the decoded 40 signal is sensed, the flip flop 1246 is provided a high signal to enable the flip flop to be set from a strobe pulse at input 1154. The setting of the flip flop 1246 enables the gate 1234 by means of a high signal from the output of flip flop 1246. The signal on terminal 1154 is generated from the clock pulse generated on Board 200 (FIGS. 13 and 14).

The flip flop 1246 is reset by a signal impressed on the input terminal 1156. The reset signal is fed to the lower biased circuit of the flip flop 1246 by means of a conductor 1258. Thus, when the number is sensed, a signal is generated on the conductor 1236 and fed through the gate circuit 1234 to increment the circuit to be described in conjunction with FIG. 15. Also, a reset 30 pulse is generated on an input terminal 1139 which is utilized to reset the binary coded decimal counter circuit to be described in conjunction with FIG. 16.

It is to be noted that both gates 1062 and 1116 include inhibit circuits from the alternate cycle system wherein the operation of the gates 1062 and 1116 is inhibited in response to an input signal generated on input terminal 1166. The inhibit circuits include a pair of conductors 1168, 1170 which are connected to the expander sections of the gates 1116, 1062 respectively. The circuits also include a pair of diodes 1172, 1174 to isolate the inhibit circuits from the remainder of the system.

Referring now to FIG. 16 there is illustrated another portion 1270 of the multi-station register sub-system, the circuit of FIG. 16 particularly illustrating the binary coded decimal counters and the binary coded decimal to decimal converters. Specifically, the system includes a binary coded decimal counter circuit 1272 for the 30-39 multi-station addresses, a binary coded decimal to decimal converter circuit 1274 for the thirties' addresses, a binary coded decimal counter circuit 1276 and a binary coded decimal to decimal converter ccircuit 1278 for the 40-49 multi-station addresses.

Referring now to the thirties binary coded decimal counter circuit 1272, the circuit includes a plurality of flip flop units 1280, 1282, 1284, 1286 which correspond to bits 1, 2, 4 and 8 respectively. The flip flops 1280–1286 are interconnected to provide a binary indication of a decimal number, as in common in the art, the circuit being similar to that described previously. The circuit 1272 also includes a first isolating diode 1290 which is interconnected between the input circuit of flip flop 1286 and the output circuit of flip flop 1282 and a second diode 1292 connected between the input circuit of flip flop 1286 and the output circuit of flip flop 1284. The diodes 1290 and 1292 are connected to form an and gate similar to that described in conjunction with binary coded decimal counter 602 of FIG. 12.

The outputs of each of the flip flops 1280, 1282, 1284, 1286 are fed to the input circuit of a binary coded decimal to decimal converter unit 1296 by means of conductors 1298, 1300, 1302, 1304 respectively. These outputs are also fed to the output circuit to be described in conjunction with FIG. 17 by means of conductors 1306, 1303, 1310 and 1312 respectively. The binary coded decimal to decimal converter includes output circuits from 0 to 9, these output circuits, including output terminals numbered 0 to 9 as indicated on the drawing and given reference numeral 1316. These output terminals are adapted to be connected to a second set of terminals 1318, for example by patch pins, which are connected to the input circuits of a pair of and gates 1320, 1322, the gates 1320, 1322 being utilized to collect all of the signals being generated from the set of terminals 1316 to the corresponding terminals 1318.

As was stated above, the signal on conductor 1096 is utilized to increment the binary coded decimal counter 1272. The digits stored in the binary coded decimal counter corresponds to the units digit to be fed back to the circuit described in conjunction with FIGS. 13 and 14 to provide the units digit in the case of a multi-station address. However, certain addresses within a particular block may or may not be utilized in accordance with the particular configuration of the electroplating system being controlled. For example, it is possible that only addresses 30, 31, 32 and 33 are utilized and addresses 34-39 not utilized. Thus, if a particular address is to be utilized, a patching pin is connected between, for example, the zero pin 1316 and the zero pin 1318 to provide a connection therebetween. The same thing occurs for addresses 1, 2 and 3.

As the incrementing signal is generated on conductor 1096, the binary coded decimal to decimal decoder will also be incremented to provide output signals to the output terminal 1316. If a pin has been placed in a particular address, then a low signal will be generated at the output circuit to gates 1320, 1322, and thus on conductor 1108. It will be recalled from the description of FIG. 15, the low signal on conductor 1108 is fed to the expander input circuit to gate 1098 and will disable the gate 1098 to preclude any further incrementing pulses from being fed to the binary coded decimal counter 1272. However, if a particular address is not provided with a pin, for example position 4, a high output signal will be generated at the output terminal of gate 1320, or gate 1322 in the case of higher numbers. This high signal will be fed to the input circuit of gate 1098 to continue incrementing pulses through the gate 1098 to the counter 1272. This high signal will remain to enable the gate 1098 until such time as a pin is reached.

Referring now to the lower portion of FIG. 16 there is illustrated the binary coded decimal counter circuit 1276 for the 40-49 multi-station addresses and a binary coded decimal to decimal converter circuit 1278 for the forties addresses. Referring now the forties binary coded decimal counter circuit 1276, the circuit includes a plurality of flip flop units 1330, 1332, 1334, 1336 which corresponds to bits 1, 2, 4 and 8 respectively. The flip flops 1330-1336 are interconnected to provide a binary indication of a decimal number, as is common in the art, the circuit being similar to that described previously.

The outputs of each of the flip flops 1330-1336 are fed to the input circuit of a binary coded decimal to decimal converter unit 1346 by means of conductors 1348, 1350, 1352, 1354 respectively. These outputs are also fed to the output circuit to be described in conjunction with FIG. 17 by means of conductors 1356, 1358, 1360 and 1362 respectively. The binary coded decimal to decimal converter includes output circuits from 0 to 10, these output circuits, including output terminals numbered 0 to 9 as indicated on the drawing and given reference numeral 1366. These output terminals are adapted to be connected to a second set of terminals 1368, for example by patch pins, which are connected to the input circuits of a pair of and gates 1370, 1372, the gates 1370, 1372 being utilized to collect all of the signals being generated from the set of terminals 1366 to the corresponding terminals 1368.

As was stated above, the signal on conductor 1196 is utilized to increment the binary coded decimal counter 1276. The digits stored in the binary coded decimal counter corresponds to the units digit to be fed back to the circuit described in conjunction with FIGS. 13 and 14 to provide the units digit in the case of a multistation address. However, as stated above, certain addresses within a particular block may or may not be utilized in accordance with the particular configuration of the electroplating system being controlled. Thus, if a particular address is to be utilized, a patching pin is connected between, for example, the zero pin 1366 and the zero pin 1368 to provide a connection therebetween. The same thing occurs for the remaining addresses to be used.

As the incrementing signal is generated on conductor 1196, the binary coded decimal to decimal decoder will also be incremented to provide output signals to the output terminals 1316. If a pin has been placed in a particular address, then a low signal will be generated at the output circuit to gates 1370, 1372, and thus on conductor 1208. It will be recalled from the description of FIG. 15, the low signal on conductor 1208 is fed to the expander input circuit to gate 1198 and will disable the gate 1198 to preclude anymore incrementing pulses from being fed to the binary coded decimal counter 1276. However, if a particular address is not provided with a pin, for example position 4, a high output signal will be generated at the output terminal of gate 1370, or gate 1372 in the case of higher numbers. This high signal will be fed to the input of gate 1198 to continue incrementing pulses through the gate 1198 to the counter 1276. This high signal will remain to enable the gate 1198 until such time as a pin is reached.

Referring now to FIG. 17, there is illustrated the output section for the multi-station registers 30 and 40. Particularly, the binary coded decimal digits stored in the thirties register 1272 is fed to the input circuit of a binary 1 gate 1380 by means of the conductor 1306, a binary 2 gate 1382 by means of the conductor 1308, a binary 4 gate 1384 by means of the conductor 1310 and a binary 8 gate 1386 by means of the conductor 1312. The output of the decoded 30 flip flop 1146, in addition to being fed to enable gate 1134, is also fed as an enabling signal to gates 1380-1386 by means of a conductor 1388. Thus, when a 30 is decoded, the gates 1380, 1382, 1384 and 1386 are enabled thereby permitting any stored address within the register 1272 to be fed forward through the gates 1380-1386.

If a particular binary digit is stored, the input signal level to the respective gates 1380-1386 will be a high level signal. The strobe signal is also high because of the set condition of flip flop 1146 thereby producing two high input signals to the corresponding gate for a particular binary address bit. This condition will produce a low output signal at the output terminal of the corresponding gates 1380-1386.

The outputs of these latter gates are fed to the input circuit of a plurality of 30 and 40 coordinating gates 1390, 1392, 1394 and 1396, the gates 1390 to 1396 also including input signals from a set of forties gates 1400, 1402, 1404 and 1406 which correspond to gates 1380–1386 in the thirties section. The gates 1400–1406 also include inputs from the binary coded decimal register 1276 by means of the conductors 1356–1362. This data is also strobed through the gates 1400–1406 by means of a high signal on conductor 1408 which is connected to the output circuit of the decoded 40 flip flop 1246. Again, if a particular forties binary digit is present in the register 1276, the signal level on the corresponding conductors 1356–1362 will be high which will be combined with the high enable pulse on conductor 1408 to pass the data through the gates 1400–1406.

Thus, if a thirty is decoded, all of the output signals from the gates 1400–1406 will be at a high level and the data bits which are present in the 30 register 1272 will be at a low level and the remaining outputs from the gates 1380–1386 will be high. Accordingly, one input signal level to a corresponding gate 1390 to 1396 will be low, this signal being present for the particular tens group which has been decoded, either thirty or forty, and also for the particular binary bit present in the thirty or forty register 1272, 1276. The two high signals into any one of the gates 1390–1396 will produce a low output signal level at that gate and any low input signal to a gate 1390–1396 will produce a high output signal level at that gate.

The outputs from gates 1390–1396 are fed to final output gates 1410, 1412, 1414 and 1416, these gates also including an input strobe signal on conductor 1078. The strobe signal is generated from the output of the inverter gate connected to the asterisk and gate 1062 discussed in conjunction with the description of FIG. 15. This the signal is at a high level when the asterisk is sensed which combines with the high signal for the corresponding gate 1390–1396 energized from the corresponding tens group having a particular binary digit stored therein. Thus, if a thirty was decoded and a binary 1 was stored in the register 1272, a low output signal will be generated at a multi 1 output terminal 1418 due to the presence of two high input signals to the gates 1410. Multi 2, multi 4, multi 8 output signals are provided on output terminals 1420–1424. The coordinator gates 1390 to 1396 also include input signals from the circuit to be described in conjunction with FIG. 19. The circuit of FIG. 19 does not include output gates corresponding to gates 1410 to 1416. Thus, the signals at input terminals 1428 to 1434 are fed through gates 1390 to 1396 respectively, these latter signals corresponding to the fifty to fifty-nine, sixty to sixty-nine and seventy to seventy-nine multi-station addresses. Thus, the fifty to seventy-nine multi-station addresses will appear at output terminals 1418 to 1424 for connection into the input circuitry of the PCB 200 subsystem.

Figure 18:
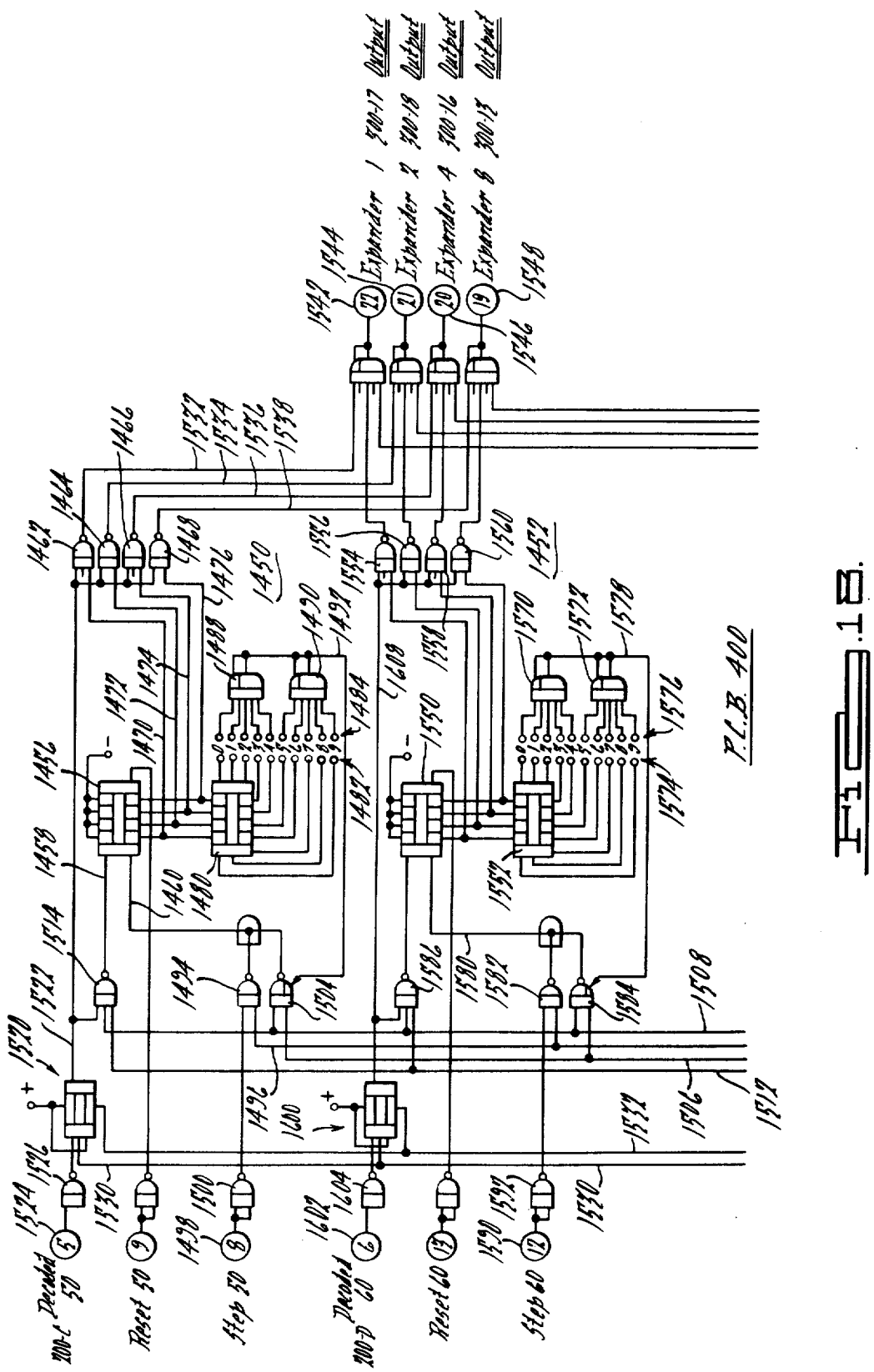
FIG. 18 is a portion of a second multi-station register schematic diagram and particularly illustrating a portion of the input section, a portion of the binary coded decimal counters and a portion of the output section thereof.

Referring now to FIG. 18, there is illustrated a 50–59 multi-station address register 1450 and a 60–69 multi-station register 1452. The address registers 1452 are similar to those described in conjunction with FIGS. 15 to 17 with the exception that the asterisk and circuits are common for all of the multi-station address registers and are only provided on the PCB 300. Referring specifically to the system 1450, a binary coded decimal counter circuit 1456 is adapted to be provided with input signals on an input conductor 1458 and a second input conductor 1460 to increment the binary coded decimal counter in response to pulses generated on the conductors 1458 to 1460. The binary coded decimal counter 1456 is identical to that described in conjunction with FIG. 16, particularly circuits 1272 and 1276, the units performing identically even though the circuits are illustrated differently.

The output of the binary coded decimal counter is fed to a plurality of output gates 1462, 1464, 1466 and 1468 which correspond to binary bits 1, 2, 4 and 8, these signals being fed thereto by means of conductor 1470, 1472, 1474 and 1476. Thus, if a particular binary bit is stored in the binary coded decimal counter 1456, a high signal will be impressed on the respective conductor 1470 to 1476 and thus to the input circuit to gates 1462 to 1468.

The output signals from the binary coded decimal counter 1456 are also fed to a binary coded decimal-to-decimal converter circuit 1480 which includes output circuits zero to nine. These output signals are fed to a first set of zero to nine terminals 1482 which are in turn patched to a second set of terminals 1484, also corresponding to the zero to nine addresses. As was the case with FIG. 16, the selective connections are made by patching pins which patch the corresponding terminal of set 1482 to the corresponding terminal of set 1484. Thus, as the binary coded decimal register 1456 is indexed by means of pulses on conductors 1458 or 1460, the decimal converter circuit 1480 is also indexed or incremented. This causes signals to be generated on terminals 1482 and fed forward to terminals 1484 in the case where the two sets of terminals have been patched by pins. This system is utilized, as was the case with FIG. 16, to sense which particular addresses are being utilized in the system and which are not to be used.

The output signals are fed to a pair of expanders 1488, 1490 which collect all of the signals and generate a high or low signal on output conductor 1492 in accordance with whether a particular address is being used. Accordingly, if an address is not being used, a high signal will be generated on conductor 1492 and, vice versa a low signal will be generated when a particular pin has been placed across the corresponding sets of terminals 1482, 1484.

Again, a system has been provided for indexing the memory unit which stores the actual addresses of the 50-59 storage system. Particularly, a manual stepping gate 1494 is provided which includes an input from an automatic input terminal, to be described in conjunction with FIG. 18, as fed thereto by means of a conductor 1496. Thus, when the system is not in automatic, a high signal will be generated on conductor 1496 and, when a step 30 switch is actuated, a low pulse will be generated on a step 30 input terminal 1498, this signal being inverted by an inverter circuit 1500 and fed to the gate and a high signal will be fed to the input circuit of the gate 1494. Thus, a low output signal will be generated on the output conductor 1460.

Figure 19:
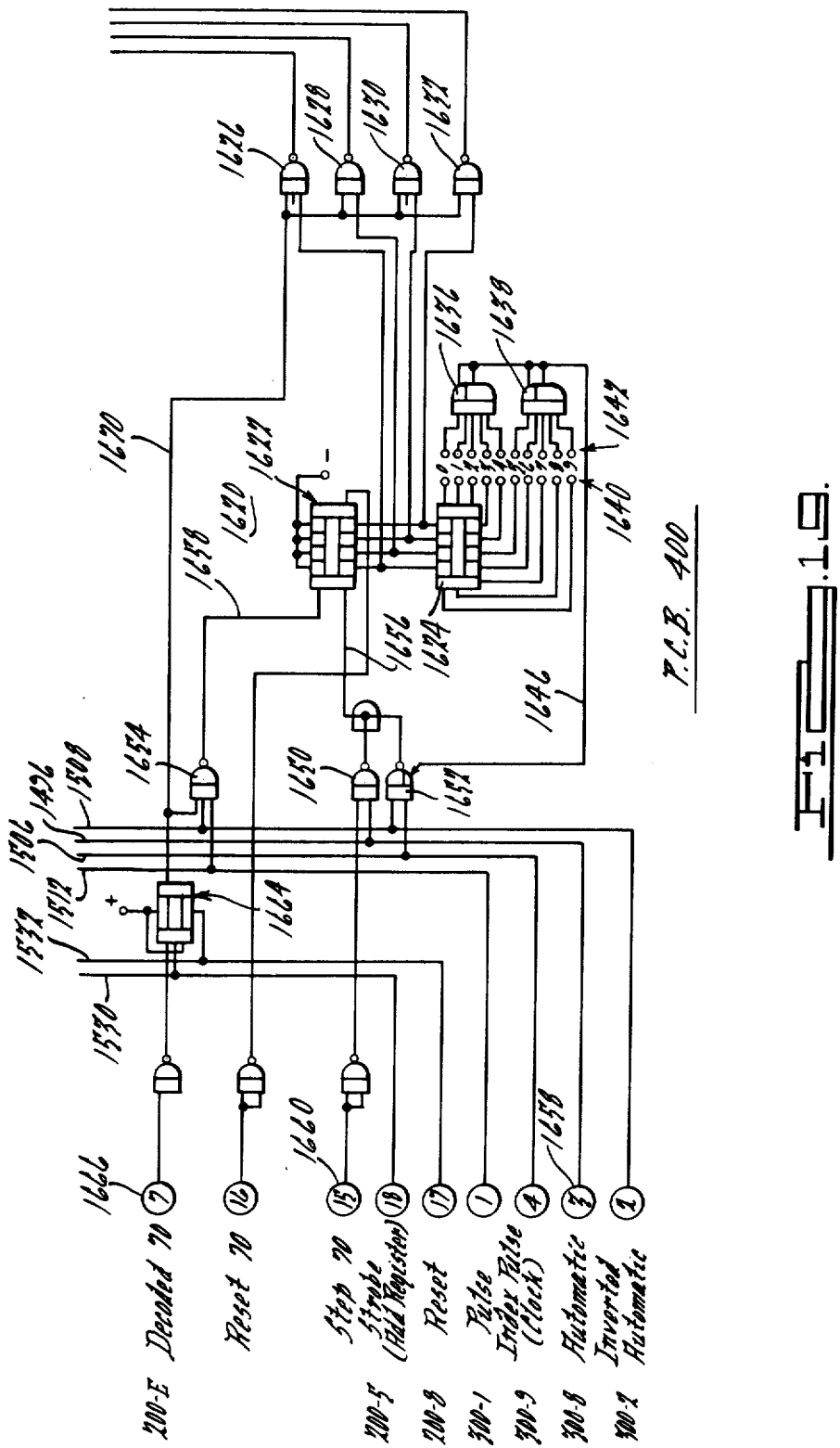
FIG. 19 is the remaining portion of the multi-station register schematic diagram and illustrating the remaining input portion, binary coded decimal counters and the remainder of the output section.

A second stepping circuit includes a gate 1504, which is provided an input signal from an index pulse clock connected to an input terminal to be described in conjunction with FIG. 19. This signal is fed to the gate 1504 by means of a conductor 1506. The gate 1504 also includes an inverted automatic signal generated on an input terminal to be discussed in conjunction with FIG. 19, this signal being fed to the gate 1504 by means of a conductor 1508. Thus, clocking pulses being fed to the input circuit of gate 1504 will produce incrementing output pulses on conductor 1460 if the expanded input signal on conductor 1492 is high and automatic is on (conductor 1508 high). This will occur when no pin is present in the corresponding terminals 1482, 1484 for a particular address.

Thus, the binary coded decimal counter 1456 and the converter circuit 1480 will increment through the series of unused addresses, if any are present, until such time as a selected address is present. When the pin is sensed, a low signal will be generated on conductor 1492 which will inhibit gate 1504 and thus preclude any pulses from being generated on conductor 1460 by the gate 1504. A third method of incrementing the binary coded decimal counter is an automatic signal generated in response to sensing the code which has been programmed into the tape. This code is sensed by the circuit described in conjunction with FIG. 15 which includes a code of channel 1, 2, $\overline{3}$, $\overline{4}$, $\overline{5}$, 6 and $\overline{7}$. When this code is sensed, a signal will be generated on an input terminal to be described in conjunction with FIG. 19 and a signal is impressed on conductor 1512. This signal is fed to the input circuit of a gate 1514, the gate also including a signal from the inverted automatic circuit connected to the input circuit of the gate 1514 by means of the conductor 1508.

The gate 1514 is enabled in response to the setting of a decode 50JK flip flop unit 1520, the flip flop 1520 being connected to the gate 1514 by means of a conductor 1522. When the fifty address is sensed, a signal is generated on an input terminal 1524 and fed to the input setting circuit of the flip flop 1520 by means of a gate 1526. Thus, when the decode 50 signal is sensed, the flip flop 1520 is enabled by a high signal being fed to the J input to the flip flop 1520. This permits the flip flop to be set by the next clock pulse generated on an input conductor 1530, the clock pulse being described in conjunction with single shot multivibrator circuit 810 (FIG. 13). The flip flop 1520 is reset by means of a pulse generated on conductor 532, this resetting pulse being the same reset pulse that was utilized to reset flip flops 1146 and 1246. Thus, the setting of flip flop 1520, and the generation of a high signal on conductor 1522, enables the gate 1514 to produce incrementing pulses on conductor 1458 each time that the is sensed. This enabling signal, at conductor 1522, is also fed to the input circuits of gates 1462 to 1468 to enable the information stored in the binary coded decimal register circuit 1456 to be fed to the output conductors 1532, 1534, 1536 and 1538.

The signals on these latter conductors are fed through a plurality of expanders to output terminals 1542, 1544, 1546 and 1548, the output signals from these expanders being fed to the input circuit of gates 1390 to 1396 described in conjunction with FIG. 17. These signals are fed by means of conductors connected to input terminals 1428 to 1434.

The 60 to 69 circuit 1452 is identical to that described above and includes the binary coded decimal register 1550, the output of which is connected to a binary coded decimal-to-decimal converter circuit 1552 and to the input circuits of a plurality of gates 1554, 1556, 1558 and 1560 corresponding to bits 1, 2, 4 and 8. The outputs of gate 1554 to 1560 are also fed through a plurality of expanders to output terminals 1542 to 1548 to provide a signal corresponding to any binary bits that are stored in register 1550. If a bit is not stored in either register 1456 or 1550, a high signal will be generated at the output terminals 1542 to 1548 corresponding to that particular bit. On the other hand, a low signal will be provided at the input circuit thereof corresponding to a stored bit. Note that one register is used at a time.

As was the case above, the decoder circuit 1552 is utilized to provide signals to a pair of expanders 1570 and 1572, the signal varying in response to a decoder signal and whether a pin has been provided across corresponding pairs of terminals in sets 1574, 1576. If a pin is not present, a high output signal will be generated on an output conductor 1578. Otherwise, a low signal will be generated thereon.

The binary coded decimal counter 1550 is indexed in response to output pulses generated on a conductor 1580 by means of one of a plurality of gates 1582, 1584, 1586 corresponding in function to gates 1494, 1504 and 1514 respectively. As was the case above, the gate 1532 generates an incrementing pulse in response to a step signal generated on an step 60 input terminal 1590, as inverted by an inverter circuit 1592. The gate 1582 also includes an input signal from the automatic circuit, as generated on conductor 1496, to indicate that the system is not in automatic.

The second incrementing pulse circuit 1584 includes input signals from the inverted automatic circuit, as fed thereto by means of a conductor 1508, and from an index pulse clock circuit, the pulse being fed to the gate 1584 by means of the conductor 1506. The gate 1584 also includes a input signal from the converter circuit, as fed to the expanded portion of the gate 1584 by means of a conductor 1578. Thus, when a pin is not present across corresponding terminals 1574, 1576, a high signal will be generated on conductor 1578 to permit the clock pulses to increment the binary coded decimal register 1550.

The third incrementing circuit includes input signals from the pulsing circuit as fed thereto by means of the conductor 1506, an inverted automatic signal as fed thereto by conductor 1508 and the enabling signal for the gate 1584 as generated by means of a decode 60 JK flip flop circuit 1600. When the 60 is decoded, an input signal is generated on terminal 1602, inverted by circuit 1604, and fed to the J input terminal of flip flop 1600. This enables the flip flop to be set, the actual setting occurring in response to the generation of a pulse on conductor 1530. As was the case above, the flip flop 1600 is reset by the signal generated on conductor 1532. The enabling signal from flip flop 1600 is also fed to the input circuit of gates 1554 to 1560 by means of a conductor 1608, this signal on conductor 1608 feeding the data from the binary coded register 1550 through the expanders to output terminals 1542 to 1548.

Referring now to FIG. 19, there is illustrated the 70–79 multi-station address register circuit 1620 which includes a binary coded decimal register 1622 and a binary coded decimal-to-decimal converter circuit 1624, this circuit again being identical to that described above. The output of the binary coded decimal register is fed through a plurality of expanders to output terminals 1626, 1628, 1630 and 1632 and to the input circuit of the converter circuit 1624. The output of the converter circuit is fed to a pair of expanders 1636, 1638 through two sets of terminals 1640, 1642 which may or may not be pinned by patch pins in accordance with the desired multi-station addresses to be utilized. If a station is not used, a high output signal is generated from converter circuit 1624 to a conductor 1646 through the expanders 1636–1638.

The incrementing of the binary coded decimal register is accomplished by output pulses from gates 1650, 1652 and 1654, these incrementing pulses being generated on conductors 1656, 1658. Referring to the first gate 1650, if the system is not in automatic, as evidenced by a high signal being fed to input terminal 1658 and the conductor 1496, and a step 70 signal is generated by a manual switch or some other manual circuit, this latter circuit generating an input pulse on an input terminal 1660, a manual step signal will increment the counter 1622. The index pulse on conductor 1506 will increment the binary coded decimal counter through the gate 1652 if the system is in automatic, as sensed by the signal or conductor 1508, and if no pin is presented across the corresponding terminal 1642, as evidenced by a high signal on conductor 1646. Also, the binary coded decimal counter will be incremented in response to pulses generated on conductor 1512 if the system is in automatic and if a JK flip flop 1664 has been set by decoding a 70 signal, this latter condition being evidenced by a low signal on an input terminal 1666. The output of the flip flop 1664 is also fed to gates 1626 to 1632 by means of a conductor 1670 to feed the information stored in the binary coded decimal register 1622 through the expanders to output terminals 1542 to 1548 described in conjunction with FIG. 18.

Figure 20:
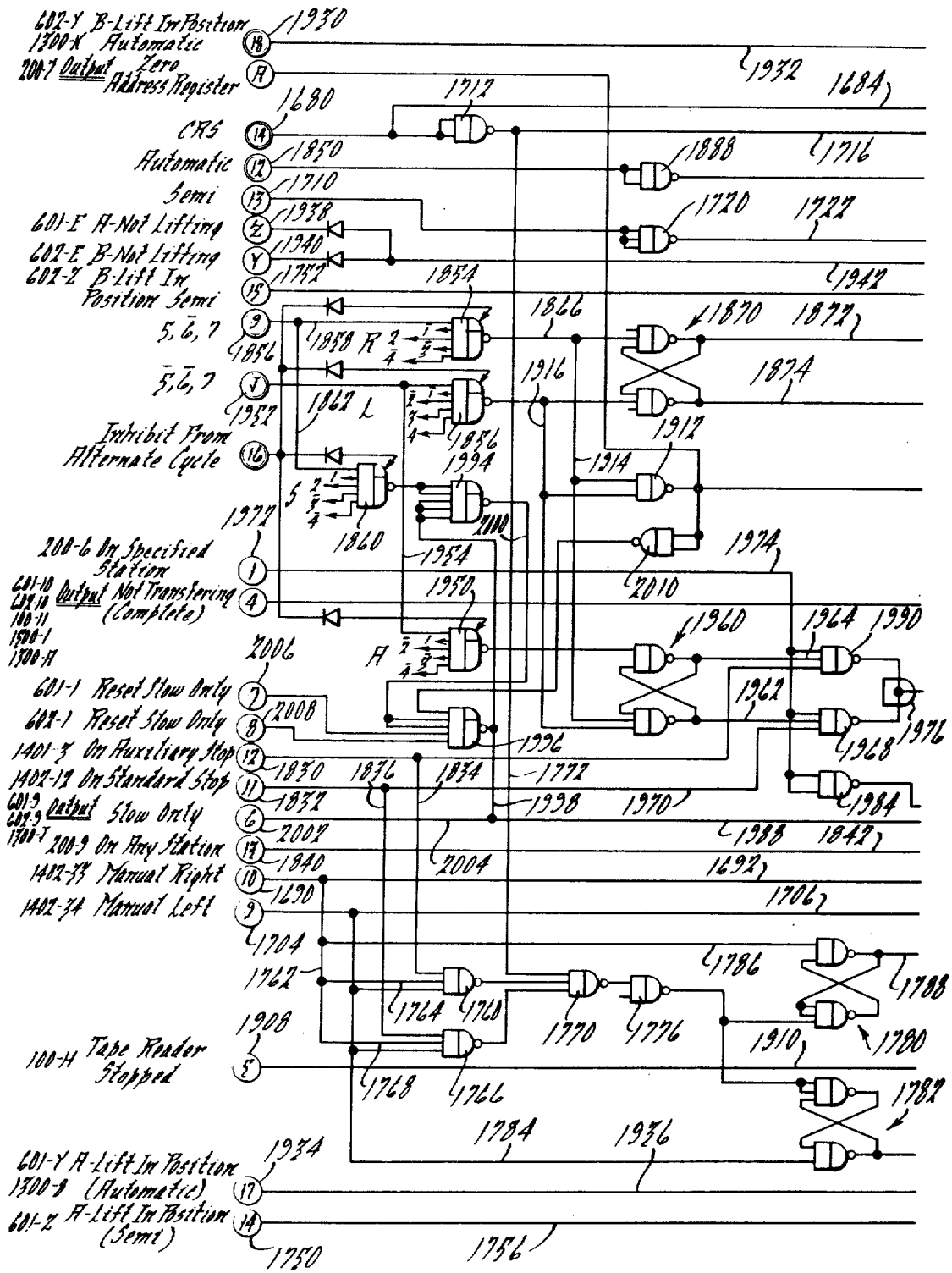
FIG. 20 is a portion of a transfer control schematic diagram and particularly illustrating the input section thereof.
Figure 21:
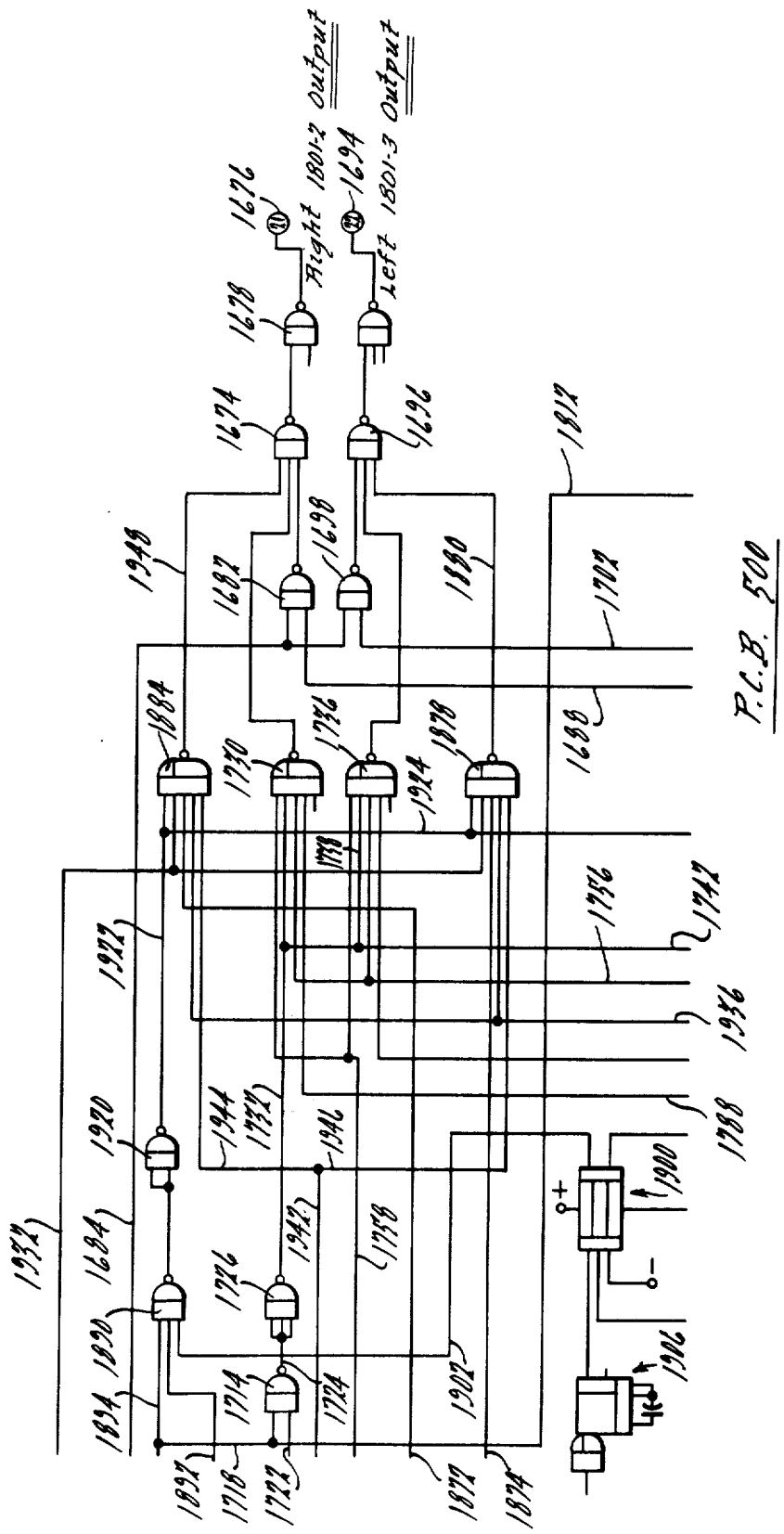
FIG. 21 is a schematic diagram of another portion of the transfer control circuit and particular illustrating the left and right output sections thereof.
Figure 22:
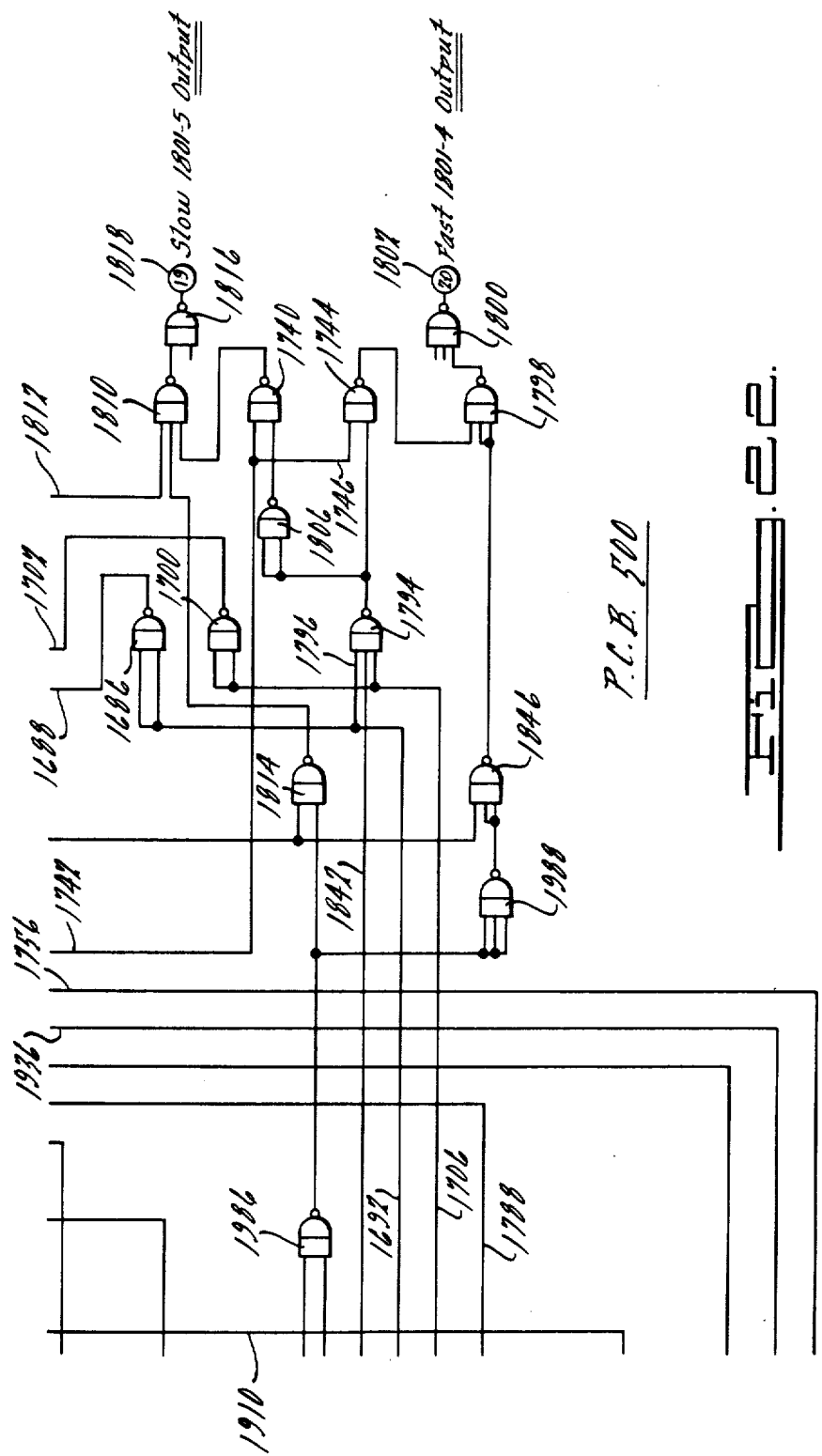
FIG. 22 is a schematic diagram illustrating the remaining portion of the transfer control circuit and particularly illustrating the slow and fast output section thereof.

Referring now to FIGS. 20, 21 and 22, there is illustrated the transfer control circuit for controlling the operation of the work carrier and hoist assembly in the right, left, slow and fast modes of operation. Specifically, the circuit of FIGS. 20 to 22 responds to four automatic, coded commands; the letter R for right transfer, the letter L for left transfer, the letter A for auxiliary stop and the letter S for slow speed, the auxiliary stop code being an alternate stopping position. The circuit also includes manual operations, such as right and left motor direction control from a manual control travelling along with the work carrier or stationary relative to the plating tanks.

Referring first to the manual circuits, the right motor starter is controlled by an output gate 1674 (FIG. 21), the output of which is connected to a right output terminal 1676 through an inverter gate 1678. When a low output signal is generated at output terminal 1676, the low signal is fed to an output driver causing the right motor starter to be energized. A low output signal at conductor 1676 is created by a low input signal at the input terminals of gate 1674. The manual portion of the operation is controlled, in part, by a signal level at a CRS input terminal 1680 (FIG. 20) which, when the CRS is off, causes a high input signal to the input terminal 1680. This signal is fed to the input circuit of a nand gate 1682 by means of a conductor 1684. The gate 1682 also includes an input from a manual inverter gate 1686, the output of which is connected to the input circuit of the gate 1682 by a means of a conductor 1688. The input of gate 1686 is fed from a manual right input terminal 1690 which, when the manual right switch has not been actuated, is normally high. When the manual right switch is actuated, the terminal at 1690 goes low to provide a low input signal to the gate 1686. This low input signal creates a high signal on conductor 1688 to actuate the right motor starter through gates 1682, 1674, 1678 and output conductor 1676.

A similar condition exists for the left motor starter circuit which is energized in response to a low output signal on left output terminal 1694. The signal level at output terminal 1694 is controlled by a nand gate 1696, which in turn is provided an input signal from a nand gate 1698, gate 1698 including an input signal from the CRS input terminal 1680 and conductor 1684, which senses when the CRS is off to provide a high input signal to the gate 1698. The gate 1698 also includes an input signal from an inverter gate 1700 by means of a conductor 1702, the gate 1700 being fed an input signal from a manual left input terminal 1704 by means of a conductor 1706. When the manual left circuit is not actuated, the terminal 1704 is normally high. When the manual left switch is closed, the signal level in input 1704 goes low, this signal being inverted by the gate 1700 and a high signal is fed to the input circuit of gate 1698. Thus, the left motor starter is energized in response to the closing of the manual left switch. Both the right and left motor starters are de-energized in response to the opening of the manual-right, manual-left switches.

Referring now to the semi-automatic operation of the machine, the assembly is capable of being operated by actuating the manual switch wherein the work carrier will transfer at high speed toward the next station either to the right or to the left. Upon sensing the proximity of the next station, the system will automatically switch to low speed until the exact position of the station is reached. At this time the system will turn off and the carrier will come to rest at the next station to the right or left. In this way the operator can hold the manual switch, either right or left, closed until the desired station is approached, thereby transferring the work carrier at high speed to the desired station. Upon approaching the desired station the manual switch may be released and this system will automatically position the work carrier at exactly the right point along the work stations.

When the system is set in semi-automatic, the semi-automatic input terminal 1710 is low. The CRS input 1680 is also low, the CRS input being inverted by an inverter gate 1712 and fed to the input circuit of a nand gate 1714 by means of a conductor 1716 and a conductor 1718. The low semi-automatic signal is also inverted by an inverter gate 1720 and fed to the input circuit of the gate 1714 by means of a conductor 1722. The two high signals into gate 1714 producing a low output therefrom on conductor 1724, the low output being inverted by a gate 1726. The output of gate 1726, being high at this point, is fed to the input circuit of a multi-input nand gate 1730 by means of a conductor 1732. This high signal on conductor 1732 is also fed to the input circuit of a nand gate 1736 by means of a conductor 1738 and into the input circuit of a nand gate 1740 by means of a conductor 1742. This signal on conductor 1742 is also fed to the input circuit of a nand gate 1744 by means of a conductor 1746.

Figure 23:
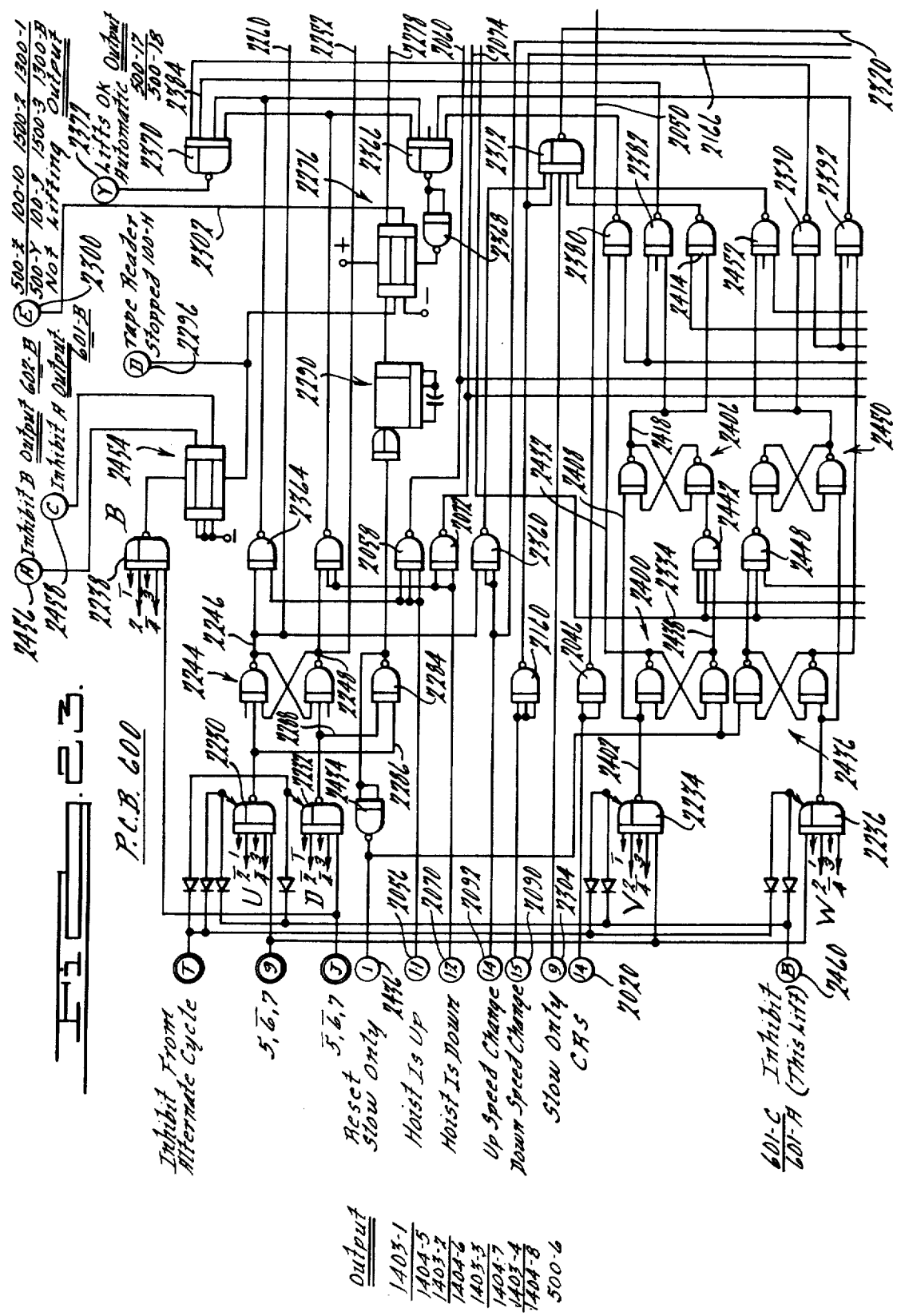
FIG. 23 is a schematic diagram illustrating a portion of the lift control circuit and particularly the upper input section thereof.
Figure 24:
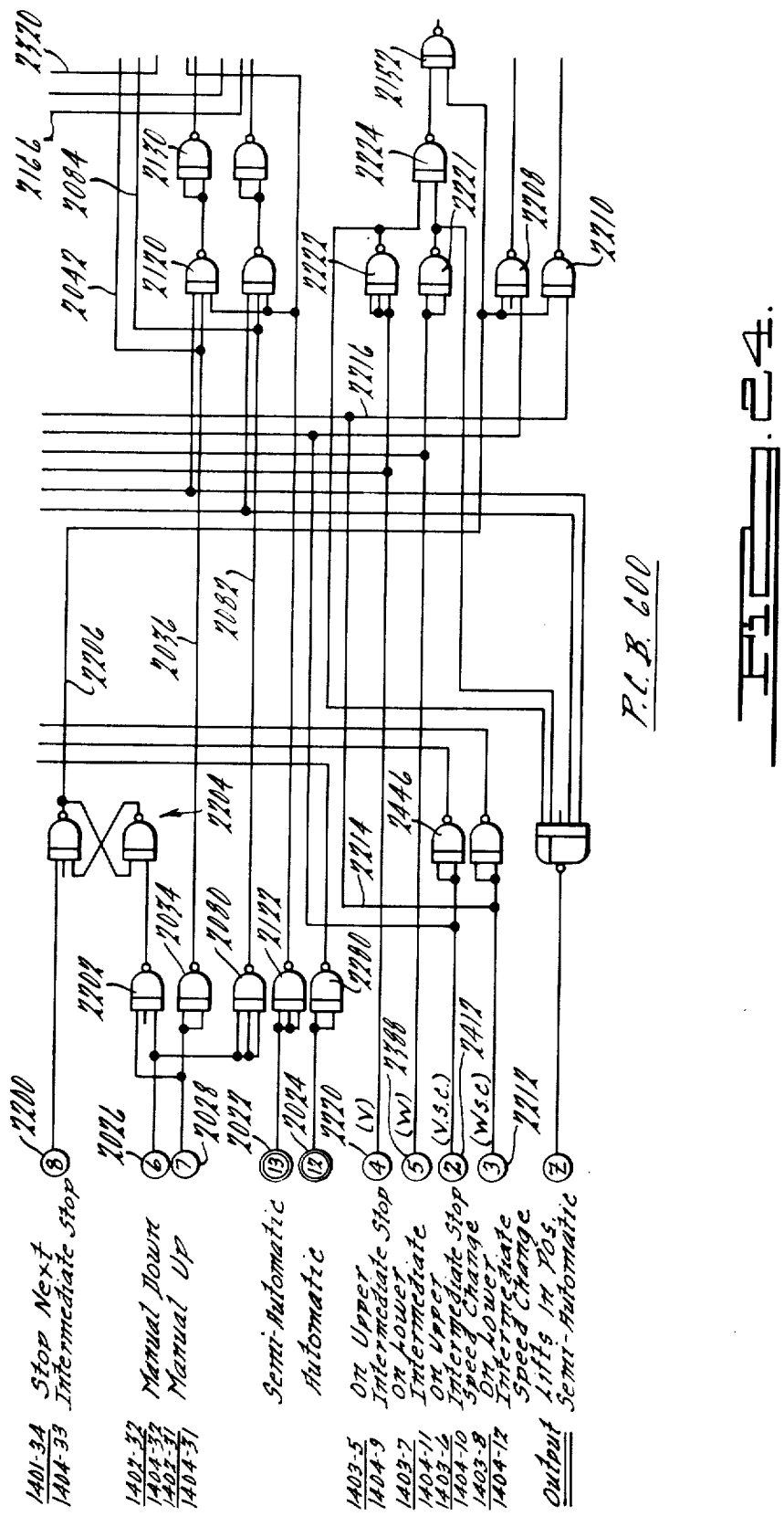
FIG. 24 is a schematic diagram illustrating another portion of the lift control circuit and particularly illustrating the details of the lower input section.
Figure 25:
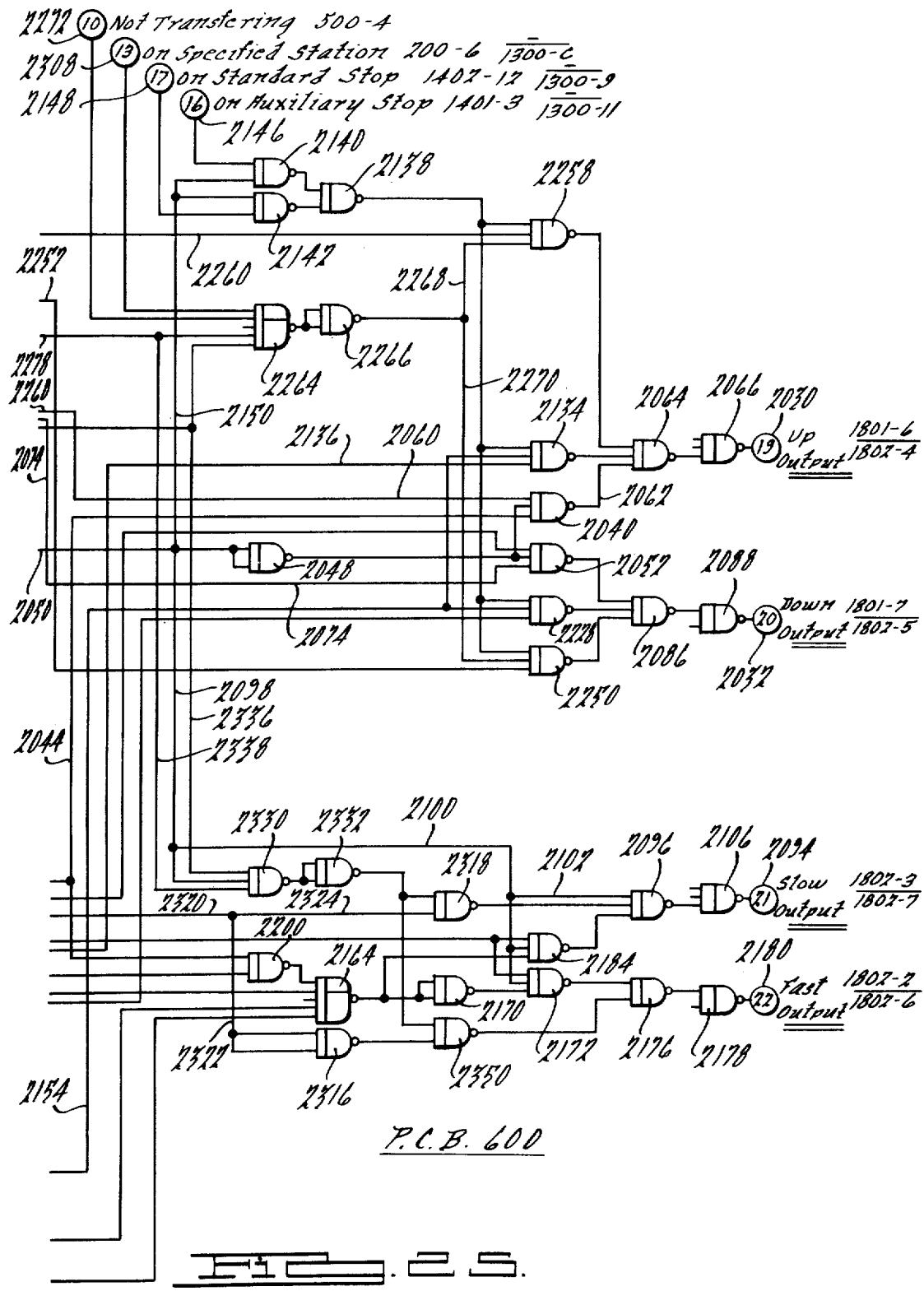
FIG. 25 is a schematic diagram illustrating the remaining portion of the lift control circuit and particularly illustrating the output section thereof.

For a transfer in the semi-automatic mode of operation, the work lift must be in either the up, down or an intermediate position which includes a microswitch for sensing the intermediate position. These position signals are derived from PCB 600 to be described in conjunction with FIGS. 23 to 25. In the case where two lifts are being utilized, the lifts have been designated lift A and lift B and the corresponding sensing signals have been so designated and are sensed by means of signals on an input terminal 1750 for the A lift and terminal 1752 for the B lift, these terminals being labeled A lift in position, B lift in position, respectively. These signals are high when the lift is in position and are fed to the input circuits of both gates 1730 and 1736, the A lift signal being fed thereto by means of a conductor 1756 and the B lift signal being fed thereto by means of a conductor 1758.

For a right transfer, unput terminal 1690 is rendered low, this low signal being fed to the input circuit of a nand gate 1760 by means of conductors 1762 and a conductor 1764. This latter signal is also fed to the input circuit of a second nand gate 1756 by means of a conductor 1768, the low signal causing the outputs of both the gates 1760 and 1766 to be rendered high. The outputs of gates 1760 and 1766 are both fed to the input circuit of a nand gate 1770, these latter high signals being combined with a high signal on a conductor 1772 feeding the output signal from gate 1712 to the input circuit of the gate 1770. In the semi-automatic operation, the CRS input is low, thereby providing a high signal on conductor 1772.

Thus, the input signals to gate 1770 are all high thereby providing a low output signal from the gate 1770. This latter signal is inverted by means of a gate 1776, the output of gate 1776 being fed to the input circuit of a flip flop circuit 1780, the signal from the gate 1776 enabling the flip flop 1780. The output of gate 1776 is also fed to a second flip flop circuit 1782, but this latter flip flop is not affected by the signal level from gate 1776 due to the fact that the input signal on the manual left input terminal 1704 is high, this latter signal being fed to the lower input terminal of the flip flop 1782 by means of a conductor 1784.

When the input from gate 1776 to flip flop 1780 goes high and the input to the upper section of the flip flop 1780 goes low, due to the signal being fed thereto from the input terminals 1690 and a conductor 1786, the output signal on conductor 1788 goes high which is fed to the input circuit of gate 1730 by means of the conductor 1788. It is to be noted that the flip flop 1780 remains in this condition providing a high output signal on conductor 1788 even though the input from the manual right terminal 1790 goes high due to the release of the manual right switch because of the toggling action of the flip flop.

Thus, all of the inputs to the gate 1730 are high, that is, from the toggle 1780 and conductor 1788 from the A lift being in position as being fed thereto by means of terminal 1750 and conductor 1756 due to the CRS input at 1680 being low and the semi-automatic input at 1710 being low, these signals being fed to the input circuit of gate 1730 by means of conductor 1732 and the B lift being in position as fed thereto by means of conductor 1752. With all of the inputs to gate 1730 being high, the output is low, this low output being fed to the input circuit of gate 1674. This low input causes the output of gate 1674 to go high, this high output being inverted by gate 1678 and the resulting low signal being fed to the output terminals 1676 to energize the right motor starter circuit or the right transfer contactor.

When the input signal level at input terminal 1690 is low, this signal is fed to the input circuit to a gate 1794 by means of the conductor 1692 and a conductor 1796 and the input signal from input terminal 1704 is high as fed thereto by means of conductor 1706. The output of gate 1794 is high and is fed to the input circuit of gate 1744. The signal level on conductor 1746 is high due to the fact that the output signal from gate 1726 is high. Both high signals to the input terminals of gate 1744 produces a low input signal to a gate 1798, the output of the gate 1798 therefore being high and this signal being inverted by means of a gate 1800 to produce a low output signal at a fast output terminal 1802 thereby energizing the fast motor contactor.

The high output signal from gate 1794 is also fed to the input circuit of a gate 1806 causing the output thereof to go low. This latter low signal is fed to the input circuit of the gate 1740. The other input is from gate 1726 and through conductor 1746 and is high. This causes the output thereof to go high, this high output signal being fed to the input circuit of a nand gate 1810. The gate 1810 also includes an input signal from the output terminal of gate 1712, this latter gate having a high output signal thereon, the signal being fed by means of a conductor 1812. Gate 1810 also includes an input signal from a gate 1814 which will be assumed to be high. Thus, all of the inputs to gate 1810 are high producing a low at the input circuit of an inverter 1816 thereby producing a high output signal at slow output terminal 1818 and releasing the slow contactor.

Once the hoist transfers off of the stop cams at a particular station, the inputs from the auxiliary stop input aterminal 1830 and the standard stop input terminal 1832 are both high. Each of these inputs are fed into gates 1760 and 1766 respectively by means of conductors 1834, 1836 respectively. Because the output from the flip flop 1780 is high, the carriage will continue to transfer right until such time as the system senses that a station has been reached. The sensing of a station is provided by the "on any station" circuit described in conjunction with PCB 200 and will produce a high input signal on an on any station input terminal 1840. This signifies that the carriage has reached the next station, whether it be right or left. This "on any station" signal is fed to the input circuit of gate 1794 by means of a conductor 1842 and, because the other inputs to gate 1794 are also high, the output of gate 1794 goes low. This causes the output of gate 1744 to go high and, assuming the output from a gate 1846 is high, the output from gate 1798 goes low causing the output from gate 1800 to go high, thereby releasing the fast motor contactor. This occurs when the next station is sensed.

Also, the fact of the output signal from gate 1794 going low causes the output from gate 1806 to go high, this high signal being combined with the high output from gate 1726. The combination of these two highs causes the output of gate 1740 to go low thereby rendering the output of gate 1810 high. This high is inverted by gate 1816 to produce a low output signal at output terminal 1818 thereby energizing the slow motor contactor. This sequence of events occurs when any station limit switch is recognized and the manual control has been released. In this way the system has automatically switched from the fast to the slow speed at the next station after the manual switch has been released in the semi-automatic mode of operation.

The hoist will continue to run at slow speed until either the auxiliary stop signal at input terminal 1830 or the standard stop signal at input terminal 1832 goes high. By way of example, assume that the standard stop input terminal 1832 is rendered high, this high input signal is fed to the input circuit of gate 1766 and is combined with the two high signals from the manual right and manual left input terminals 1690, 1704 respectively indicating that both the manual switches have been released. The combination of high input signals to gate 1766 produces a low input signal to the input terminal of gate 1770 thereby producing a high output signal at the output thereof. This high signal is inverted by means of gate 1776 and fed to the lower input circuit to flip flop 1780 and the upper input circuit to flip flop 1782. This signal resets the flip flop 1780 to produce a low output signal at the output terminal thereof and on conductor 1788. This low output signal is fed to the input circuit of gate 1730 to immediately stop the operation of the hoist.

The above described sequence illustrates the transfer from a station at which the carrier is stopped to any station to the right or left if the manual control for either right or left travel is actuated. If the manual control for either right or left transfer is held, the hoist will continue to transfer at high speed even though the signal from the on any station and on auxiliary stop or on standard stop are present. This allows the transfer to be performed transferring either to the next station by initiating the transfer and releasing it or by initiating the manual control and holding it initiated until just before the desired station is achieved.

Referring now to the automatic operation of the assembly, the operator is capable of providing a coded program to a data reader assembly and thereby automatically command the sequential operation of the hoist or work carrier throughout an entire sequence without further manual control of the assembly. The system will automatically sense a right or left command plus the address to which the hoist is to ultimately stop, transfer the hoist to a position proximate that addressd at a high speed, switch the hoist to a slow speed for the fine positioning of the hoist and stop the hoist at the commanded address.

During automatic operation of the assembly, the automatic input at an automatic input terminal 1850 is low. At the same time, the semi-automatic signal at semi-automatic input terminal 1710 is high and the input to the CRS input terminal 1680 is low. During automatic operation, the commanded signals come from the decoded tape signals from the reader. These signals are fed to the input circuits of a nand gate 1854 which corresponds to the right command (in the illustrated system R) and the left command is sensed by means of a nand gate 1856 (the reader decoding the letter L).

Referring first to the right command, the input circuit to gate 1854 is fed coded signals corresponding to channels $\bar{1}, 2, \bar{3}, \bar{4}, 5\ \bar{6}$ and 7, all of these signals going high when the letter R is decoded from the reader. As was the case in previous circuits described above, the channel 5, $\bar{6}$, 7 signal is provided at an input terminal 1856 and fed to the gate 1854 by means of a conductor 1858. This combination code is also fed from input terminal 1856 to a gate 1860 by means of a conductor 1862 corresponding to the decoded letter S as will be hereinafter explained. The decoding of the letter R causes all the inputs to gate 1854 to go high to provide a low output signal from the gate 1854 on conductor 1866. This output signal is a momentary signal lasting for forty microseconds due to the strobing signal described above. The signal on conductor 1866 is fed to a flip flop circuit 1870 by means of the conductor 1866 to set the flip flop 1870 and provide a high output from the upper output conductor 1872 and a low signal on output conductor 1874 after the flip flop 1870 has been set. The output signal on conductor 1874 is fed to the input circuit of a nand gate 1878, this signal being low to provide an unconditional high output signal from the gates 1878 as impressed on an output conductor 1880 and fed to the input circuit of the gate 1696. This signal to the input circuit of gate 1690 prevents a left transfer because the signal is high. The output signal from flip flop 1870 on conductor 1872, being high, is fed to the input circuit of a gate 1884 to permit a right transfer through the gates 1674, 1678 and the output terminal 1676, if the other inputs are high.

During automatic operation, the input terminal 1850 is low, this low being inverted by means of an inverter circuit 1888. The output of the gate 1888, being high, is fed to the input circuit of a gate 1890 by means of a conductor 1892. As was stated above, the input signal on conductor 1680 is low, this signal being inverted by means of the gate 1712 and fed to the input circuit of gate 1890 by means of a conductor 1894.

The other input to the gate 1890 is provided by means of a JK flip flop 1900 which feeds the upper output thereof to the input circuit of gate 1890 by means of a conductor 1902. The flip flop 1900 is a run-stop flip flop which is set by two conditions, the first being the fact that a signal shot multivibrator circuit 1906 is timing and the second is the fact that the tape reader has been stopped thereby providing a tape reader stop input signal on an imput terminal 1908 and fed to the toggle input of flip flop 1900 by means of a conductor 1910.

The signal shot multivibrator is switched to its timing state in response to a high signal from a gate 1912, this gate providing a high output signal when either input thereto is low. The input circuit of the gate 1912 is provided input signals from the right coded signal and gate 1854 by means of a conductor 1914 and the left gate 1856 by means of a conductor 1916. One of the signals on conductors 1914 and 1916 will be low when either a code R or a code L is sensed by the reader and decoded by the gates 1854, 1856.

Thus, when the output of flip flop 1900, on conductor 1902 is high and the automatic and CRS conditions exist, the output of gate 1890 is low thereby providing a low input signal to an inverter gate 1920 which inverts the signal to provide a high output signal on a conductor 1922. This signal is fed to the input circuit of gate 1884 by means of a conductor 1922 and also to the input circuit of gate 1878 by means of the conductor 1924. Thus, the gate 1884 will provide a signal to cause a right transfer when these two conditions, and three others, are met, that is the output of gate 1920 is high and the output of flip flop 1870 is high indicating that the letter R has been decoded, and the tape reader has stopped. Also, there are three other conditions which must be met at the input circuit of gate 1884, these conditions being the A lift is in position on automatic, the B lift is in automatic position and the A hoist and B hoist are not lifting. If the B lift is in position on automatic, a high signal will be fed to input terminal 1930 and fed to the input circuit of gate 1884 by means of a conductor 1932. Also, the fact that the A lift is in position on automatic is sensed by a high signal on an input terminal 1934 and fed to the input circuit of gate 1884 by means of a conductor 1936. Finally, the fact that the A lift and B lift is not lifting is sensed by high signals on input terminals 1938, 1940 respectively, these signal conditions being fed to the input circuit of gate 1884 and gate 1878 by means of conductors 1942, 1944 and 1946.

Under these conditions, all of the input signals to gate 1884 will be high to provide a low output signal at terminal 1948. This low output signal generates a high output signal at gate 1674, which is inverted by the gate 1678, and a low signal is provided at output terminal 1676 thereby energizing the right motor contactor.

The circuit of FIGS. 20 to 22 (PCB 500) also includes a decoder for the letter A, this decoder being indicated as gate 1950 which includes an input signal from the channels $\bar{5}, \bar{6}$ and 7 as sensed by input terminals 1952 and fed thereto by means of a conductor 1954 and channels 1, $\bar{2}, \bar{3}$ and $\bar{4}$. Unless otherwise specified, the hoist will always stop on a signal from the standard stop switch, this signal being sensed by the input terminal 1832. Under normal conditions, not the auxiliary stop condition, the flip flop 1960 is set such that the signal condition on an output conductor 1962 is high and the signal condition on the conductor 1964 is low. The output signal from the flip flop 1960, as impressed on conductor 1962, is fed to the input circuit of a gate 1968, the other two input signals to the gate 1968 being an on standard stop signal impressed on input terminal 1832 and fed to the input circuit of gate 1968 by means of a conductor 1970 and an on specified station signal fed to an input terminal 1972 and fed to the input circuit of gate 1968 by means of a conductor 1974, this latter signal coming from the station address register described in conjunction with PCB 200.

With all three inputs to gate 1968 high, the output of the gate 1968 goes low, which signal is fed through a collector or circuit 1976 to the run-stop flip flop 1900 causing the flip flop 1900 to be reset. This causes the output signal level on conductor 1902 to go low, this signal being fed to the input circuit of gate 1890, causing the output of gate 1890 to go high. This high signal is inverted by the gate 1920 and fed to the input circuit of the gate 1884. This low signal to gate 1884 causes the output thereof to go high thereby stopping the right transfer. When the hoist is transferring toward a station, the on specified station signal on input terminal 1972 enables the gate 1968 to respond to the standard stop signal at input terminal 1832.

The on specified station signal at input terminal 1972 is also fed through an inverter gate 1984 causing the output thereof to go low, this signal being fed to the input circuit of a gate 1986. The other input to gate 1986 is normally high as will be seen, from a description of the slow only operation to follow. This slow only operation is sensed by an input signal on a conductor 1988 with the input signal from gate 1984 low, the output of gate 1986 is high, this high signal being inverted by an inverter 1988. The output signal from the gate 1988 is low which is fed to the input circuit of the gate 1846 causing the output of the gate 1846 to go high. This signal from the output circuit of gate 1846 is fed to the input of gate 1798 and, because the automatic and CRS signals are on, that is, low inputs to terminal 1680 and 1850, the other input from gate 1744 to gate 1798 is also high. The low signal from gate 1846 causes the output of gate 1798 to go high which is fed through the inverter circuit 1800 causing output terminal 1802 to go high releasing the fast contactor.

Also, the output from gate 1986, being a high signal, goes to the input circuit of gate 1814. It will be remembered that the other input to gate 1814 was assumed high because the automatic mode is in effect, thereby causing the output of gate 1814 to go low. This low signal is fed to the input of gate 1810 to cause the output of gate 1810 to go high. This high signal is inverted by gate 1816 and fed to the slow output terminal 1818 to energize the slow motor contactor and cause the carriage motor to proceed at slow speed.

The tape command with the letter A at the end of the address, for example LO4A, is a command to stop at an auxiliary stop switch which is intermediate the standard stop switch. This is accomplished by decoding the letter A in the reader, this decoding being done by the gate 1950 in response to sensing channels 1, $\bar{2}, \bar{3}, \bar{4}, \bar{5}, \bar{6}$ and 7. When this command is sensed, the output signal from the gate 1950 goes low momentarily, for approximately 40 microseconds. This signal causes the flip flop 1960 to be set thereby creating a high signal on output conductor 1964. Also, the output on conductor 1962 goes low, this latter low signal maintaining the output of gate 1968 high and allows the output of gate 1990 to go low which resets the flip flop 1900 through the collector or circuit 1976 when the on specified station signal at input terminal 1972 is high and when the on auxiliary stop signal at input terminal 1830 is high.

A final function of the curcuit of PCB 500 and FIGS. 20 to 22 is to provide a function of signaling either the transfer or the lift motors for the work carrier to operate only at slow speed. This is accomplished by decoding the letter S at the reader, this S being decoded by gate 1860 in response to sensing channels 1, 2, $\bar{3}, \bar{4}$, 5, $\bar{6}$ and 7. The output of gate 1860 is fed to a flip flop circuit which consists of gates 1994 and 1996 which, under normal reset conditions provides a high output signal at an output conductor 1998 and a low output signal at an output conductor 2000.

When the letter S is decoded, the output of gate 1860 goes low to cause the output from gate 1994 at conductor 2000 to go high. Correspondingly, the output from gate 1996 will go low, this low signal being fed to conductor 1998. This is due to the toggling action of the two gates 1994, 1996 as they are connected in a flip flop arrangement. This latter low signal on conductor 1998 is fed to a slow only output terminal 2002 by means of a conductor 2004, this signal going to the lift board designated PCB 600 (FIGS. 23 to 25) and also to the input circuit of gate 1986. This low input signal to gate 1986 has the same affect as a low output signal from gate 1984 described above. The remaining operation of the slow only circuit has been described in conjunction with the description of the output of the gate 1986 and reference should be had back to that description.

The letter S, once used, is cancelled when either the letters R (right), L (left), U (up) or D (down) are decoded, these inputs for the U or D on either lift board being fed to the input terminals reset slow only A and B 2006, 2008. The inputs at terminals 2006 and 2008 are fed to the input circuit of gate 1996 to reset the flip flop circuit. The resetting pulse for the sensing of an R or an L is provided by a reset gate 2010 which includes input signals from the right and left gates 1854, 1856 through the nand gate 1912. Thus, when either a right or left signal has been sensed, a high input signal is generated at the input circuit to gate 2010 which inverts the signal and feeds a low signal to the input circuit of gate 1996 resetting the 1994, 1996 flip flop.

Referring now to PCB 600 (FIGS. 23–25), there is illustrated the lift control for the hoist, the lift control having three modes of operation including manual, semi-automatic and automatic. There are five signals that the PCB 600 will respond to which include the coded letter U corresponding to the lift up for stopping at the top of the hoist travel, the letter D corresponding to lift down to cause the lift to stop at the bottom of the hoist travel, the letter V corresponding to an intermediate stop position adjacent the full up position the letter W corresponding to a lower intermediate stop position adjacent the bottommost position and the letter B which inhibits the U, D, V and W signals on the lift board corresponding to the first hoist.

Referring first to the manual operation, the CRS signal impressed on CRS input terminal 2020 is high, the semi-automatic signal impressed on input terminal 2022 is either high or low and the automatic signal as impressed on input terminal 2024 can also be in either state high or low. With the circuit in the manual mode of operation, an input signal to the manual-down input terminal 2026 or an input signal to the manual-up input terminal 2028 in response to the manual-up or manual-down switch being actuated, will cause an output to either the up or down output terminals 2030, 2032 in accordance with the commanded function.

When the manual switches are not actuated, the manual- down and manual-up signals are normally high. However, when either one is actuated the signal drops to a low level, taking for example the manual up signal on input terminal 2028, if this switch is actuated the signal will drop to a low level, this low signal being fed to the input circuit of a gate 2034. The gate 2034 inverts the low signal and creates a high signal on an output conductor 2036. The signal on conductor 2036 is fed to a nand gate 2040 by means of conductors 2042 and 2044. The input from the CRS terminal 2020 is fed to the input circuit of a gate 2046 which inverts the low signal therein and provides a high output signal to the input circuit of an inverter gate 2048 by means of a conductor 2050. The output signal from gate 2048, a high signal, is fed to the input circuit of a nand gate 2052 and also to the nand gate 2040 this signal being a high signal. Also, a hoist is up signal is fed to an input terminal 2056 this signal being normally low, and the signal being fed to an input circuit of a gate 2058 thereby rendering the output thereof a high signal. This high signal is also fed to the input circuit of gate 2040 by means of a conductor 2060.

Thus, all of the inputs to gates 2040 are high thereby producing a low signal at the output this signal being fed to the input circuit of a nand gate 2064 by conductor 2062. The low input to gate 2064 causes the output thereof to be high which is inverted by a gate 2066 thereby producing a low output at output terminal 2030 to energize the up contactor.

As the hoist or lift moves upward and approaches the top, the hoist is up signal at input terminal 2056 goes high to cause the output from gate 2058 to go low. This low signal in turn causes the output from gate 2040 to go high thereby presenting all high inputs to gate 2046. Therefore, the output signal from gate 2064 is low to produce a high output at output terminal 2030. In this way the up motor contactor is deenergized.

A similar situation occurs with the hoist is down signal which is fed to the input terminal 2070 this signal being inverted by means of an inverter gate 2072. The output of gate 2072 is fed forward to the input circuit of gate 2052 by means of a conductor 2074. The CRS signal is similarly fed into the input circuit of gate 2052 by means of the gate 2048 and operates similar to that described in conjunction with the up output signal.

The manual down signal is fed at the input terminal 2026 and inverted by means of a gate 2080. This signal is fed to the input circuit of gate 2052 by means of conductors 2082, 2084 to control the input circuit to gate 2052. When all of the signal conditions to gate 2052 are high, a low output signal will be provided at the output terminal thereof and fed into the input circuit of a gate 2086, the output signal from gate 2086 being inverted by gate 2088 and fed to the down output terminal 2032. Thus, the up and down circuits operate down output terminal 2032. Thus, the up and down circuits operate substantially identically.

On some models of hoist utilized in systems of the present invention, a two speed lift motor has been provided. The low speed operation is in effect from the extreme down position until the down speed change signal at input terminal 2090 goes low and until it approaches and trips a switch to provide an up speed change signal at input terminal 2092. In the down direction from the extreme up position the hoist runs at high speed until the down speed change signal is again changed by tripping a limit switch. In manual operation, the slow contactor output at output terminal 2094 is continuously low and consequently the hoist will lift and lower only in low speed. The circuitry to provide this slow speed operation to be on continuously is seen to operate as follows. CRS input terminal 2020 feeds an input signal to the inverter 2046 causing the output thereof to be at a low level. This output signal is fed to a gate 2096 by means of conductors 2050, 2098, 2100 and 2102. This signal causes the output of gate 2096 to be high which signal is inverted by a gate 2106 to provide a low output signal at the slow output terminal 2094. In this way the slow speed contactor is energized.

Referring now to the semi-automatic operation of the assembly, the lift is capable of being operated either to the completely up or completely down position or to either intermediate position where a microswitch to signal the achievement of that position has been provided. Referring now to the circuitry, it is assumed that the A hoist is in the down position wherein the switch input labeled hoist is down at input terminal 2070 is at a high signal level condition indicating that the switch is tripped. Also, the input titled "down speed change" at input terminal 2090 is at a high signal level condition to indicate that its switch has been tripped. In this mode of operation, the CRS input signal at input terminal 2020 is low, as is the semi-automatic input at input terminal 2022. On the other hand, the automatic input at terminal 2024 is high to indicate that the system is not in automatic.

When the input manual up at terminal 2028 goes low, the output of gate 2034 goes high. This latter output signal is fed to the input circuit of a gate 2120 and, because the semi-automatic signal is on, the output from gate 2122 is high, this high signal being fed to the input circuit of gate 2120. Also because the hoist is not in the completely up position, the input to input terminal 2056 is low, which signal is inverted by means of gate 2058, the output of gate 2058 being fed to the input circuit of gate 2120. Thus, all three inputs to gate 2120 are high to produce a low output at the output terminal thereof, this signal being inverted by means of a gate 2130 to produce a high output at its output terminal.

The output of gate 2130 is fed to the input circuit of a gate 2134 by means of a conductor 2136, the upper input to the gate 2134 collecting the signals from the two station stop switches through gates 2138, 2140 and 2142. The gate 2140 includes an input signal from the on auxiliary stop input terminal 2146 and the gate 2142 includes an input signal from the on standard stop input terminal 2148. Both gates 2140 and 2142 are provided with an input signal from the CRS input terminal 2020, which signal is inverted by means of gate 2046 and fed thereto by means of the conductor 2050 and a conductor 2150. If conditions are such that the CRS signal is on (low) and the signal from the on standard stop input terminal 2148 or the on auxiliary stop terminal 2146 are present, the output of gate 2138 will be high. The gate 2134 also includes an input from a gate 2152 by means of a conductor 2154. The gate 2152 is the output gate from the stop at the next intermediate stop logic circuit to be described hereinafter. For explanation purposes at this time, it is assumed that the output from this gate is high. Therefore, all three inputs to gates 2134 are high to cause the output thereof to go low. This low signal is fed to the input circuit of gate 2064 to produce a high output, this high output being inverted by gate 2066 and fed to the output terminal 2030. In this way the up motor contactor is energized.

At this time, because the down speed change input terminal 2090 is high, the output from an inverter gate 2160 is low. This output signal is fed to gate 2164 by means of a conductor 2166, this signal level causing the output of gate 2164 to be high. This high level output signal causes the output of a gate 2170 to be low which causes the output of the gate 2172 to be high. This high output signal creates a low output signal from the gat 2176 and the output from gate 2178 to be high. In this way it is shown that the fast contactor is not energized due to the high output signal level at output terminal 2180.

As stated above, the output from gate 2164 is at a high level, and this output is also fed to the input circuit of a gate 2184. This high input to gate 2184 is combined with the high input on conductor 2100 and the high input from gate 2122. Thus, a low output is produced at the output terminal of gate 2184 to produce a high output signal from the output of gate 2096. This high output signal is inverted by a gate 2106 and thereby energizes the slow motor speed contactor by generating a low signal at output terminal 2094.

As the hoist moves from the lower position upward, it releases the down speed switch thereby changing the down speed change input signal at input terminal 2090 to a low level. This signal is inverted by gate 2160 to produce a high output signal which permits the input to gate 2164 to go high. The output of gate 2164 then goes low to release the slow motor contactor output terminal 2094 and energize the fast motor contactor connected to output terminal 2180.

The hoist will continue upward travel until the up speed change switch is tripped to change the signal level at input terminal 2092 to a high level. This signal level is fed to gate 2200, the other input of which is high because the manual up signal from gate 2034 is high. This causes the output of gate 2200 to go low which causes the output of gate 2164 to go high. This signal level energizes the slow motor contactor and deenergizes the fast motor contactor, as previously described.

When the hoist, now going at slow speed, trips the hoist is up switch and causes the signal level at input terminal 2056 to go high, a low level signal is produced at the output terminal of gate 2058. This low level signal causes the output circuit of gate 2040 to go high, the output of gate 2064 to go low and the output of gate 2066 to go high. In this way the up output contactor is deenergized due to the high signal on output terminal 2030.

The next operation described is the stop next intermediate stop position which is a stop position intermediate the fully up and fully down position and may be approached either from the hoist traveling up or down toward the intermediate stop. The stop next intermediate stop function is initiated by a push button and is used to stop the hoist at either of the two intermediate stop positions. It is to be understood that any number of intermediate stop positions may be provided in the system of the present invention or only one intermediate stop may be provided. On the other hand, this system could be eliminated completely and only a fully up or fully down position provided. With this system, the operator need not accurately position the hoist at a stop position manually but need only energize a manual button while the up or down manual switch is actuated, the left system will automatically stop when the next position is achieved. The system will then automatically sense the intermediate stop position and stop the hoist at the particular desired stop position whether it be an upper, lower or intermediate stop position or if additional stop positions are provided.

In utilizing the intermediate stop position and the semi-automatic mode of operation, the lift motor will proceed at high speed to a position adjacent the desired stop position and will then shift automatically to the slow speed mode of operation. The hoist will then continue at slow speed until the on upper or lower intermediate stop switch is tripped and the hoist will stop at the intermediate position. It will remain there until the manual up or manual down switch is actuated.

The stop next intermediate stop function is initiated by a push button, this signal being fed to an input terminal 2200. Assuming, that the hoist is down and being raised, as the hoist is traveling up the input signal to the manual up input terminal 2028 is low. For this example, it is immaterial whether the up or down signal is low as both are fed to the input circuit of a gate 2202 causing the output thereof to be high. When the stop at the next intermediate stop button is pushed, the input to terminal 2200 goes low, this signal being fed to the set input circuit of a flip flop 2204 thereby setting the flip flop and creating a high signal on conductor 2206. This high signal on conductor 2206 is fed to the input circuit of the gate 2152 and also to the input circuit of gates 2208, 2210. As the hoist moves upwards, it will first trip the lower intermediate stop speed change switch causing the signal at input terminal 2212 to go high, this signal being fed to the input circuit of gate 2210 by means of conductors 2214 and 2216.

The two high input signals to gate 2210 cause the output thereof to go low, which signal level is fed to the input circuit of gate 2164 to cause the output thereof to go high thereby changing the speed of the lift motor to slow speed, as previously described. The hoist will then continue on slow speed until the one lower intermediate stop switch is tripped, which provides a high input signal at an input terminal 2388. This signal is inverted by inverter circuit 2221 causing the output thereof to go low. This output signal is fed to the input circuit of a gate 2224 causing the output of this latter gate to go high. When both inputs to gates 2152 are high, for example when the output of gate 2224 is high and the flip flop 2204 is set, the output of gate 2152 will be low to provide a low signal on conductor 2154. This signal is fed to gate 2134 and to a gate 2228 causing the hoist motor to stop. The intermediate stop signal is cancelled when the manual control is released, thereby causing the input signals at input terminals 2026 and 2028 to be high and the output of gate 2202 to be low. This latter low signal resets the flip flop 2204. The reset low signal from the output circuit of flip flop 2204 causes the output of gate 2152 to be high and remain there until the next time the "stop next intermediate stop" button is pushed.

Referring now to the automatic operation of the lift control portion of this system, the input to the automatic and CRS input terminals 2024, 2020 respectively are low and the signal into the semi-automatic terminal 2022 is high. During the automatic operation of the control circuit, the command signals are derived from the coded tape signals sensed from the reader and fed to a nand gate 2230 in the case of U for the up command, nand gate 2232 in the case of the D code for the down command, the nand gate 2234 for the intermediate stop symbol V, the nand gate 2236 for the intermediate stop code W and nand gate 2238 for the second lift symbol B.

The reader sensing the letter U provides high input signals to gate 2230 which causes the output of gate 2230 to go low for forty microseconds. This low signal at the output of gate 2230 provides a setting signal for a flip flop 2244 thereby providing a high output signal at output conductor 2246. With the setting of flip flop 2244, the output terminal 2248 goes low to provide a low signal at the input circuit of a gate 2250 by means of a conductor 2252. This low signal causes the output of gate 2250 to be unconditionally high, thereby preventing a down movement of the carrier due to a generation of a high signal at the output terminal 2032. Also, the output of flip flop 2244 on conductor 2246 is fed to the input circuit of a gate 2258 by means of a conductor 2260 to permit an up movement if other conditions exist at the input circuit thereof.

The input of gate 2258 includes signals from the CRS on input terminal 2020 as fed thereto by means of gate 2046 and either the on standard stop input signal at input terminal 2148 or the on auxiliary stop input at input terminal 2146 are on. These signals are combined by the gates 2140, 2142 and 2138, the output of gate 2138 being fed to the input circuit of the gate 2258. Also, the output of gate 2138 is fed to the input circuit of gates 2134, 2228 and 2250. The final input to the gate 2258 is derived from a gate 2264, the output signal from the gate 2264 being inverted by an inverter circuit 2266. The output of gate 2264 controls the operations of both gate 2258 due to the signal being fed thereto by means of a conductor 2268 and gate 2250 which includes an input circuit connected to a conductor 2270.

The input signals that enable an automatic lift or lowering are as follows: the not transferring signal on an input terminal 2272 must be high, this signal coming from the transfer circuit board PCB 500 and provides an indication that the hoist is not in the transfer mode and an input signal on a terminal 2308 indicating that the carriage is now on the specified station in the last transfer command, an up and down command JK flip flop 2276 must be set to provide a high output at output conductor 2278 which indicates that the up or down command has been decoded and the tape reader has been stopped, and finally that the automatic on signal at input terminal 2024 is low and the output of an inverter gate 2280 is high.

The flip flop 2276 receives a setting signal from a nand gate 2284 which includes an input signal from the up-decode gate 2230 by means of a conductor 2286 and the down-decode gate 2232 by means of a conductor 2288. When one of these signals on conductor 2286 or 2288 is low indicating that the U or D command has been decoded, the output of gate 2284 will be momentarily high to cause a single shot multivibrator circuit 2290 to provide an output setting pulse to the J input of flip flop 2276. The flip flop 2276 operates in a manner similar to that described in conjunction with FIGS. 20–22 for PCB 500. The flip flop 2276 is activated by the fact that the tape reader is stopped as sensed by a signal on a tape reader stopped input terminal 2296. This signal indicating that the tape reader is stopped must be present during the time that the single shot multivibrator circuit 2290 is in its timing period. Thus, the signal at input terminal 2296 being low and the singal shot multivibrator circuit 2290 being in its timing period will set the flip flop 2276.

The setting of flip flop 2276 also provides a low output signal on a not lifting output terminal 2300 by means of a conductor 2302. The signal level at output terminal 2300 is fed to the transfer board PCB 500 described in conjunction with FIGS. 20–22 to prevent or inhibit the transfer circuit from commanding a transfer while the lift mode is in operation.

For a typical automatic up operation, the following conditions exist at the various inputs. The CRS input at input terminal 2020 is low, the automatic input at terminal 2024 is low, the slow only input at an input terminal 2304 is high, the hoist is down input at terminal 2070 is high, the hoist is up input at input terminal 2056 is low, the down speed change input terminal 2090 is high, the up speed change input at input terminal 2092 is low, the not transferring input at input terminal 2272 is high, the on specified station input at the input terminal 2308 is high, and the on standard stop input signal at input terminal 2148 is high.

As the tape reader reads the letter U, the gate 2230 provides a momentary low output signal causing the flip flop 2242 to be set thereby providing a high output at output conductor 2246 and a low output at output terminal 2248. At this time, the low signal from output nand gate 2230 is fed to gate 2284 causing the output of gate 2284 to go momentarily low thereby triggering the single shot multivibrator circuit 2290. During the timing period, the output of single shot multivibrator circuit 2290 goes high for a period of approximately 100 milliseconds. During the tape reader stepping operation, the input signal level at input terminal 2296 is high and, when the tape reader stops, the signal level at that input terminal 2296 will go low. This low signal causes the flip flop 2276 to be set thereby providing a high output at output conductor 2278. This signal is fed to gate 2264 as a high signal and this high signal is combined with the high signals being fed to the input circuit of gate 2264 from the input terminals 2308, 2272 and 2024, this latter signal being inverted by means of inverter 2280. All of these high signals provide a low output from the gate 2264, this low output being inverted by gate 2266 and fed to the input circuit of gate 2258.

The input to gate 2258 from the conductor 2260 is also high due to the fact that the flip flop 2244 has been set in response to the reading of an up command. Because the on standard stop signal input at input terminal 2148 is high and the CRS input at input terminal 2020 is low, this latter signal being inverted by gate 2046, and being high, the inputs to gate 2142 are both high providing a low output at the output terminal of gate 2142. This makes the output of gate 2138 high, this latter high signal being fed to the input circuit of gate 2258. At this time, the output of gate 2258 is low, this low signal being fed through gates 2064 and 2066 to cause the up output signal at output terminal 2030 to be low, thereby energizing the up contactor.

Because the down speed change input at input terminal 2090 is high, the output from inverter 2160 is low to make the output of a gate 2312 high. This latter high signal is fed to the input circuit of a pair of nand gates 2316, 2318 by means of a conductor 2320 and conductors 2322, 2324. The other input to gate 2318 comes from signals being fed to the input circuit of a gate 2330, the output of gate 2330 being fed to the input circuit of gate 2318 by means of an inverter 2332. The signals to the input circuit of gate 2330 include an automatic signal being on which is evidenced by a low signal at input terminal 2024, this signal being inverted by gate 2280 and fed to the input circuit of gate 2330 by means of conductors 2334 and 2336. Also, the input signals to gate 2330 include the set condition of the run-stop flip flop 2276, this signal being fed to the input circuit of the gate 2330 by means of a conductor 2338.

The final input signal is the fact that the CRS signal is on at input terminal 2020, this low signal being fed through inverter gate 2046 to provide a high input signal to gate 2330 by means of the conductor 2098. All of the inputs to gate 2330 being high, a high output signal will be provided from gate 2332. This high input signal at the input circuit of gate 2318 is combined with the high signal on conductor 2324 to provide a low output signal from the gate 2318. This low signal is fed to gate 2096 to provide a high output therefrom, this high output being inverted by gate 2106 to provide a low signal at output terminal 2094. In this way the slow motor contactor is energized and the hoist is moved upwardly at a slow speed.

As the hoist moves upward, the down speed change switch is released thereby providing a low signal at input terminal 2090. This signal in inverted by gate 2160 to allow the output of gate 2312 to go low. This low signal causes the slow output terminal 2094 to go high deenergizing the slow motor contactor. the signal on conductor 2320 being fed to the output terminal through gates 2318, 2096 and 2106. The output of gate 2312 is also fed to the input circuit of a nand gate 2350 by means of conductors 2320, 2322 and inverter gate 2316. This signal, combined with the output of gate 2332, causes the output of gate 2350 to go low, thus energizing the fast contactor through gates 2176 and 2178. The hoist is now lifting at high speed.

As the hoist approaches the upper position, the up speed change switch is tripped thereby changing the input signal at input terminal 2092 to a high signal. This high signal is fed to the input circuit of a gate 2360 which is combined with the signal from the flip flop 2244 calling for the up movement to render the output of gate 2360 low. When gate 2360 goes low, it causes the output from gate 2312 to go high. This high signal is fed to gates 2318 and 2316 in the slow-fast logic to deenergize the fast motor contactor and energize the slow motor contactor. The hoist is now lifting at slow speed again.

When the hoist reaches the up position, the hoist is up switch is tripped thereby providing a high input at input terminal 2056, this latter signal being fed to the input circuit of a gate 2364. This high signal is combined with the high signal from the flip flop 2244 to provide a low output at the output terminal of gate 2364. This low signal is fed to the input circuit of a gate 2366, this low signal providing a high output from the gate 2366. This high output is inverted by a gate 2368 and fed to the direct reset input of the run-stop flip flop 2276 to reset to flip flop and remove the high signal from the conductor 2278. The removal of this high signal provides a low input to gate 2264 thereby stopping the lift.

The low signal from gate 2364 is also fed to an output gate 2370 causing the output thereof to go high. This high signal is fed to a lifts OK automatic output terminal 2372 which is fed to the PCB 500 circuit to allow the hoist to transfer only when the lifts are in the proper position. The other inputs to the gate 2370 are the fact that the hoist is supposed to be down and in fact is down that the hoist is on an intermediate stop W or that the hoist is on an intermediate stop V. With regard to the V and W signals, the upper intermediate stop signal is fed to the input terminal 2220 and fed to gates 2380 and 2382, the output of gate 2380 being fed to the input circuit of gate 2366 and the output of gate 2382 being fed to the input circuit of gate 2370 by means of a conductor 2384. The W signal is fed to an input terminal 2388 and is fed to the input circuit of gates 2390 and 2392, the output of gate 2392 being fed to the input circuit of gate 2366 and the output of gate 2390 being fed to the circuit of gate 2370.

For an automatic down movement the operations are similar except that, in a down movement, the hoist starts out at high speed and only changes speed as the hoist approaches the bottom of the travel. This occurs due to the fact that, when the letter D is decoded, the output of nand gate 2332 goes low causing the flip flop 2244 to be in a condition such that the output terminal 2248 is high and the output conductor 2246 is low. This latter low signal is fed to the input circuit of gate 2360 causing its output to be unconditionally high and overriding the effect of the "up speed change" input signal at input terminal 2092.

When a lift to an intermediate position is desired, the tape coding will be such that the desired stop position, either V or W, will be at the end of the up or down command and a typical signal would be UV. For an up movement to the upper intermediate stop V, the coding would be UV and this would cause the up-down flip flop 2244 to call for an up movement. The letter V, when decoded, causes the output of gate 2234 to set two flip flops. The first flip flop 2400 receives an input signal on conductor 2402 and a second flip flop 2406 receives a signal means of a conductor 2408. Once the command signal has been decoded, the lift starts to move upward and, before it reaches its uppermost position, the on upper intermediate stop speed change switch input signal at input terminal 2412 goes high, this signal being fed to the input circuit of gate 2414. Because the flip flop 2406 is in a condition such that the output conductor 2418 is high, both inputs to gate 2414 are now high thereby causing the output circuit thereof to go low. This low signal causes the output from gate 2312 to go high and, as previously described, energizes the slow motor contactor and deenergizes the fast motor contactor.

The lift continues at slow speed until the on upper intermediate stop switch is tripped thereby rendering the input signal at input terminal 2220 high, the high signal being fed to the input circuit of gate 2380. Because the flip flop 2400 is in a condition such that the output signal on an output conductor 2432 is high, both inputs to gate 2380 are now high causing the output of gate 2380 to go low. This low signal is fed to the input circuit of gate 2366, the output thereof being inverted by gate 2368, to reset the run-stop flip flop 2276.

The on upper intermediate stop input at input terminal 2220 is high and this high signal is also fed to the input circuit of the gate 2382 which signal is combined with the high output of flip flop 2406 to render the output of gate 2382 low. This low signal is fed to gate 2370 by means of conductor 2384 holding its output high to provide the lifts OK automatic output signal at terminal 2372.

The flip flops in the V and W intermediate stops are reset when either a U or a D command is decoded thereby rendering one of the inputs to gate 2284 momentarily low and making the output thereof momentarily high. This signal is fed through an inverter circuit 2434 to make the output thereof momentarily low. This output is fed to the transfer board PCB 500 as a reset slow only signal at an output terminal 2436. This signal is also fed to the reset circuit of flip flop 2400 and a reset input to a flip flop 2438. This momentarily low signal causes the flip flop 2400 to reset and, if W were last used, causes the flip flop 2436 to reset. This renders the output from flip flop 2400 on output conductor 2440 high and the output on conductor 2432 low. The flip flop 2406 is reset by means of an output signal fed from the output circuit of a nand gate 2442. The inputs to gate 2442 are a high signal from the output of flip flop 2400 on conductor 2438, a high signal from the output of gate 2280 due to the fact that the automatic is on, the hoist releasing the on on the upper intermediate stop speed change switch allowing the input at input terminal 2412 to go low thus causing the output from an inverter 2446 to go high. At this time all three inputs to gate 2442 are high causing the output to go low thereby resetting the flip flop 2406.

The operation of the W or the lower intermediate stop is similar to that of the V stop except that the flip flop 2436, a gate 2448, a flip flop 2450, a gate 2452 and the gates 2390 and 2392 are used.

When a hoist carriage is equipped with two lifting mechanisms, another identical board to PCB 600 (FIGS. 23-25) is installed in the logic rack. The access to its functions is provided through the use of an A lift - B lift JK flip flop 2454. The outputs from the flip flop 2454 are connected in such a way that under normal conditions the B lift decoded signals are inhibited. When addressing a second lift, the commands, whether they be U, V, D or W, must be proceeded by the letter B. When the letter B is decoded by nand gate 2238, the output of the gate 2238 goes momentarily low causing the flip flop 2454 to be in a condition such that the upper output is high, this output being fed to an output terminal 2456, and the lower output is low, this output being fed to an output terminal 2458.

The inhibit B signal at output terminal 2456 enables the U, D, V and W decoders on the second lift board to the active and at the same time provides a low output signal at the inhibit A output terminal 2458. This inhibit A terminal is tied to the input labeled inhibit (this lift) at input terminal 2460. This input 2460 being low inhibits the decoding of U, D, V and W signals for the A lift. The coding technique used on double lift hoist is as follows: unless otherwise coded all U, D, V and W signals will be recognized only by the A lift. For example, a single letter U would cause A lift to raise, and B lift would remain unchanged. A code made up of UBU would cause both lifts to raise simultaneously and a code UBD would cause, inter alia, A lift to raise and B lift to lower.

Figure 26:
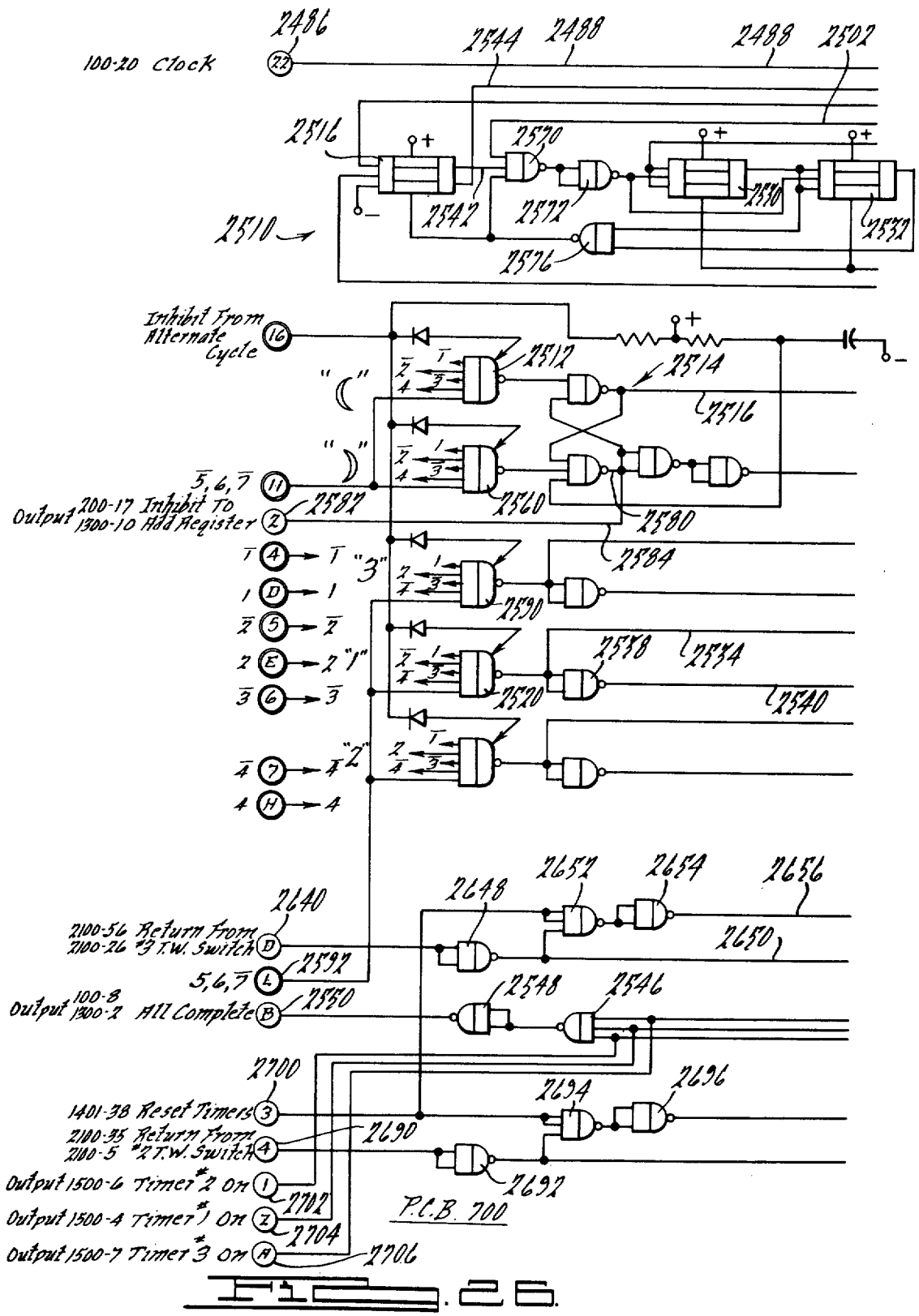
FIG. 26 is a schematic diagram illustrating a portion of the timer circuitry and particularly illustrating the details of the input section thereof.
Figure 27:
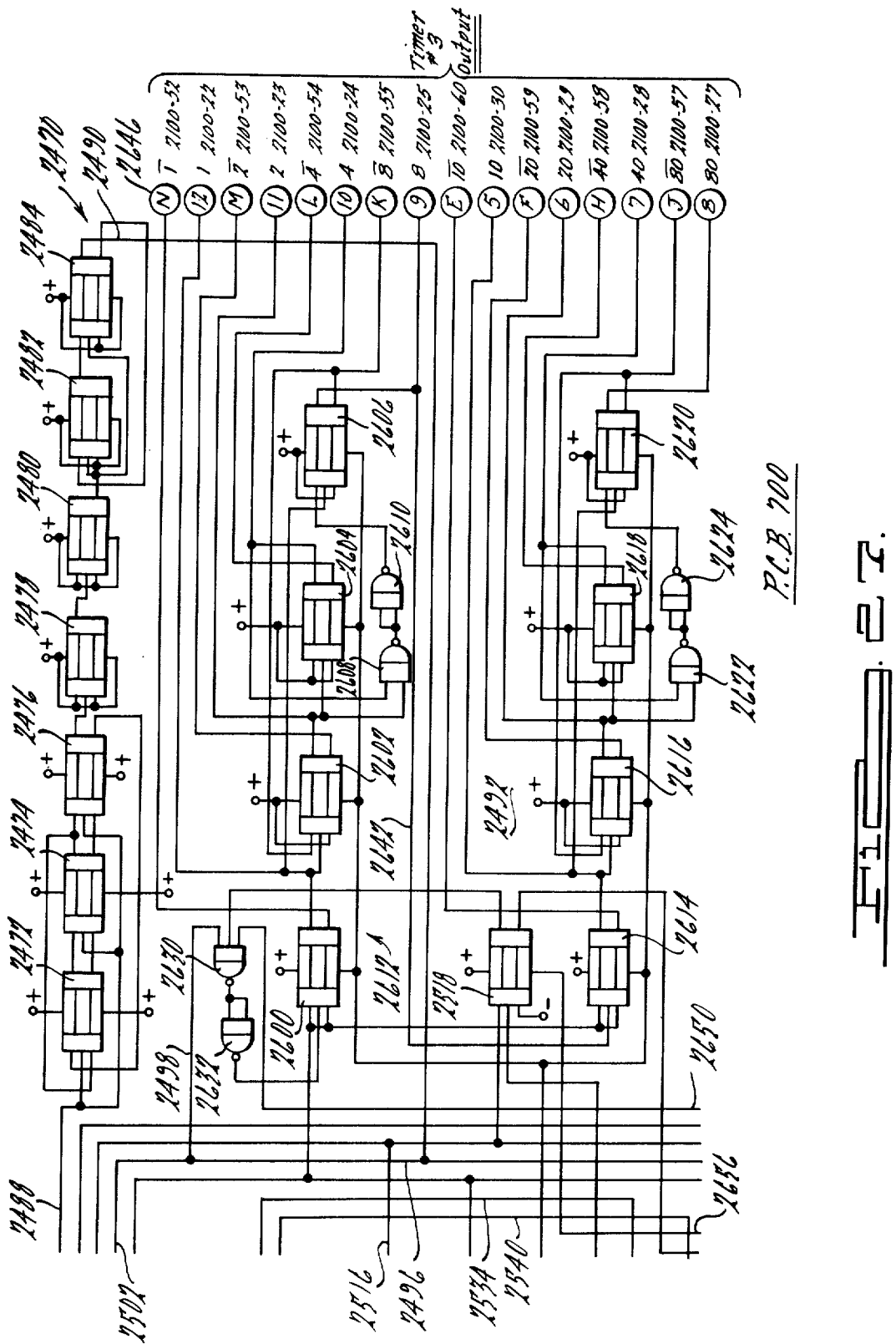
FIG. 27 is a schematic diagram illustrating another portion of the timer circuitry and particularly ilustrating the second timer output section.
Figure 28:
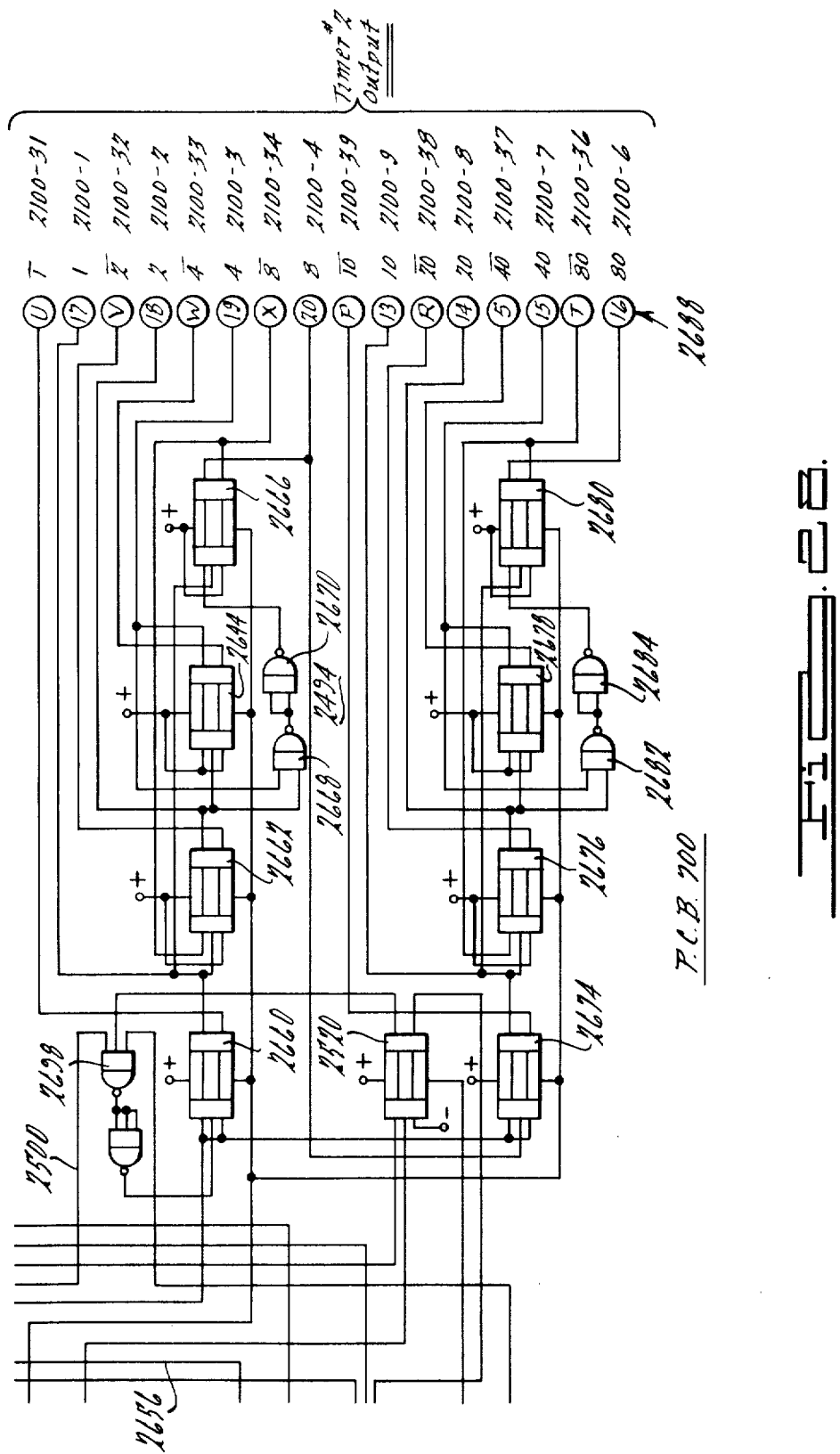
FIG. 28 is a schematic diagram illustrating the remainder of the timer circuitry and particularly illustrating the details of third timer output section.

Referring now to FIG. 26, 27 and 28 which make up PCB 700, there is illustrated the 1, 2 and 3 timers plus the decoder logic for addressing these particular timers. The timer circuit disclosed in FIGS. 26-28 is not affected by the control status of the machine and it responds to commands from the reader whether the system is in semi-automatic, automatic or manual. In the particular system illustrated, a register to divide by sixty counter is included to divide the input 60 hertz clock signal into a 1 hertz signal. The system also includes a first timer that is prewired for a three second dwell and two other timer circuits which may be preset and arranged from zero to ninety-nine seconds. The format for addressing any one of the timers is (1) for the first timer, (2) for the second timer and (3) for the third timer.

As stated above, the circuit of PCB 700 includes a divide by sixty counter circuit 2470 which includes a plurality of flip flops 2472-2484, the flip flops being interconnected to divide the 60 hertz signal on an input terminal 2486 and fed to the input circuit of the counter 2470 by means of a conductor 2488. The counter receives the 60 hertz input signal and provides an output signal at an output conductor 2490 which includes one pulse for each 60 pulses provided at the input conductor 2488. Thus, the signals on conductor 2490 appear at one pulse per second.

This one pulse per second signal is fed to the input circuits of the third timer counting circuit 2492 and the second timer counting circuit 2494 by means of conductors 2496, 2498 and 2500. The output of the divide by sixty counter 2470 is also fed to the input circuit of the first fixed counter by means of a conductor 2502. This first fixed timer is prewired for a three second count, the three seconds being used for illustrative purposes only.

Referring now to the first timer, the timer is addressed by sensing the code (1) at the reader and decoding this signal, the signal being utilized to control a first timer circuit 2510. When the first parenthesis is sensed, an input signal is fed to the input circuit of a nand gate 2512 which includes codes from channels $\overline{1}$, $\overline{2}, \overline{3}, 4, \overline{5}, 6$ and $\overline{7}$. When the signal is sensed, the output circuit of nand gate 2512 goes momentarily low to cause a setting signal to be fed to the input circuit of a parenthesis flip flop 2514. The output signal level from the gate 2512 goes low to produce a high output signal from flip flop 2514 at output conductor 2516. This high signal on conductor 2516 is fed to the J input circuit of flip flops 2516, 2518 and 2520 corresponding to the first, third and second timers 2510, 2492 and 2494 respectively. When the numeral one is sensed, the code corresponding to channels 1, $\overline{2}, \overline{3}, \overline{4}$, and 5, 6, $\overline{7}$ is fed to the input circuit of a nand gate 2520 to decode the one signal and provide a momentary low output signal level at the output terminal of gate 2520. The momentary low output from gate 2520 is fed to the direct reset circuit of a pair of JK flip flops 2530, 2532, forming a part of timer circuit 2510 by means of a conductor 2534. This signal resets the counter flip flops 2530, 2532 and at the same time provides a high output from an inverter circuit 2538.

The output of the inverter circuit 2538 is connected to the clock input of flip flop 2516 by means of a conductor 2540. Because the K input to flip flop 2516 is low, and the J input to the same gate is high, and a clock pulse occurs, the output of flip flop 2516 at conductor 2542, goes high and the lower output at conductor 2544 goes low. Conductor 2544 being low causes the output of a gate 2546 to go high, which output is inverted by a gate 2548 to provide a low output at an all complete output terminal 2550. This latter low signal is utilized to signal the PCB 100 (FIGS. 10 to 12) circuit that there is an event in the timer system taking place.

When the end parenthesis is sensed by the reader, this input signal is fed to an end parenthesis nand gate 2560, the input signals corresponding to channels 1, $\bar{2}$, $\bar{3}$, 4, $\bar{5}$, 6, $\bar{7}$ to cause the output from the gate 2560 to go momentarily low. This momentary low signal resets the flip flop 2514 to remove the high input signal to the run-stop flip flops 2516, 2518 and 2520 corresponding to the first, third and second timers respectively. At this time the timing period for the selected timer starts. The one second pulses being generated from the output of counters 2470 and fed to the input circuit of the timer 2510 causes the timer to start counting.

Specifically, this output signal is fed to the input circuit of a nand gate 2470 by means of the conductor 2502 to cause the output of the gate 2470 to pulse alternately high and low due to the fact that the other two inputs to the gate are high as will be seen hereinafter. As the one second pulses are fed through the gate 2570 and inverted by gate 2572, the pulses are counted by the flip flops 2530 and 2532 until both outputs of the flip flops 2530 and 2532 are high. When these outputs are high, the outputs being fed to the input circuit of a gate 2576, the high signals cause the output of gate 2576 to go low. This low output signal is fed to the direct reset input circuit of flip flop 2516 to reset the run-stop flip flop 2516.

Also, it will be noted that the output previously has been high thereby establishing one of the inputs to gate 2570 high. Also, as was noted before, the input on conductor 2502 is high. When this flip flop 2516 is reset, the output on conductor 2544 going to the input circuit of gate 2546 is high and the other inputs to gate 2546 are also high due to the fact that the other timers being fed to the input circuit thereof are high. The low output from gate 2546 in inverted by gate 2548 to provide a high output at terminal 2550 to indicate an all complete for the timers.

It should be noted that the only other place in the system that the code corresponding to channels 5, 6 and $\bar{7}$ is used is in the station address register. It is necessary to inhibit the station address register during the decoding of numbers for the timer board. This inhibit is accomplished by the output from the flip flop 2514 wherein the sensing of the first parenthesis by gate 2512 sets the flip flop 2514 to provide a low output at an output conductor 2580. This output signal is fed to an inhibit to add register output terminal 2582 by means of a conductor 2584. During the time that this output signal is low, the numbers being decoded on PCB 700 (FIGS. 26–28) will not affect the address register. When the end parenthesis is decoded by the nand gate 2560, the flip flop 2514 is reset and the output signal at output terminal 2582 again goes high to enable the address register to be utilized.

Timers 2 and 3 are adjustable by externally mounted thumbwheel switches from 0 to 99 seconds. These thumbwheel switches will be described in conjunction with the description of FIG. 40 PCB 2100. The technique used to determine when the exact time is counted out is by a binary coded matching system in which the thumbwheel switch provides one binary coded number and the counting decades for each of the timers, contained in circuits 2492 and 2494, are matched with the binary coded numbers for the thumb wheel switches.

Referring first to the third counter, the number 3 is decoded by a nand gate 2590 which includes input signals from channels 1, 2, $\bar{3}$, $\bar{4}$, 5, 6 and $\bar{7}$, these latter three signals coming from an input terminal 2692. The output of the gate goes momentarily low which is fed to the input reset circuit of the plurality of unit flip flops 2600, 2602, 2604 and 2606 and a plurality of tens flip flops 2614 to 2620. The flip flops 2600 to 2606, a nand gate 2608 and an inverter gate 2610 are interconnected in a common decade counter circuit 2612. These latter flip flops and gates form the units portion of the decade counter and the plurality of flip flops 2614, 2616, 2618, 2620 and gates 2622, 2624 form the tens portion of the decade counter, as is common in the art.

As stated above, the divide by sixty counter circuit 2470 provides one second output pulses to the input circuit of the units counter 2612 by means of the conductor 2498, a nand gate 2630 and an inverter gate 2632. The gate 2630 includes inputs from the output circuit of flip flop 2518 which enables the gate 2630 to pass the clock pulses through the gate 2630 in the event that a return from the third timer has not been received at an input terminal 2640. The pulses are fed through the inverter circuit 2632 to the input circuit of flip flop 2600 and the output from the final flip flop 2606 is fed to the input circuit of the initial tens flip flop 2614 by means of conductor 2642. The output from the various stages of the flip flops are fed to a plurality of output terminals 2646 corresponding to the true and not true sides for channels 1, 2, 4, 8, 10, 20, 40 and 80. These signals are fed to the PCB 2100 circuit containing the thumb wheel switches, the thumb wheel switches making a comparison between the count provided by circuit 2492 and the set count entered into the thumb wheel switch by the operator.

When a match has been achieved between the set time and the counted time, a common or return signal from the thumb wheel switch is fed back to the input circuit of FIG. 26 as a return signal on terminal 2640. When a match has been achieved between the register and the switches, the input signal at input terminal 2640 is high, this signal being inverted by a gate 2648 and fed to the input circuit of gate 2630 by means of a conductor 2650. This signal inhibits the further operation of the gate 2630 and precludes any further pulses from being fed to the units counter circuit 2612.

When the match has been achieved and terminal 2640 goes high, the output of gate 2648 goes low, this signal being fed to the input circuit of a gate 2652. This low signal renders the output of gate 2652 high, this high signal being inverted by gate 2654 and fed to the direct reset circuit of the flip flop 2518 by means of a conductor 2656. This signal resets the run-stop flip flop 2518 to inhibit the operation of gate 2630.

During the timing period, the reset output from flip flop 2514 was low, this low signal being fed to the input circuit of the gate 2546 causing the all complete signal at output terminal 2550 to be low. Once reset, all three inputs to gate 2546 go high causing the output all complete to go high signalling the PCB 100 circuit that the timing period has been complete and more information may be read from the tape.

Timer 2 functions identically to that described in conjunction with timer 3, the timer including flip flops 2660, 2662, 2664, 2666 and gates 2668 and 2670 for the units portion of the counter. Also, the tens counter includes flip flops 2674, 2676, 2678 and 2830, nand gate 2682 and inverter gate 2684 for the tens portion of the decade counter. The output of the counter circuit 2494 to the thumb wheel switch circuits of FIG. 40 (PCB 2100).

The match between the register circuit 2494 and the thumb wheel switch circuit of PCB 2100 causes a return signal to be generated on a timer 2 input terminal 2690 this signal being inverted by gate 2692 and fed to the input circuit of a gate 2694. The high signal at input terminal 2690 is inverted to a low signal by gate 2692, this low signal producing a low output signal at the output terminal of a gate 2696 and is fed to the direct reset circuit of the run-stop flip flop 2520 thereby resetting the flip flop. The signal condition of gate 2692 is also fed to the input circuit of a gate 2698 to enable the operation of the gate 2698 thus passing timing pulses from the divide by sixty counter circuit 2470 through the gate 2698 by means of pulses being fed to the conductor 2496.

The timers may also be reset by a reset signal being fed to input terminal 2700 which provides a resetting signal to the input circuit of gates 2652 for number 3 timer and 2694 for number 2 timer. Also, the fact that the timers are on are sensed by signals at input terminals 2702, 2704, 2706 corresponding to timers 2, 1 and 3, these signals being fed to the input circuit of gate 2546 to provide an indication that the timers have been energized.

Figure 29:
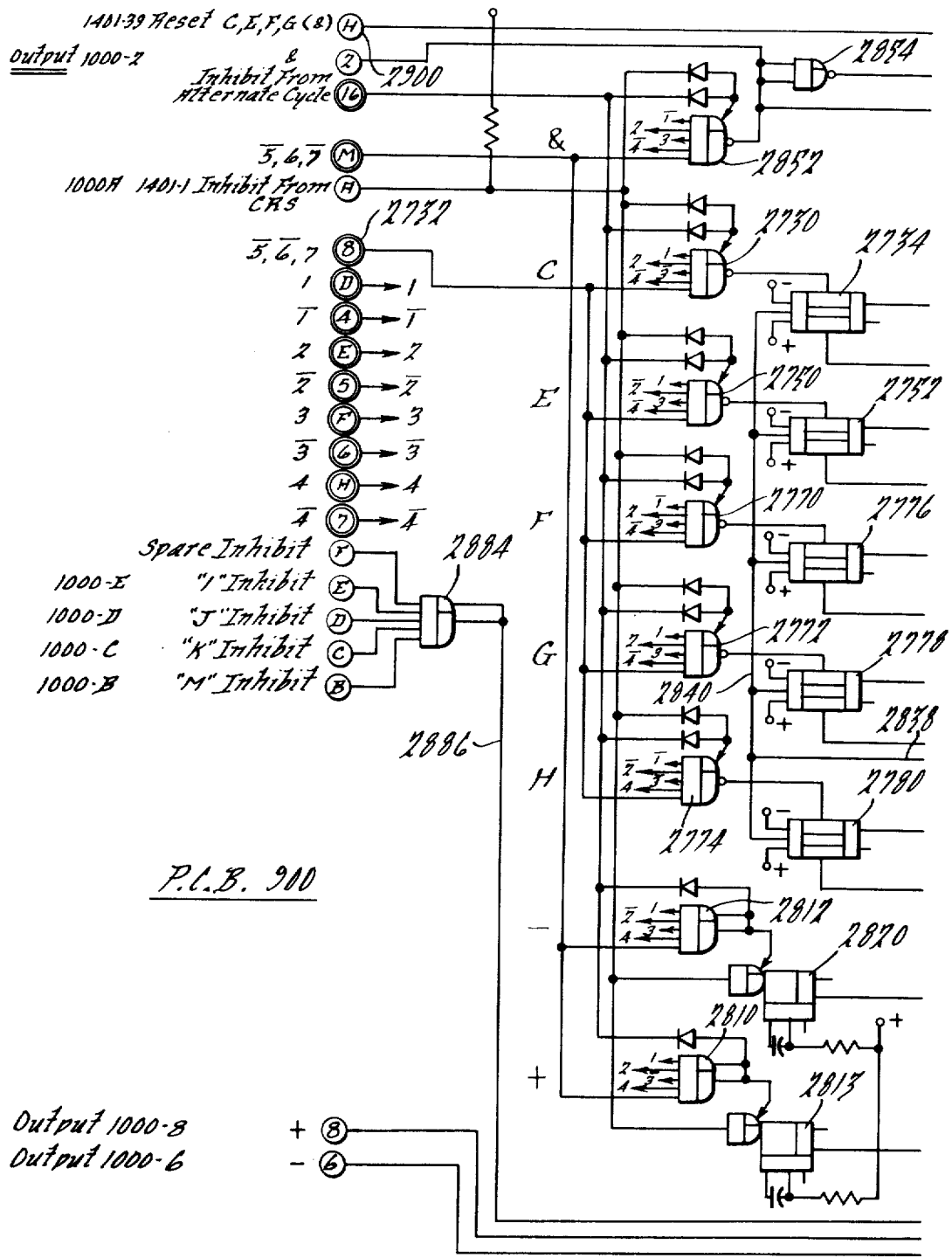
FIG. 29 is a schematic diagram illustrating a portion of the interlock circuitry and particularly illustrating the input section thereof.
Figure 30:
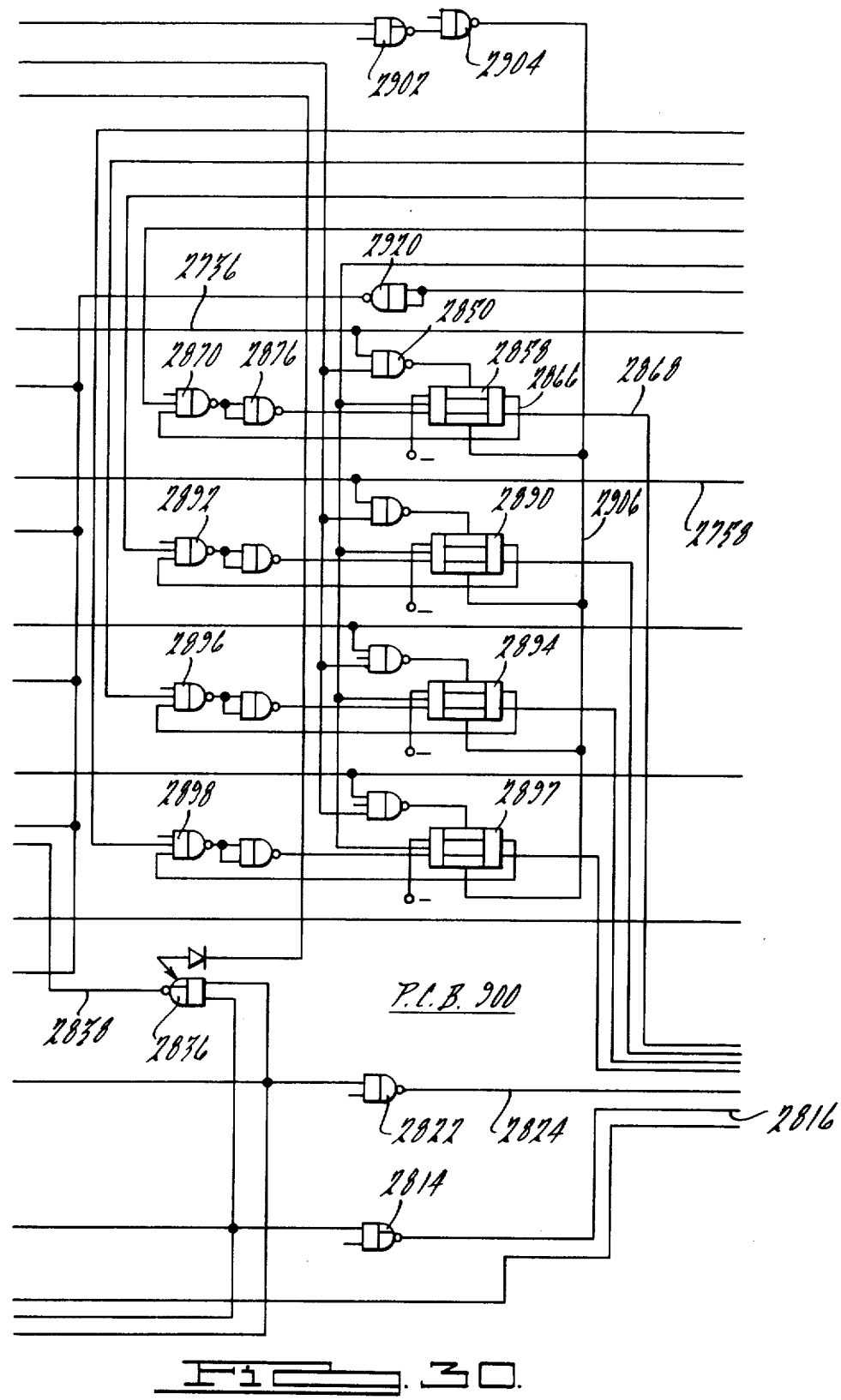
FIG. 30 is a schematic diagram illustrating another portion of the inner interlock circuitry and particularly another input section thereof.
Figure 31:
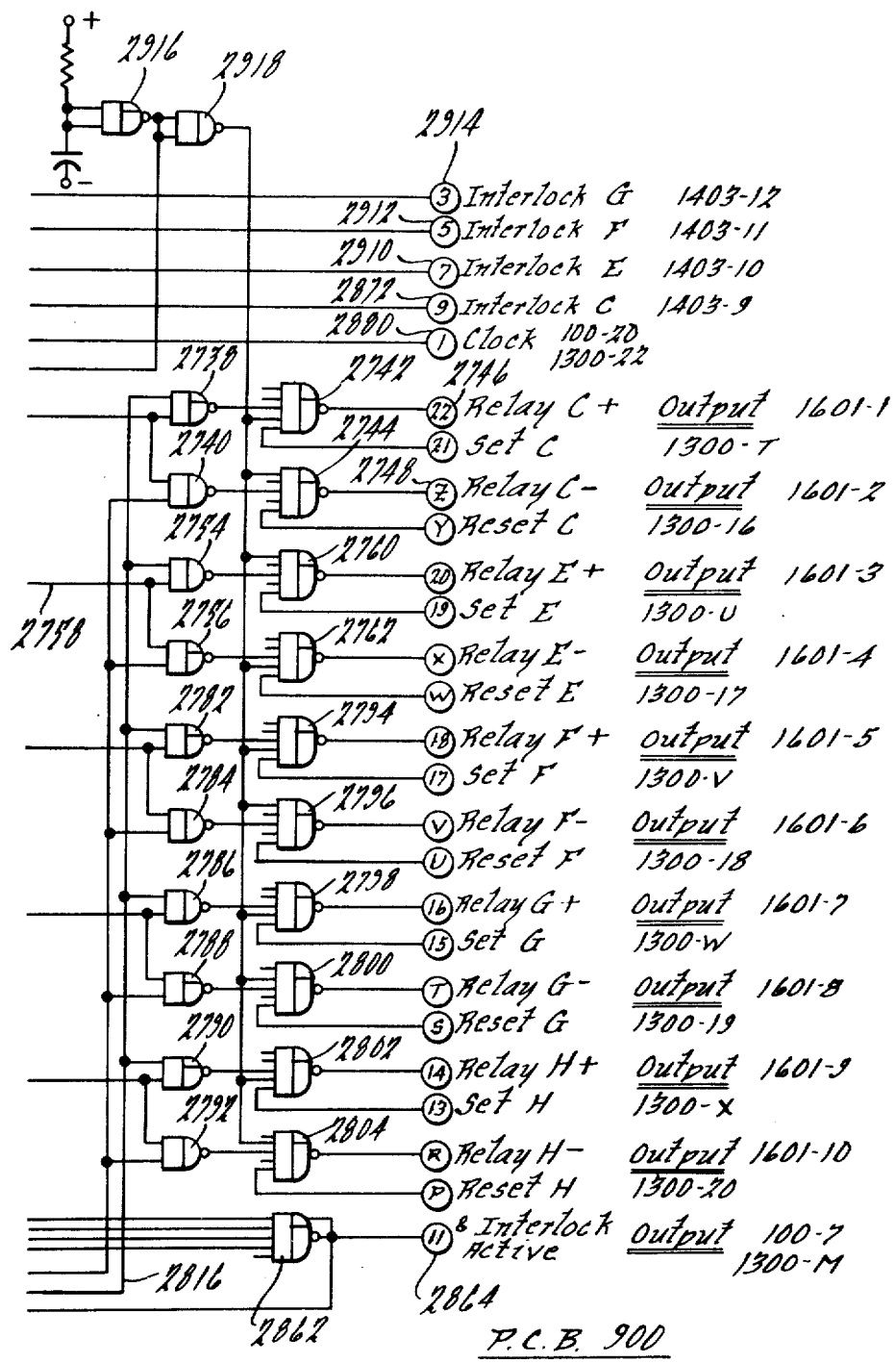
FIG. 31 is a schematic diagram illustrating the final portion of the inner interlock circuitry and particularly illustrating the details of the output section thereof.

Referring now to FIGS. 29–31 which correspond to PCB 900, the function of the 900 circuit board is to decode the appropriate tape signals and drive the relays on PCB 1600 to an on or off position. The relays on PCB 1600 are single-coil, permanent magnet, latching relays which are operated by passing current through the coil in one direction to latch and the other direction to unlatch. These relay contact signals are brought out to terminals on the edge of the logic rack and may be used as necessary for interlocking with other hoists, shuttles or driving AC outputs, for example outputs to be described in conjunction with PCB 1800. As a convenience, the relays may or may not be operated while homing the tape and this is accomplished by having the CRS (or run relay) energized to activate the interlocks while homing the tape, or by not having the CRS energized while homing the tape.

In this way it is possible to stop the operation of a hoist in the middle of its cycle, turn the CRS off, home the tape and step it back to some intermediate position without changing any of the previously established relay contact positions. When homing the tape to start a new cycle, it is necessary to put the CRS on to permit the tape to leave the relays in their last commanded position in the tape program. In this way, the program is allowed to be reset back to its starting position.

Referring now to the specific details of the decoder circuits, it is seen that the letter C is fed to the input circuit of a gate 2730 corresponding to channels 1, 2, $\bar{3}$, $\bar{4}$, $\bar{5}$, $\bar{6}$ and 7, these latter signals being fed from the input circuit at terminal 2732. When the C is decoded the output signal level from gate 2730 will go momentarily low to provide a setting input pulse to a flip flop circuit 2734 thereby setting the flip flop 2734 at the high level. Thus high signal is fed by means of an output conductor 2736 to the input circuit of a nand gate 2738. The gate 2738 includes the high input signal from conductor 2736 and also a second high input signal from a plus circuit to be described hereinafter. Also, the letter C input signal is fed to a second gate 2740 which also includes an input signal from a minus circuit to be described hereinafter.

When both input signals to gates 2738, 2740 are high, only one condition occurring at any given time, a low output signal is fed to a C+ output gate 2742 or to a C− output gate 2744, as the case may be. When the output signal is realized at either the output gates 2742, 2744, these output signals are fed to a relay C+ output terminal 2746 or a relay C− output terminal 2748 to provide actuating signals for the reed relays associated with PCB 1600. The relays on PCB 1600 are connected across the output of the plus and minus driver gates. This type of gate has an active pullup and causes current to flow through the relay coil in a particular direction depending on the energization of either the plus or minus. For example, if a plus is decoded, the current through the relay coil will flow in a first direction between the plus and minus terminals 2746, 2748. On the other hand, if a minus signal is detected, the current will flow through the relay in the opposite direction turning the relay off.

The letter E is decoded by sensing the code corresponding to channels 1, $\bar{2}$, 3, $\bar{4}$, $\bar{5}$, $\bar{6}$ and 7, which signals are fed to the input circuit of a gate 2750. The decoding of this combination of channels provides a setting input signal to flip flop 2752, the output of flip flop 2752 being fed to relay E output gates 2754, 2756 by means of a conductor 2758. If a plus signal has also been decoded, the gate 2754 will create a positive four millisecond output pulse at E+ output gate 2760 and, on the other hand, if an E− signal is detected, a positive output signal will be provided from output nand gate 2762.

Similarly, gates 2770, 2772, 2774 are provided to decode the letters F, G and H in accordance with the particular code illustrated at the input circuits to the gates 2770, 2772, 2774 in combination with channels $\bar{5}$, $\bar{6}$ and 7 derived from input terminal 2732. These signals are utilized to set flip flops 2776, 2778 and 2780 respectively, the outputs thereof being fed to F output gates 2782, 2784, G output gates 2786, 2788 and H output gates 2790, 2792.

If an F+ has been sensed, a positive output signal will be provided by an output gate 2794 and on the other hand if an F− has been decoded an output signal will be provided at the output terminal of gate 2796. Similarly, G+, G−, H+ and H− outputs are provided in response to sensing that combination of codes by output gates 2798, 2800, 2802 and 2804 respectively.

Referring now to the plus and minus characters, the plus character is decoded by means of an expander circuit 2810 and the minus circuit is decoded by means of an expander circuit 2812. When the plus signal is decoded, the output of the expander 2810 momentarily goes high which permits a single shot multivibrator circuit 2813 to operate and time out. The single shot multivibrator circuit 2813 produces a negative going output pulse of four millisecond duration, this output pulse being inverted by means of a gate 2814. The output of gate 2814 goes momentarily high for four milliseconds to produce a four millisecond pulse on conductor 2816. This pulse is fed to the input circuits of nand gates 2738, 2754, 2782, 2786 and 2790.

On the other hand, when the negative signal is sensed, the expander circuit 2812 goes momentarily high to permit another four millisecond single shot multivibrator circuit 2820 to operate thereby producing a low four millisecond output pulse at the output terminal thereof, this signal being inverted by means of an inverter circuit 2822. This minus signal is fed to the input circuits of gates 2740, 2756, 2784, 2788 and 2792 by means of a conductor 2824.

Thus, if a plus signal has been sensed, the output of gate 2814 goes positive, this signal being fed to the input circuit of gate 2738. If a C has also been decoded, the two inputs to the gate 2738 will be high thereby producing a low four millisecond pulse at the output terminal thereof. This four millisecond pulse is fed to gate 2742 to provide a positive going output pulse at output terminal 2746. It will be noted that the output terminal 2748 is at this time, low. Therefore, the coil connected between terminals 2748 and 2746 will be provided with a current flowing therethrough. If the opposite condition exists, the terminal 2748 will be plus and the terminal 2746 will be low.

When either a plus or a minus has been decoded, the output from either single shot multivibrator circuit 2813 or 2820 provides a low input signal to a nand gate 2836, thus causing the output of the gate 2836 to go momentarily high. This high output is connected to all of the clock inputs to flip flops 2734, 2752, 2776, 2778 and 2780 by means of conductors 2838 and 2840. On all of these flip flops, the J input is normally low and the K input is permanently high, so that any pulse on the clock input to the gates will only turn it off. In the example given above, the flip flop 2734 had previously been turned on and, because a plus has been decoded, the J input is high and the clock input receives a momentarily high pulse. When this pulse falls, the output from flip flop 2734 returns to its low condition. It is to be noted that this plus and minus operation is typical for all of the letters C, E, F, G, H, I, J, K, M and N described in conjunction with FIGS. 29–31 and to be described in conjunction with FIG. 32.

Referring now to the "&" interlock portion of the circuit, the function of the "&" interlock in the system is to check incoming signals from the other devices or pieces of equipment within the entire assembly. The format used in addressing this portion of the system is "C&". When the C is decoded, the output from gate 2730 goes momentarily low causing JK flip flop 2734 to go high, this high signal being fed to the input circuit of a gate 2850 by means of the conductor 2736. The & is decoded by means of a nand gate 2852 which decodes the & in response to the decoding of a signal corresponding to channels $\overline{1}$, 2, 3, $\overline{4}$, $\overline{5}$, 6 and $\overline{7}$. The output of gate 2852 goes momentarily low and, through an inverter circuit 2854, causes the output thereof to go momentarily high. The output of gate 2854 is connected to the input circuit of gate 2850 which is combined with the letter C signal, in this case high, to provide a momentary low signal at the output terminal of gate 2850. This low signal sets a JK flip flop 2858, also causing the output of the gate 2854 to go momentarily high. The output from gate 2852 also goes through an expander diode input to the input circuit of gate 2936, this input going low and causing the output of gate 2836 to go momentarily high. This high signal, as previously explained, will reset the letter flip flops, in the case of C, the letter flip flop 2734. The output from flip flop 2858 is fed to expander circuit 2862, the output from the expander 2862 being fed to the PCB 100 circuit through an "& interlock active" output terminal 2864.

When the flip flop 2858 has been set, the output at output conductor 2866 is high and the output at output conductor 2868 is low, the signal level on conductor 2866 being fed to the input circuit of gate 2870 thus providing a high input thereto. When the C interlock input is satisfied, the "interlock C" signal input at input terminal 2872 goes high, this high signal being fed to the input circuit of gate 2870 to be combined with the set condition of flip flop 2858. Because both inputs to gate 3870 are high, the output thereof goes low, this low signal being inverted by gate 2876 to produce a high output therefrom. At this time, the J input to flip flop 2858 is low and the K input is high. A clock input terminal 2880 causes, on the next clock pulse, the flip flop to turn back to its original off condition. This allows the output signal on output terminal 2868 to go high again allowing the output from the expander 2862 and the output terminal 2868 to go high. At this time the system may proceed through its cycle. The operation of the E, F, G, H, I, J, K and M interlocks are identical to this same operation. The expander circuit 2884 includes inputs from the PCB 1000 circuit corresponding to the I, J, K and M inhibits and collects the signals and provides an output on an output conductor 2886. This signal level is fed to the output circuit of expander 2862 to provide an output signal at terminal 2864.

The E interlock function is provided by flip flop 2890 and input gate 2892, the F interlock function by flip flop 2894 and input gate 2896 and the G interlock function by flip flop 2897 and gate 2898, these circuits operating identically to that described in conjunction with flip flop 2858 and gate 2870. The flip flops 2858, 2890, 2894 and 2897 are reset by a reset signal fed at input terminal 2900, this signal being fed through inverter gates 2902, 2904 to the direct reset inputs to the flip flops 2858, 2890, 2894, 2897 by means of a conductor 2906.

The PCB 900 circuit is a master circuit and decodes the plus and minus and & signals for the PCB 1000 circuit. In the event it becomes necessary to reset an interlock without actually causing the inputs on the input terminal 2872 and input terminals 2910, 2912 and 2914 to go high, there is the input reset at terminal 2900 that is normally high. When this signal is brought low it causes the output to the direct resets to go low thereby resetting the flip flops 2858, 2890, 2894, 2897. To prevent any unwanted gate conditions during power on, the time delay off signal is provided by gates 2916 and 2918 which perform two functions. The first function is to prevent flip flops 2734, 2752, 2776, 2778 and 2780 from being turned on during the period that the power to the system is being turned on. This occurs due to the fact that the inputs to gates 2916 are tied through a capacitor to ground and the output of an inverter gate 2920 is thus held low for a short period of time until the capacitor charges. The output of gate 2918 goes to all of the output buffer gates 2742, 2744 and 2760 to 2804 to prevent any change in these output signals. This precludes the possibility of relay positions being changed as the power comes on.

Figure 32:
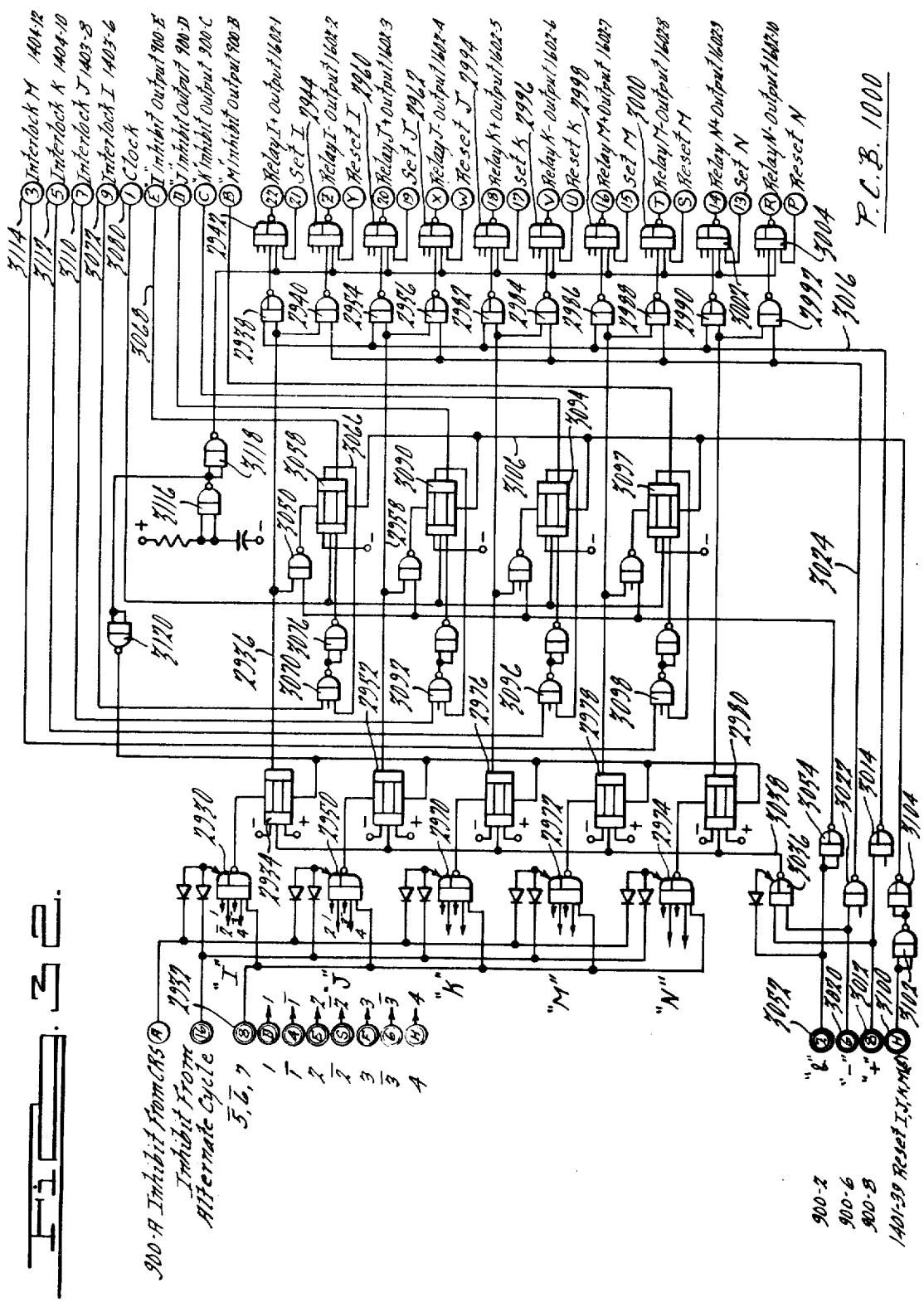
FIG. 32 is a schematic diagram illustrating the details of another inner interlock circuit similar to the circuitry illustrated in FIGS. 29-31.

Referring now to FIG. 32, which corresponds to PCB 1000, the function of the 1000 circuit board is to decode the appropriate tape signals and drive the relays on a second PCB 1600 circuit to an on or off position, the operations of these relays having been explained above.

Referring now to the specific details of the decoder circuits, it is seen that the letter I is fed to the input circuit of a gate 2930 corresponding to channels 1, $\bar{2}$, $\bar{3}$, 4, $\bar{5}$, $\bar{6}$ and 7, these latter signals being fed from the input circuit at terminal 2932. When the I is decoded, the output signal level from gate 2930 will go momentarily low to provide a setting input pulse to a JK flip flop circuit 2934 whereby setting the flip flop 2934 at the high level. This high signal is fed by means of an output conductor 2936 to the input circuit of a nand gate 2938. The gate 2938 includes the high input signal from conductor 2936 and also a second high input signal from a plus circuit to be described hereinafter. Also, the letter I input signal is fed to a second gate 2940 which also includes an input signal from a minus circuit to be described hereinafter.

When both input signals to gates 2938, 2940 are high, and only one condition occurring at any given time, a low output signal is fed to a 1+output gate 2942 or to a 1−output gate 2944, as the case may be. When the output signal is realized at either the output gates 2942, 2944, these output signals are fed to a relay 1+ output terminal or a relay 1−output terminal to provide actuating signals for the reed relays associated with the second PCB 1600 circuit. The relays on PCB 1600 are connected across the output of the plus and minus driver gates. As described above, this type of gate has an active pullup and causes current to flow through the relay coil in a particular direction depending on the energization of either the plus or minus. For example, if a plus is decoded, the current through the relay coil will flow in a first direction between the plus and minus terminals from gates 2938, 2940. On the other hand, if a minus signal is detected, the current will flow through the relay in the opposite direction turning the relay off.

The letter J is decoded by sensing the code corresponding to channels 1, 2, $\bar{3}$, 4, $\bar{5}$, $\bar{6}$ and 7, which signals are fed to the input circuit of a gate 2950. The decoding of this combination of channels provides a setting input signal a JK flip flop 2952, the output of flip flop 2952 being fed to relay J output gates 2954, 2956 by means of a conductor 2958. If a plus signal has also been decoded, the gate 2954 will create a positive four millisecond output pulse at J+ output gate 2960 and, on the other hand, if J− signal is detected, a positive output signal will be provided from output nand gate 2962.

Similarly, gates 2970, 2972, 2974 are provided to decode the letters K, M and N in accordance with the particular code illustrated at the input circuits to the gates 2970, 2972, 2974 in combination with channels $\bar{5}$, $\bar{6}$ and 7 derived from input terminal 2932. These signals are utilized to set JK flip flops 2976, 2978 and 2980 respectively, the outputs thereof being fed to K output gates 2982, 2984, M output gates 2986, 2988 and N output gates 2990, 2992.

If a K+ has been sensed, a positive output signal will be provided by an output gate 2994 and on the other hand if a K− has been decoded an output signal will be provided at the output terminal of gate 2996. Similarly, M+, M−, N+ and N− outputs are provided in response to sensing that combination of codes by output gates 2998, 3000, 3002 and 3004 respectively.

Referring now to the plus and minus characters, the plus character is decoded by means of the expander circuit described in conjunction with FIGS. 29 to 31. The sensing of the plus is fed to PCB 1000 by an input terminal 3012 and inverted by gate 3014. The inverted signal is fed to gates 2938, 2954, 2982, 2986 and 2990 by a conductor 3016. On the other hand, when the negative character is sensed, the expander circuit described in conjunction with FIG. 29 goes momentarily high to permit another low four millisecond output pulse at the input terminal 3020, this signal being inverted by means of an inverter circuit 3022. This minus signal is fed to the input circuits of gates 2940, 2956, 2984, 2988 and 2992 by means of a conductor 3024.

Thus, if a plus signal has been sensed, the output of gate 3014 goes positive, this signal being fed to the input circuit of gate 2938. If an I has also been decoded, the two inputs to the gate 2938 will be high thereby producing a low four millisecond pulse at the output terminal thereof. This four millisecond pulse is fed to gate 2942 to provide a positive going output pulse at the output terminal. When either a plus or a minus has been decoded, the output from either signal shot multivibrator circuit provides a low input signal to a nand gate 3036, thus causing the output of the gate 3036 to go momentarily high. This high output is connected to all of the clock inputs to flip flops 2934, 2952, 2976, 2978 and 2980 by means of the conductor 3038. On all of these flip flops, the J input is normally low and the K input is permanently high, so that any pulse on the clock input to the gates will only turn it off. In the example given above, the flip flop 2934 had previously been turned on and, because a plus has been decoded, the J input is high and the clock input receives a momentarily high pulse. When this pulse falls, the output from flip flop 2934 returns to its low condition. It is to be noted that this plus and minus operation is typical for all of the letters C, E, F, G, H, I, J, K, M and N described in conjunction with FIGS. 29–31 and being described in conjunction with FIG. 32.

Referring now to the & interlock portion of the circuit, the function of the & interlock in the system is to check incoming signals from the other devices or pieces of equipment within the entire assembly. The format used in addressing this portion of the system is I&. When the I is decoded, the output from gate 2930 goes momentarily low causing flip flop 2934 to go high, this high signal being fed to the input circuit of a gate 3050 by means of the conductor 2936. The & is decoded by means of the nand gate of FIG. 29 which decodes the & in response to the decoding of a signal corresponding to channels $\bar{1}$, 2, 3, $\bar{4}$, $\bar{5}$, 6 and $\bar{7}$. The output of PCB 900 is fed to the input terminal 3052 goes momentarily low and through an inverter circuit 3054 causes the output thereof to go momentarily high. The output of gate 3054 is connected to the input circuit of gate 3050 which is combined with the letter I signal, in this case high, to provide a momentary low signal at the output terminal of gate 3950. This low signal sets a JK flip flop 3058 causing the output of the flip flop to go momentarily high. The & input signal at terminal 3052 goes through an expander diode input to the input circuit of gate 3036, this input going low and causing the output of gate 3036 to go momentarily high. This high signal, as previously explained, will reset the letter flip flops, in the case of I flip flop 2934, by a signal on conductor 3038. The output from flip flop 3058 is fed to the output circuit of expander circuit 3862, of FIG. 31 by a conductor 3068, the output from the expander 2862 being fed to the PCB 100 circuit through an & interlock active output terminal 2864.

When the flip flop 3058 has been set the output at output conductor 3066 is high and the output at output conductor 3068 is low. When the I interlock input is satisfied, the interlock I signal input at input terminal 2972 goes high, this high signal being fed to the input circuit of gate 3070 to be combined with the set condition of flip flop 3058. Because both inputs to gate 3070 are high, the output thereof goes low, this low signal being inverted by gate 3076 to produce a high output therefrom. At this time, the J input to flip flop 2858 is low and the K input is high. The clock input at an input terminal 3080 causes, on the next clock pulse, the flip flop to turn back to its original off condition. This allows the output signal on output conductor 3068 to go high again allowing the system to proceed through its cycle. The operation of the J, K and M interlocks are identical to this same operation.

The J interlock function is provided by flip flop 3090 and input gate 3092, the K interlock function by flip flop 3094 and input gate 3096 and the M interlock function by flip flop 3097 and gate 3098, these circuits operating identically to that described in conjunction with flip flop 3058 and gate 3090.

In the event it becomes necessary to reset an interlock without actually causing the inputs on the input terminals 3072, 3110, 3112, 3114 to go high, there is the input reset at terminal 3100 that is normally high. When this signal is brought low it causes the output to the direct resets to go low thereby resetting the flip flops 3058, 3090, 3094, 3097 by means of a reset signal fed at input terminals 3100, this signal being fed through inverter gates 3102, 3104 to the direct reset inputs to the flip flops 3058, 3090, 3094 and 3097 by means of a conductor 3106. To prevent any unwanted gate conditions during power on, the time delay off signal is provided by gates 3116 and 3118 which perform two functions. The first function is to prevent flip flops 2934, 2952, 2976, 2978 and 2980 from being turned on during the period that the power to the system is being turned on. This occurs due to the fact that the inputs to gates 3116 are tied through a capacitor to ground and the output of an inverter gate 3120 is thus held low for a short period of time until the capacitor charges. The output of gate 3118 also goes to all of the output buffer gates 2942, 2944 and 2960, 2962 and 2994 to 3004 to prevent any change in these output signals. This precludes the possibility of relay positions being changed as the power comes on.

The program illustrated in FIG. 9 does not show an alternate cycle program which may be provided with this system. When the alternate cycle program is used, three binary weighted switches, BCD-1, BCD-2, BCD-4 are used for input information, these switches either being panel mounted or mounted on the carriage 52 in such a way as to be engaged by cards or flags attached to the barrel assembly. The alternate cycle register, as will be described in conjunction with FIGS. 33 and 34 includes seven variations, plus the regular program for use by the operator, the seven variations, plus the regular program, being capable of being programmed into the tape when executed. Only one of these variations will be used at any one time.

For example, the code "!" causes the input information to be read and stored. The code "[" is the beginning of the alternate cycle portion of the program and more specifically the "0" block. At the end of this block, a comma (",") is inserted to separate the various operation groups. At the end of the alternate cycle block there is provided a coded bracket ("]") which signifies the end of the alternate cycle section and a return to the regular part of the program. Following is an example of an alternate cycle program with the associated operations of the machine.

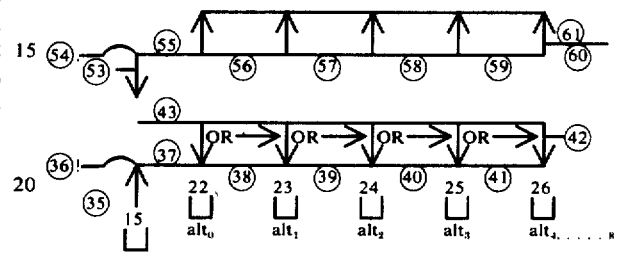

| Step Number | Tape Code | Step Number | Tape Code |
|---|---|---|---|
| 35 | U | 53 | D |
| 36 | ! | 54 | ! |
| 37 | [R22, | 55 | [R22, |
| 38 | R23, | 56 | R23, |
| 39 | R24, | 57 | R24, |
| 40 | R25, | 58 | R25, |
| 41 | R26] | 59 | R26] |
| 42 | D | 60 | U |
| 43 | LXX | 61 | RXX |

For example if the detected variation is number 3 (use of tank 25) the sequence would be as follows:

| | |
|---|---|
| 35 | "!" read information and reset internal counter |
| 36 | "[" open register R22 check "O" (mismatch) |
| 37 | R23 check block 1 (mismatch) |
| 38 | R24 check block 2 (mismatch) |
| 39 | R25 match block 3 and do operation |
| 40 | R25 mismatch |
| 41 | R26 mismatch |
| | ] close block and return to program |
| 42 | D hoist down |
| 54 | reset internal counter |
| 55 | [ open register R22 - check block "O" (mismatch) |
| 56 | R23 mismatch |
| 57 | R24 mismatch |
| 58 | R25 match - do operation 58 |
| 59 | R26 mismatch |
| | ] close register and return to program |
| 60 | D down |

Thus a variation within a main program may be provided and used at the discretion of the operator by merely flagging a particular work piece.

Figure 33:
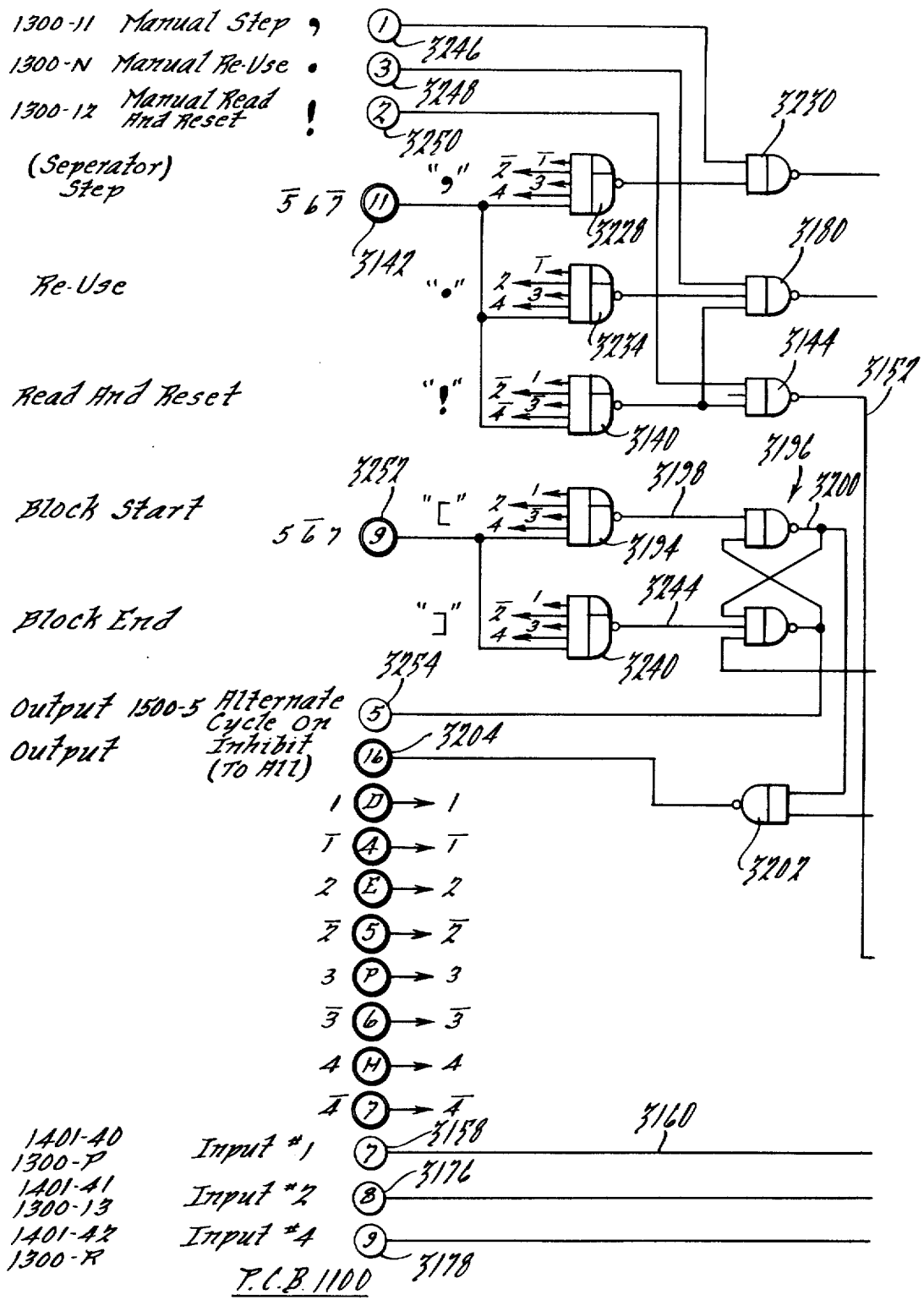
FIG. 33 is a schematic diagram illustrating a portion of an alternate cycle register circuit particularly illustrating the details of the input and output circuits.
Figure 34:
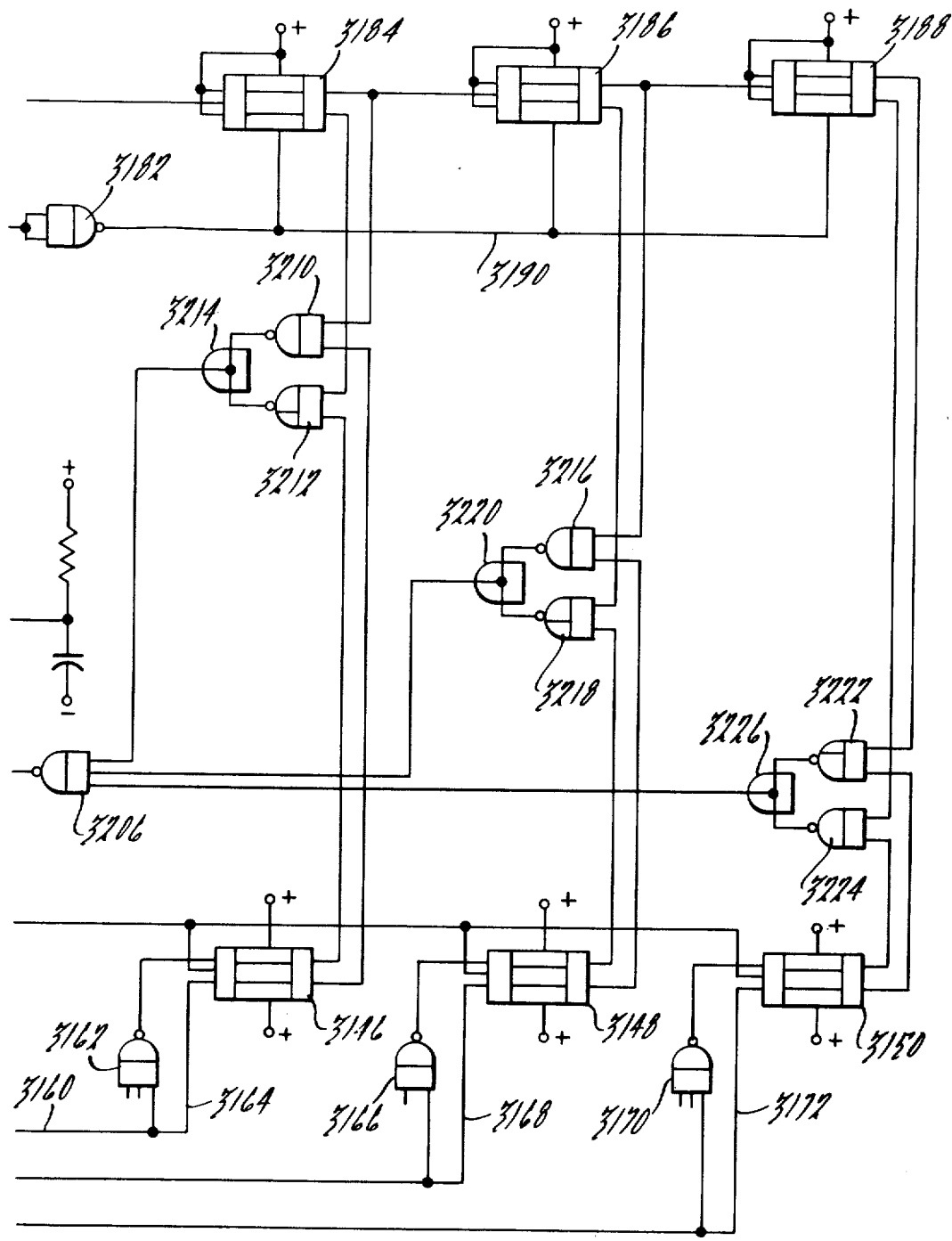
FIG. 34 is a schematic diagram illustrating the remaining portion of the alternate cycle register circuitry and particularly illustrating the operative portion of the circuit.

Referring now to FIGS. 33 and 34 (PCB 1100) this circuit is used as the logic system to provide variations in a program selected by externally mounted switches. This circuit is used for the purpose of selecting, within a common program, certain variations that may be necessary for the particular type of part being processed. For example, in an electromechanical process, two or three different colors of dye may be utilized, various times in certain portions of the process may be required or certain interlocks may be required to be turned on or off. The format used for this particular program includes a ! which is the coded character that causes the switches on the work rack to be read. This information is stored in a register and, at the same time, resets the counting registers. The information may be used immediately or at some point later in the program. The format for recognizing the alternate cycle program is the provision of a coded "[" a first or zero block, and a comma which is utilized as a code for separation between the blocks. When all of the necessary information has been inserted the program provides the code "]", which closes off the registers and lets the machine return to reading information in sequence punched on the tape. Thus, th PCB 1100 circuit will respond to [, ], "[", "]", "!", "." and "," commands.

Assume that a program composed of "!" "[" block zero "," block one "," block two "," block three "," block four "," block five "," block six "," block seven "," block eight "]", is inserted near the beginning of a hoist program. Further assume that later in the cycle there is a group of operations proceeded by a "." and a bracket "[" with blocks one through eight similar to the previous example. As the hoist proceeds through its program, when the "]" is read, the output from a gate 3140 goes momentarily low due to the fact that a coded signal corresponding to the exclamation point in channels 1, $\bar{2}, \bar{3}, \bar{4}, \bar{5}$, 6, $\bar{7}$, these latter signals being provided by a signal level at an input terminal 3142. The low output from gate 3140 causes the output of a gate 3144 to go momentarily high, this signal being conducted to the clock input of flip flops 3146, 3148, 3150 by means of a conductor 3152. The J and K input to flip flop 3146 is provided by a BCD-1 input terminal 3158 and a conductor 3160, the J input being inverted by means of a gate 3162 and the K input being fed directly by means of a conductor 3164. Similarly, the J input to flip flop 3148 is fed by means of an inverter gate 3166 and the K input by a conductor 3168. In the case of flip flop 3150, the J input is provided by gate 3170 and the K input by means of a conductor 3172, these latter two inputs to flip flops 3148 and 3150 corresoponding to BCD-2 and BCD-4 provided at input terminals 3176, 3178 respectively. When the code for the "[" is decoded, the clock input pulses the binary information corresponding to BCD-1, BCD-2 and BCD-4 at input terminals 3158, 3176, 3178 respectively and to the flip flops 3146, 3148, 3150 respectively. At the same time that this information is being inserted into the storage registers, the output of gate 3140 is going momentarily low to cause the output of a nand gate 3180 to go momentarily high. This latter momentary high signal causes the output of an inverter gate 3182 to go low. This low signal is fed to the direct reset input circuits of a plurality of JK flip flops 3184, 3186, 3188 by means of a conductor 3190, thereby resetting these flip flop 3184 to 3188.

When the information is stored in the flip flops 3146, 3148, 3150 and the binary counter, consisting of flip flops 3184, 3186 and 3188, is reset, the next character is read by the reader, the character being in the example given, a "]". When the bracket is decoded, the output from a gate 3194 is caused to go momentarily low. This signal is fed to a flip flop 3196 by means of a conductor 3198 to set the flip flop 3196. The set condition of flip flop 3196 provides a high output signal at an output conductor 3200 to provide a high input to a gate 3202. This causes the output of gate 3202 to go low if the other input to the gate 3202 is also high. This low signal is fed to an "inhibit to all" output terminal 3204.

The other input to gate 3202 is fed from a nand gate 3206, the nand gate being used to detect when a mismatch occurs between the stored binary information in register 3146, 3148 and 3150 and the count informtion stored in register 3184, 3186 and 3188. This matching function is accomplished in a manner similar to that described in conjunction with the description of the PCB 200 circuit.

The circuits used for comparing the stored information with the count information include nand gates 3210, 3212 and collector or circuit 3214 for the binary one, nand gates 3216, 3218 and collector or 3220 for the binary two and gates 3222, 3224 and collector or 3226 for the binary four.

When a particular number has been selected and that particular number has been counted, the output, taking for example binary one, from the upper output of flip flops 3134 and 3146 are both high thereby providing high inputs to gates 3210, 3212. Also, the lower inputs are low thereby providing low inputs to each of the gates 3210, 3212. This provides a high output at the output terminals of gates 3210, 3212 to provide a high signal at the input circuit of gate 3206. On the other hand, if a particular number has not been selected and also is not counted, the upper outputs from the flip flops, for example 3186, 3148, will be low and the lower outputs will be high. Thus, a high and low signal will be provided at each input to gates 3216, 3218 at the match to provide a high output at the output terminal of gate 3220. Thus, at match, all of the inputs to gate 3206 will be high to provide a low output at the output terminal of gate 3206. This low output is fed to be input circuit of gate 3202 to provide a high output at output terminal 3204. This high output signal unlocks the decoding for the rest of the system and allows the tape reader to drive the circuit boards as necessary.

The "," separating the blocks of information has only one function which is to index the BCD counter to the next step. This is accomplished by an output signal from a nand gate 3228 going momentarily low due to the sensing of a coded input corresponding to channels, $\bar{1}, \bar{2}, 3, 4, \bar{5}$, 6 and $\bar{7}$. This low output signal is fed to the input circuit of a gate 3230 to provide a high output therefrom. This high output is fed to the input circuit of flip flop 3184, the first flip flop of the register, to increment the register by one count.

The other character decoded by the circuit of FIGS. 33 and 34 is the period, this coded signal being decoded by a nand gate 3234 by sensing a code corresponding to channels $\bar{1}$, 2, 3, 4, $\bar{5}$, 6, $\bar{7}$. This coded signal is utilized to return and use information previously stored in the register although it may not be possible to go back and read the same flag for the input signals as occurred when the register was set. The "." is decoded by the gate 3234 to reset the BCD counter, including flip flops 3184, 3186, 3188, through the gates 3180, 3182. Thus, it can be seen that once information is stored in the storage register, it is possible to go back and reuse this information as many tims as is necessary to complete the operation of the machine. Also, the closed bracket is sensed by means of a gate 3240 to provide a resetting signal at the output conductor 3244 thereby resetting the flip flop 3196 in response to the sensing of the closed bracket.

The system is provided with a manual circuit for a manual step, manual reuse and manual read and reset in accordance with the codes respectively. These manual input signals are derived by the actuation of buttons on a panelboard or some other location for buttons or flags and are fed to the input circuits including input terminals 3246, 3248, 3250 respectively. Also, the gates 3194 and 3240 are provided a common coded input signal from channels 5, 6, 7, this code being generated at an input terminal 3252. Finally, the fact that the alternate cycle is on is sensed by sensing the set condition of flip flop 3198 to provide a low signal from the lower section of the flip flop 3196 at an alternate cycle on output terminal 3254.

Figure 44:
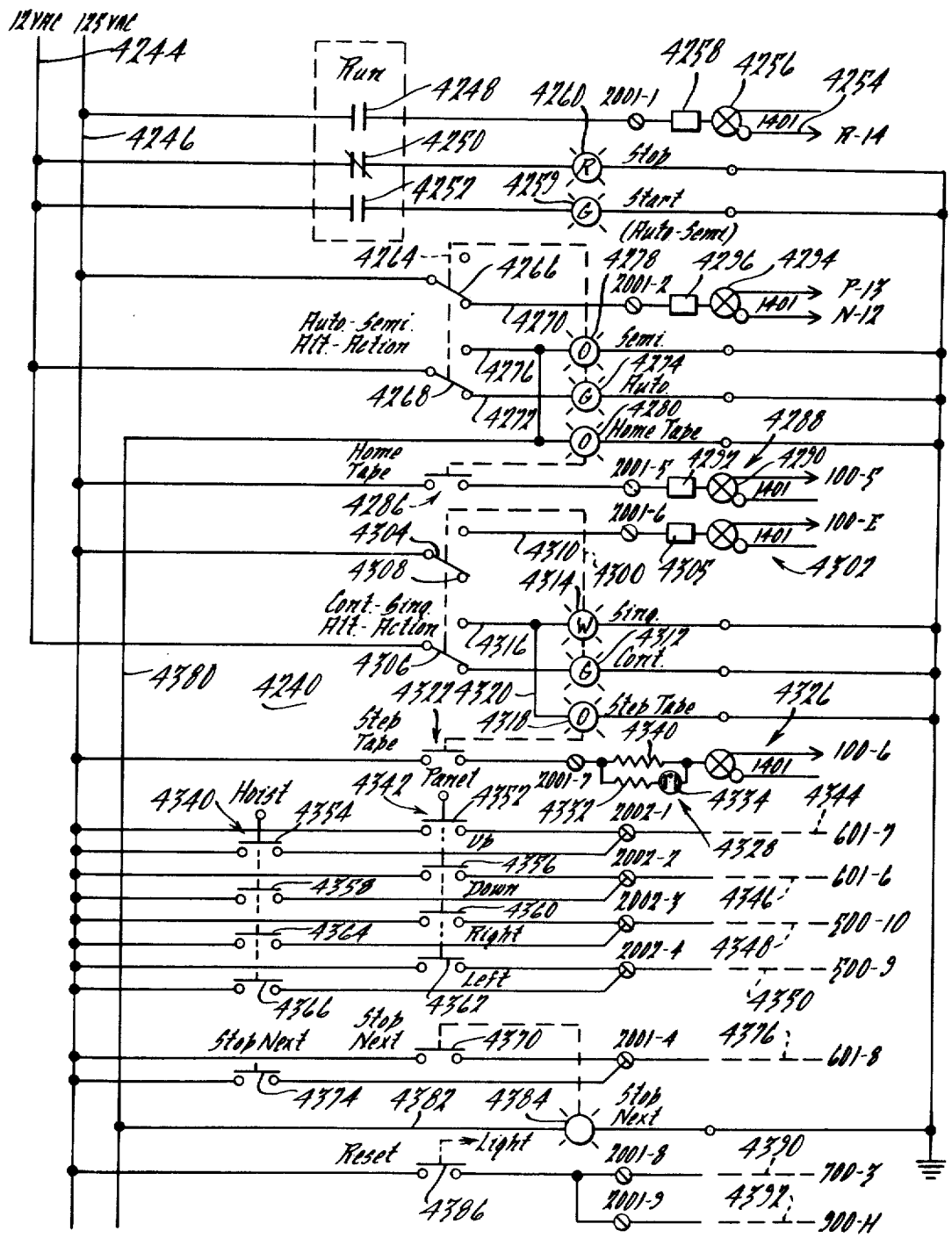
FIG. 44 is a schematic diagram illustrating the input circuitry to the control system described in the above figures.

Referring now to FIG. 35, there is illustrated a typical input converter circuit which is utilized to sense the outputs of the circuit to be described in conjunction with FIG. 44, these output signals being fed to the various portions of the control circuit described above. The converters are utilized to convert the alternating current signal generated in response to the operation of various contactors, etc. of FIG. 44 and convert the signals to a direct current signal which is adapted to be used as an indication signal for the logic circuits of the system described previously. The symbol for the circuit of FIG. 35 is illustrated at 3560 and the symbol is used to signify the details of the circuit 3562.

Referring particularly to those details, an alternating current input signal is provided at input terminal 3564, this alternating current signal being fed to a pair of NPN transistors 3566, 3568 connected in an alternating current to direct current converter configuration whereby an alternating current signal at the input terminal 3564 provides a negative signal at node 3570. A filter capacitor 3572 is provided to smooth the signal at node 3570. The negative signal at node 3570 is fed to the base circuit of a PNP transistor 3574, the base circuit also being connected to a positive source of potential at input terminal 3576 through a resistor 3578.

Thus, when the negative signal appears at node 3570, the transistor 3574 is biased on to cause current to flow through the emitter-collector circuit thereof, and through a pair of resistors 3580, 3582 to develop a voltage across resistor 3582. This voltage is fed to a charging capacitor 3584, the upper end of the capacitor 3584 being connected to the anode circuit of a programmable unijunction transistor 3586. When the anode voltage exceeds the gate voltage, the unijunction transistor 3586 conducts to short a resistor 3588 connected between an output conductor 3590 and ground at terminal 3592. Thus, the conductor 3590 is lowered to ground potential, and normally positive voltage is provided at an output terminal 3590, this voltage going to ground when an alternating current input signal is received at terminal 3564. In certain circumstances, a positive signal is required for the control circuitry in response to the input alternating current signal and, in this situation, an inverter circuit is provided for the positive signal. This inverter circuit has not been illustrated in FIG. 35.

FIG. 36 illustrates a preferred form of light driver circuit 3600 which is adapted to be utilized in conjunction with driving indicator lights associated with the system of the present invention. Thus, any indication of the energization of a circuit may be provided by illuminating an indicator light, the driving current therefore being provided by the circuit of FIG. 6. The symbol for the driver circuit 3600 is illustrated at 3596. Specifically, a source of positive 12 volt potential is supplied at an input terminal 3602 and terminal 3604 is connected to ground. The circuit includes a PNP transistor 3608, the emitter collector circuit of which is connected between terminals 3602 and 3604 through resistors 3610, 3612 and a conductor 3614. When a negative signal is impressed on an input terminal 3616 indicating that a particular circuit has been energized or deenergized, this signal is fed to the base circuit of the transistor 3608 by means of a resistor 3620. This signal at terminal 3616 forward biases the emitter-base circuit of transistor 3608 to cause transistor 3608 to conduct. The conduction of transistor 3608 causes a current to flow through resistors 3610, 3612 to forward bias the base-emitter circuit of an NPN transistor 3624, the emitter electrode of the transistor 3624 being connected to ground potential at conductor 3614.

An indicating light 3626 is connected between a source of positive potential at terminal 3628 and ground potential through the collector-emitter circuit of transistor 3624. Thus, when transistor 3624 conducts, current flows from the input terminal 3628, through the lamp 3626, through the collector emitter circuit of transistor 3624 to ground potential.

Referring now to FIG. 37, there is illustrated the details of the reed relay switches which are adapted to be associated with the output circuits of PCB 900 and PCB 1000 circuits. Specifically, a plurality of relay circuits 3650 corresponding to the code C/1, a switch circuit 3652 corresponding to code E/J, a switching circuit 3654 corresponding to the code F/K, the circuit 5636 corresponding to the code G/M and a circuit 3658 corresponding to the code 11/N. These codes correspond to the codes decoded in the associated circuitry of PCB 900 circuit in the case of the first letter of the combination code and the PCB 1000 circuit in the case of the second letter for each compound code.

As stated above each relay circuit 3658 includes a positive input terminal 3660 and a negative input terminal 3662 corresponding to the sensing of the decoded letter, for example, C, and the decoded sign, for example, +. Thus, if the code C+ is decoded, the input terminal 3660 will be provided a positive input signal and the signal 3662 will remain negative. The relay circuit 3650 includes an inductive kickback suppression means. A plurality of diodes 3670, 3674, are connected to conductors 3672 and 3676 respectively. The cathode side of diodes 3670, 3674 are connected to input 3664 through the conductor 3666.

The inputs to terminals 3660 and 3662 are normally low. As stated above, when the C+ is sensed, the input terminal 3660 goes high, the input terminal 3662 remaining low. This causes current to flow through the coil from the top to the bottom thereof, that is, from terminal 3660 to terminal 3662.

The output circuit includes a common transfer circuit having a terminal 3680 and an armature 3682 which is adapted to be transferred from one terminal 3684 to another terminal 3686. Once transferred, the armature 3682 is retained in the last position to which it was transferred by means of a biasing magnet 3688. When the −terminal 3662 is high, then 3660 being low, the armature 3682 is actuated to the position illustrated in the drawings. On the other hand, when the + terminal 3660 is high and the − terminal 3662 is low, the relay is actuated to the opposite position, wherein the armature 3682 is in contact with the terminal 3686. This transfers the connection of input terminal 3680 from terminal 3690 to terminal 3692 in response to switching the armature from terminal 3662 to terminal 3660 respectively. The remaining relay circuits 3652 to 3658 are identical in operation.

Referring now to FIG. 38 (PCB 1800) there is illustrated a typical alternating current output circuit which includes the necessary logic to interface the control system with the system to be controlled and an inhibit circuit to inhibit the operation of the output. The alternating current output circuit 3900 is adapted to be utilized in conjunction with the circuit to be described in conjunction with FIG. 43, the symbol for the circuit being illustrated at 3902. The circuit is utilized to sense a direct current input signal and control an alternating current switch associated with the output circuit to control the flowing of alternating current in the output circuit.

Specifically, the circuit 3900 includes a direct current input terminal 3904 which is adapted to receive a low signal when the circuit is to be actuated. This low signal is inverted by means of an inverter gas 3906 to provide a high signal at the output terminal thereof. This high signal is fed to the input circuit of a nand gate, 3908, the nand gate also including an inhibit input signal on conductor 3910. The inhibit signal is normally high and, when the signal from gate 3906 is also high, a low output signal will be provided at the output terminal at the gate 3908.

This low signal is utilized to control the conductive condition of a PNP transistor 3912, the gate 3908 being associated with the base circuit thereof. The emitter-collector circuit of transistor 3912 is connected between a source of positive potential at input terminal 3914 and ground at terminal 3916 through a pair of voltage divider resistors 3918, 3920. The necessary bias for the emitter-base circuit is provided by means of a resistor 3924, the gate 3908 also being connected to the base electrode by means of a resistor 3926.

Thus, when the output signal at gate 3908 goes low, the emitter-base circuit of transistor 3912 is forward biased to switch the transistor 3912 to the conductive state and permit main current flow through the emitter-collector circuit thereof and thus through resistors 3918, 3920.

Current flowing in the resistors 3918, 3920 controls the conduction of a NPN transistor 3930, the collector-emitter circuit thereof being connected in series with the coil of a relay assembly 3932. Thus, the conductive and nonconductive conditon of transistor 3930 controls the energization of the relay 3932. When the transistor 3912 conducts, the transistor 3930 also conducts to energize the relay 3932 thus closing the contacts thereof. A diode 3936 is provided to absorb inductive kickback when the coil of the relay 3932 is deenergized.

The closure of the switch portion of the relay circuit 3932 closes the gate circuit of a silicon controlled switch 3938, for example a triac, to permit alternating current to flow between a pair of terminals 3940, 3942. Thus, a low input signal at terminal 3904 causes the gate circuit of the switch 3938 to be closed, thereby permitting alternating current energy to flow between terminal 3940, 3942. In this way a direct current signal is used to control an alternating current circuit.

Figure 39:
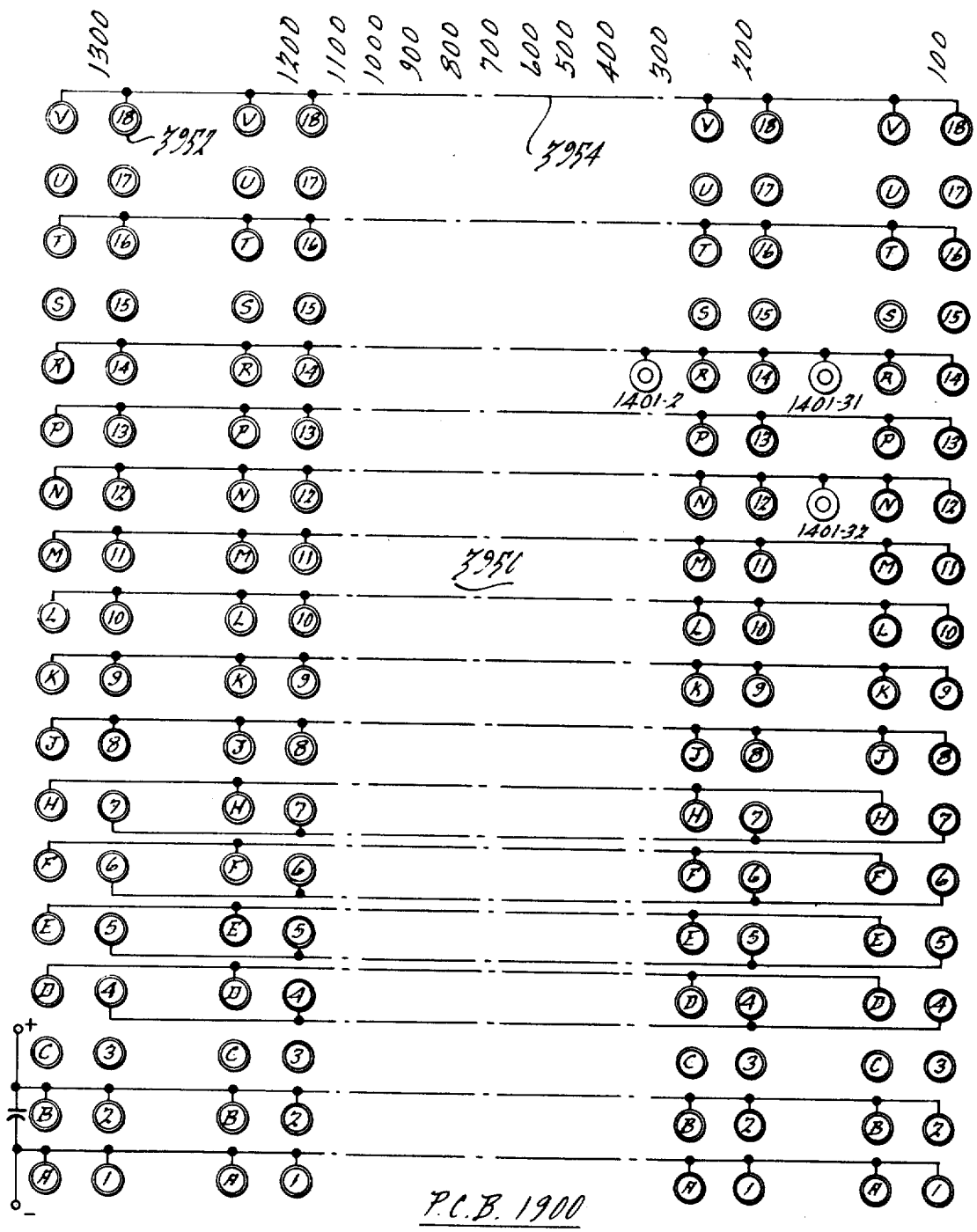
FIG. 39 is a schematic diagram illustrating the circuit details of the mother board.

Referring to FIG. 39, there is illustrated a common mother board 3930 which is adapted to interconnect various portions of the logic circuitry described in conjunction with PCB 100 to PCB 1300 circuits. The mother board includes a plurality of edge connector terminals 3952 which are adapted to receive interconnecting surfaces for connection from various circuit boards of one subsystem to various circuit boards of other subsystems. The board connections are indicated at the upper edge of FIG. 39 and and are designated from PCB 100 up to and including PCB 1300. The jack assemblies include a common conductor 3954 and a conductor associated with the connector 3952 per se. Each of the connectors has either been designated with a letter or a numeral for identification purposes on each subsystem. The letters and numerals are adapted to be correlated with the designation 1900 and its associated letter or numeral to indicate the position of the connector in the mother board 3950. The mother board is used in the system of the present invention in a conventional manner.

Figure 40:
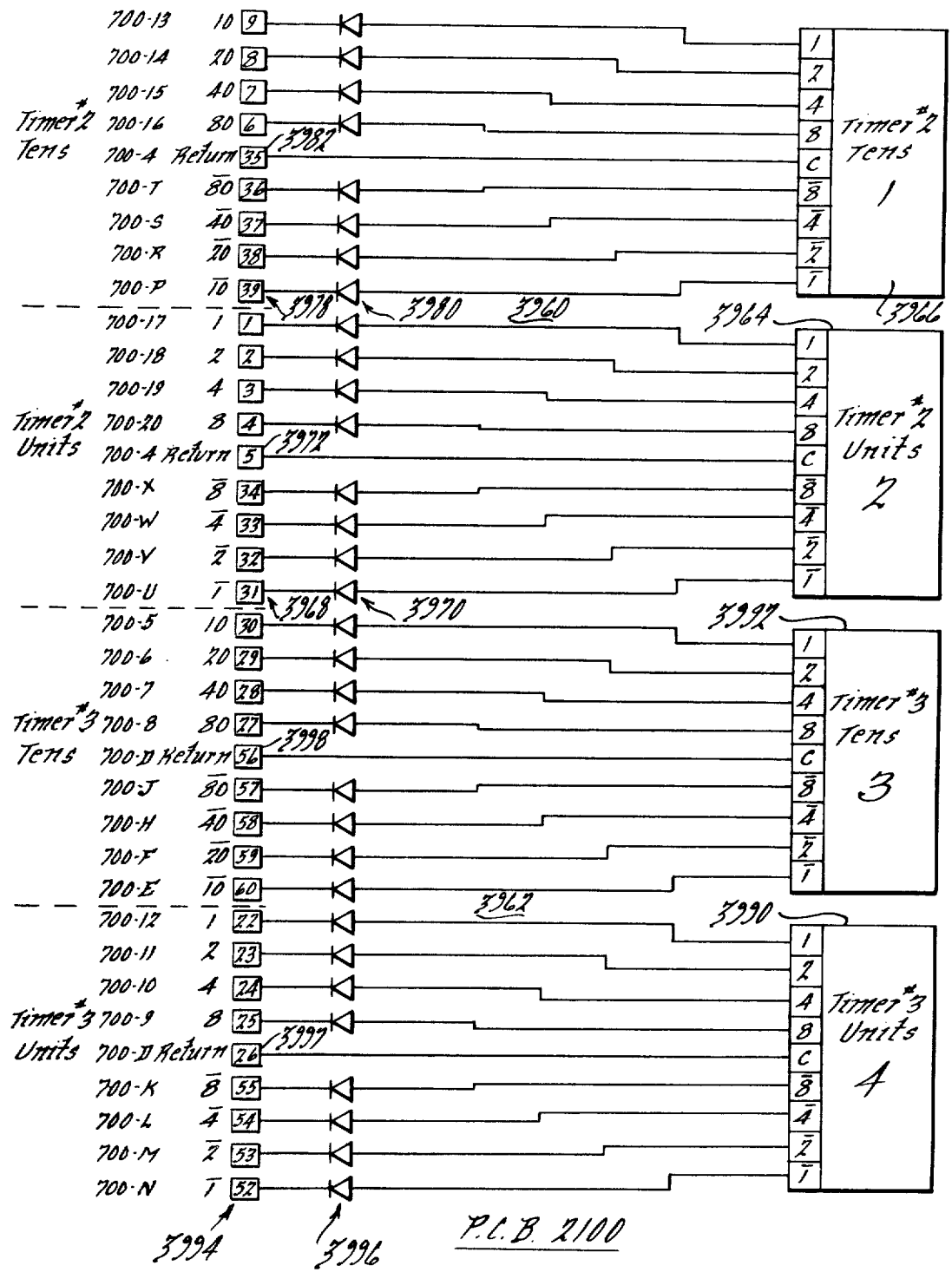
FIG. 40 is a schematic diagram illustrating the timer inner interface and wiring harness circuit including the units and tens binary coded decimal thumb wheel switch for timers 2 and 3.

Referring now to FIG. 40 there is illustrated the number two and number three timer thumbwheel circuits briefly described in conjunction with the description of PCB 700. Specifically, the number two timer includes a units thumb wheel switch assembly 3964 and a tens thumbwheel switch assembly 3966, the thumbwheel switches 3964 and 3966 being adapted to be preset to time a period from zero to 99 seconds. The thumbwheel switch includes a mechanical setting switch for both the units and the tens count and further includes the necessary switch contacts to make a comparison between the set count and the time being counted with the circuitry of PCB 700.

Referring particularly to the unit switch assembly 3964, the switch assembly includes means for making a comparison between the set time and the counted time, a plurality of input terminals 3968 which are interconnected with the binary coded decimal outputs of PCB 700 described above. The terminals 3968 include input signals on input terminals 1, 2, 3, and 4 corresponding to binary coded decimal bits 1, 2, 4 and 8 and also include signals corresponding to binary coded decimal bits $\bar{1}, \bar{2}, \bar{4}$ and $\bar{8}$ on terminals designated 31, 32, 33 and 34 respectively. These connections between PCB 700 and thumbwheel switch assembly 3964 are made through a plurality of isolation diodes 3970 to insure proper signal levels between the PCB 700 circuit and the timer unit 3964. Upon achieving a match in the timer unit between the set time and the counted time, an output signal is provided at an output terminal 3972. The signal level at output terminal 3972 indicates that a match has been achieved in the thumbwheel switch assembly 3964. This signal is fed back to PCB 700 at the return input thereof, this signal being used to indicate to the circuitry of PCB 700 that a match has been achieved.

The timer two tens switch assembly 3966 also includes associated input terminals 3978 corresponding to binary coded decimal bits 10, 20, 40, 80 and $\overline{10}, \overline{20}, \overline{40}$ and $\overline{80}$. As was the case with the unit switch assembly 3964, the connections between terminals 3978 and switch 3966 is made through isolation diodes 3980. As was the case above, when the timer achieves a tens match between the set time and the counted time, an output signal is provided on a return output terminal 3982. The signal level on terminal 3982 indicates that the tens switch has achieved the match, the indication being fed to PCB 700 circuit on the return conductor.

Referring to the timer three switch assembly, there is provided a unit switch assembly 3990 and a tens assembly 3992, these units being provided input signals on a plurality of input terminals 3994 through isolation diodes 3996. As was the case above. The timer three assembly is provided with bits corresponding to binary coded decimal bits 1, 2, 4 and 8 and $\overline{1}$, $\overline{2}$, $\overline{4}$ and $\overline{8}$, 10, 20, 40, 80 and $\overline{10}$, $\overline{20}$, $\overline{40}$ and $\overline{80}$. Also, returns for the units and tens counters are provided on output terminal 3997 and 3998 respectively.

Referring now to FIGS. 41 and 42, there is illustrated the read-out driver circuitry for providing a bar light read-out of the step number and the station addresses recorded in the station address registers of PCB 100 and 200 circuits. As the station address registers store the respective station addresses, an output indication of the stored address is fed to the circuitry of FIGS. 41 and 42 to energize a plurality of bar light indicators so that the operator may be aware of the particular station address at which the work carrier unit is positioned.

Referring particularly to FIG. 41, a plurality of station address input signals are provided from the PCB 200 circuit corresponding to binary coded decimal bits 1, 2, 4 and 8 on input terminals 4000, 4002, 4004, 4006 respectively and the binary coded decimal bits 10, 20 and 40 are provided on input terminals 4008, 4010 and 4012. These input signals are fed to a units binary coded decimal to light code converter 4014 in the case of the units and converter 4016 in the case of the tens. The output of the converter unit 4014 is fed through a plurality of driver circuits 4020 which provide the necessary driving current for the output indicator bar light units 4022.

The units 4022 are conventional light box units having a plurality of seven bars which may be used to indicate numbers from zero to nine. Similarly, the output of the tens converter circuit 4016 is fed through a plurality of driver transistors 4026 to provide the necessary current to drive the tens bar light assembly 4028. Thus, an indication in the form of bar light numerals is provided for the station address registers of PCB 200. A lamp test circuit has been provided wherein the operator may press a manual switch to provide an input signal at an input terminal 4030 to energize all of the bars at output assemblies 4022, 4028. The signal level at input terminal 4030 is fed to the input circuit of converters 4014 and 4016 to energize all of the bars as is conventional in the art. Also, a five volt power supply circuit 4036 is provided which includes a transistor 4038 to produce an output signal on an output conductor 4040 to power all of the converter circuits 4014, 4016 and the bar light indicator assemblies 4022, 4028.

FIG. 42 illustrates the bar light circuit adapted to be associated with PCB 100 circuit wherein binary coded decimal input signals corresponding to bits 1, 2, 4 and 8 are provided on input terminal 4042 and are fed through two sets of inverting gates 4044, 4046 to provide input signals to a units converter circuits 4048. The output of the units converter circuit is fed through a plurality of driver transistors 4050 to provide the necessary driving current to energize a units bar light indicator assembly 4052.

Similarly, the tens input signals are provided at a set of input terminals 4056 corresponding to binary coded decimal bits 10, 20, 40 and 80, these signals being fed to the tens converter circuit 4058 by means of two sets of inverter gates 4060, 4062. As was the case above, the output of the converter circuit is fed to the tens bar light indicator assembly 4066 through a plurality of driver transistors 4068. Each of the emitter circuits of all of the transistors 4020, 4026 of FIG. 41 and 4050 and 4068 of FIG. 2 are connected together to a common ground conductor 4070 to provide the return path for the collector-emitter circuit of the various transistors. Also, each of the station address display units 4022, 4028 and step number display units 4066, 4052 are provided a common connection by means of a common conductor 4074. Further, the 100 and 200 connection is made from input terminals 4078, 4080 respectively through a pair of driver transistors 4082, 4086 to the tens step number unit 4066. The step number light indicator assembly 4066 includes two small lamps as a part of the assembly which are used in the circuit of the present invention to provide an indication when the 100, 200 or 300 count is being made. In the case of the 100 count, a signal is provided at input terminal 4078 to light one of the lamps in unit 4066. In the case of the 200 indication, a signal at input terminal 4080 will illuminate the other lamp. A 300 indication may be provided by illuminating both lamps.

Figure 43:
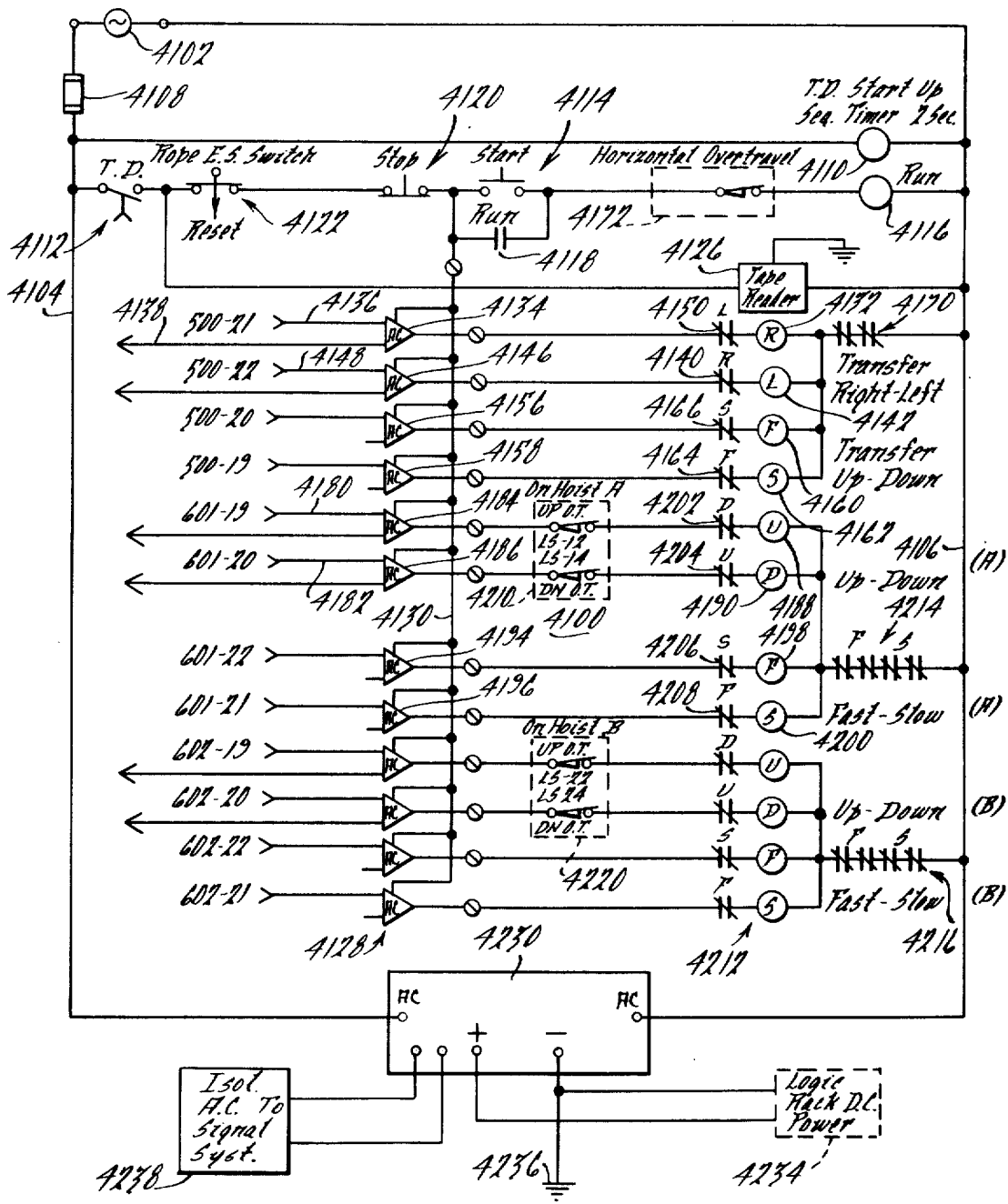
FIG. 43 is a schematic diagram illustrating the output circuitry connected to the control contactors and relays, the input to the output circuitry being provided from the figures described above.

Referring now to FIG. 43, there is illustrated a control circuit 4100 which utilizes the signals generated in PCB 500 and PCB 600 circuits to control the various operations of the work carrier both in the transfer mode and the lift modes of operation. The circuit also includes a power supply for the logic system and various devices for protecting the operation of the system.

Particularly, the control circuit 4100 is fed from a source of alternating current potential at 4102. The alternating current potential is fed to two main conductors 4104, 4106 through a suitable fuse 4108. When the power is initially turned on, the alternating current is delayed for a preselected period of time by a time delay sequence timer circuit 4110 which delays the application of alternating current power to the system for two seconds to permit the direct current energy to come up to full power and permit stabilization of the logic circuits. Upon lapse of the two second delay, a main switch 4112 is closed to provide power through a start button 4114, which is initially energized by the operator to start operation of the machine, to a run relay which has been heretofore referred to as the CRS relay 4116. Upon energization of the CRS run relay, a pair of normally open contacts 4118 are closed to maintain the power supply to the run relay after the start switch 4114 has been released. A stop button 4120 has been provided to permit the operator to stop the system by merely pressing a button. Also, an emergency switch 4122 is provided, the switch 4112 being actuated from a rope or cable strung around the periphery of the machine. Thus, an emergency stop button may be actuated to shut down the machine from any point around the periphery of the machine.

Upon closure of the main time delayed switch 4112, energy is fed to the tape reader circuit, illustrated as block 4126, the tape reader circuit being connected between conductors 4104 and 4106 through the delay switch 4112.

As noted above in connection with the description of the logic control circuits, certain control signals are generated to actuate or energize the motor contactor coils for the right, left, fast and slow operations of both the transfer and the left motors. These control signals are fed to the input circuit of a plurality of alternating current output circuits 4128, the circuits 4128 utilizing the control signal being fed at the input circuit thereof to control the flow of alternating current from the source of energy at 4102 through the switch 4112, the emergency switch 4122, the stop switch 4120 and a conductor 4130 to the other side of the alternating source at conductor 4106.

Referring particularly to the individual circuits, a right motor contactor coil 4132 is controlled by an alternating current circuit 4134 in response to an input signal fed to an input conductor 4136 from PCB 500. Also, the control signal at conductor 4136 provides an output energizing current on an output conductor 4138 to energize certain panel indicator lights. These output conductors 4138 are provided for several of the circuits to be described as is seen in the drawings.

The energization of the coil 4132 causes a set of normally closed contactors 4140 to be opened to deenergize a left motor contactor coil 4142 thereby precluding energizing current from being fed to the left motor contactor coil in the event that the corresponding left alternating current circuit 4146 is energized by an input signal at the input conductor 4148. Similarly, if a left motor signal command is provided at input conductor 4148 to energize the motor contactor coil 4142, a set of normally closed left contactors 4150 are opened to preclude the energization of the right coil 4132. The alternating current circuits 4128 are identical to those described in conjunction with FIG. 38 the symbol for the circuit in FIG. 38 being duplicated in this figure.

The fast and slow control of the transfer motor is provided by a pair of alternating current circuits 4156, 4158 which are utilized to control fast and slow motor contactor coils 4160, 4162. As was the case above, the fast motor contactor coil opens a normally closed set of contacts 4164 in circuit with the slow motor contactor coil and a slow motor contactor coil opens a pair of normally closed contacts 4166 in series with the fast motor contactor coil.

The circuit for the right, left, fast and slow motor contactor coils includes a pair of normally closed overload contactors 4170 which are utilized to sense certain overload conditions in the motor such as excessive heat, etc. The opening of either of these contactors deenergizes all of the motor contactor coils in the transfer circuit. Also, a horizontal overtravel switch 4172 is provided to sense when the carriage exceeds the limits of travel designed into the system. When the horizontal overtravel contacts are open due to an overtravel condition, the run relay 4116 is deenergized to disable the control system.

Referring now to the lift control, the lift is provided up and down commands at input conductors 4180, 4182 which controls the operation of alternating current circuits 4184, 4186. When either an up or down control signal is generated, the up or down motor contactor coil 4188, 4190 respectively is energized, thus causing the lift motor to move in the up or down direction. The speed of the motor is determined by the energization of either the fast or slow alternating current circuit 4194, 4196 which energizes either the fast or the slow motor contactors 4198, 4200. Again, normally closed contactors 4202, 4204, 4206 and 4208 are controlled in response to the energization of selected motor contactor coils 4190, 4188, 4200 and 4198, respectively.

The overtravel of the hoist in either the up or down direction is sensed by a limit switch circuit 4210 which disables either the up or down motor contactor coil 4188, 4190 in response to the overtravelling of the hoist in the up or down direction. If a second hoist is provided, a second plurality of up, down, fast and slow motor contactor coils 4212 are provided which operate in a manner identically to that described in conjunction with the first set. Fast, slow and up, down overload contactors have also been provided as was the case with contactors 4170.

These normally closed contractors 4214, 4216 sense overload conditions in the A lift or B lift motor circuit, the sensing of the overload conditions disabling the particular A lift or B lift circuit. Also, an overtravel limit switch circuit 4220 has been provided to sense when the B lift has reached an overtravel position and trip the respective limit switch in either the up or down direction of travel.

The lower portion of the system of FIG. 43 includes a power supply circuit 4230 which is a combination power pack having an alternating current input and a direct current output plus a battery and an alternating current output system which provides an isolated alternating current power to the signaling system. Specifically, the power supply circuit 4230 is connected between conductors 4104 and 4106 to be supplied unfiltered alternating current power therefrom. The power supply circuit 4230 provides direct current power to the logic rack which has been indicated in dotted lines at 4234. The negative terminal of the direct current power supply is grounded at 4236. Also, an alternating current supply is provided to the signalling system, the alternating current supply being isolated from the supply at 4102 by means of an isolation transformer. This isolated supply is indicated to be fed to the signalling system at 4238.

Referring now to FIG. 44, there is illustrated the system for generating certain control signals for use by the logic described above, the control signals being generated in response to actuation of certain switches. Specifically, the circuit 4240 is fed from a source of alternating current potential at input conductor 4244 and a second source of higher voltage alternating current potential at input conductor 4246.

Referring to the upper portion of the circuit, when the CRS relay is closed, the CRS relay being described in conjunction with relay 4116 of FIG. 43, a normally open contact 4248 is closed and a normally closed contact 4250 is opened. Finally, a normally opened contact 4252 is closed, the contacts 4250, 4252 being connected to the 12 volt source of alternating current potential at conductor 4244 and the contact 4248 being interconnected with the 125 volt alternating current potential at conductor 4246. When the CRS or run relay is energized, the contacts 4248 are closed to provide an output signal at an output conductor 4254 associated with an alternating current to direct current converter circuit 4256 described in conjunction with FIG. 35, through a neon monitor light circuit 4258 to be described below. The closure of conductor 4252 energizes the start bulb 4259 for automatic and semi-automatic operation and the opening of contact 4250 deenergizes the stop lamp 4260.

Referring to the automatic and semi-automatic alternate action modes, a switch assembly 4264 has been provided which includes a pair of armatures 4266, 4268 which are adapted to be moved between two positions, the automatic position illustrated wherein the armature 4266 provides energy from the alternating current source at conductor 4246 through a conductor 4270. Armature 4268 provides 12 volt alternating current energy to an automatic lamp circuit including a conductor 4272 and the lamp 4274. When the operator moves the switch to semi-automatic, the armature 4266 is disconnected from the connector 4270 and the armature 4268 is disconnected from the conductor 4272 and placed in position to energize a conductor 4276. When the conductor 4276 is energized, a semi-automatic lamp 4278 is illuminated, as is a home tape lamp 4280, the home tape lamp being positioned below the home tape button to illuminate the home tape button for the operator, this button being used in the semiautomatic mode of operation. The depression of the button closes a normally open switch 4286 to energize a home tape circuit 4288 which includes an alternating current to direct current converter circuit 4290 and a neon lamp circuit 4292.

When the switch armature 4266 is in position to energize the conductor 4270, an automatic alternating current to direct current converter circuit 4294 is energized to provide an indication of the automatic status of the assembly. This circuit is connected to the conductor 4270 through a neon lamp circuit 4296.

Referring now to the continuous or single action alternate mode, a switch assembly 4300 has been provided which is utilized to control the energization of a continuous-single action alternating current to direct current converter circuit 4302 which provides an output signal to the logic, and particularly the PCB 100 circuit, through a neon light circuit 4305. The converter circuit 4302 is fed alternating current energy from the conductor 4246 through the switch assembly 4300. The switch assembly includes a ganged pair of armatures 4304, 4306, the armature 4304 being illustrated in the continuous mode wherein the armature is in contact with a normally open contact 4308. When the switch is changed to the single action mode, the armature 4304 is moved upwardly to energize a conductor 4310, thus energizing the circuit 4302. Also, the switch 4306 is shown in the continuous mode wherein 12 volt energy is fed from conductor 4244 to a "continuous" lamp 4312 through the armature 4306. When the switch assembly 4300 is changed to the single mode of operation, the switch armature 4306 is moved up to energize a single action lamp 4314 through a conductor 4316 and a step tape lamp 4318 is energized from the same conductor 4316 through a conductor 4320.

The step tape lamp 4318 is positioned below a step tape button 4322 which is mounted on the panel. The step tape button 4322 supplies alternating current energy to an alternating current to direct current converter circuit 4326 through a neon lamp circuit 4328.

The neon lamp circuit is illustrated in detail in connection with the circuit 4328, this neon lamp circuit being that described in conjunction with circuits 4258, 4296, 4292 and 4305. Particularly, the circuit includes a dropping resistor 4340, a current limit resistor 4332 and a neon lamp 4334. The resistor 4340 provides the necessary voltage drop to energize lamp 4334 and the resistor 4332 limits the current therethrough.

Referring now to the up, down, right and left functions of the assembly, a pair of joy-stick type of switch assemblies 4340, 4342 have been provided, the switch 4340 being mounted directly on the hoist for movement therewith and the switch 4342 being panel mounted for use by the operator at the panel. The switches 4340, 4342 are adapted to actuate a plurality of neon tube circuits and alternating current to direct current converter circuits such as those described above in connection with neon tube circuit 4328 and converter circuit 4326, these latter circuits being illustrated as dotted lines 4344, 4346, 4348 and 4350.

Referring particularly to the up circuit, a panel mounted up switch, including an armature 4352, may be closed to provide manual operation of the up circuit to provide an output signal at the output circuit 4344 from the alternating current signal present at conductor 4246. The hoist mounted switch assembly 4340 also includes an up armature 4354 which is connected in parallel with the switch armature 4352 to provide the same up signal. Similarly, a pair of down armatures 4356, 4358 are connected in parallel to provide panel mounted and hoist mounted control of the down mode respectively. The panel mounted right and left functions are provided by switch armatures 4360, 4362, respectively, and the hoist mounted functions are provided by right and left armatures 4364, 4366 respectively. When either right switch 4360, 4364 is closed, an output signal will be provided to the circuit 4348. On the other hand, when the left signal is desired, either switch 4362 or 4366 is actuated to provide an output signal at circuit 4350. It is to be noted that the use of a joy-stick type of switch provides a mechanical interlock such that only one signal may be given at any instant of time.

Referring to the stop next stop function, a panel mounted stop next stop button 4370 is provided, this switch being connected in parallel with a hoist mounted stop next button 4374, these switches 4370, 4374 providing an output signal at a circuit 4376, the circuit 4376 being identical to the circuits 4344 to 4350. When the system is in the semi-automatic mode of operation, the switch armature 4268 is used to energize a conductor 4276. The energization of the conductor 4276 feeds alternating current energy to a conductor 4380, a conductor 4382 to provide energy to a stop next lamp 4384. The stop next lamp 4384 is mounted below the stop next switch 4370 to illuminate the switch button during the time that the system is in the semi-automatic mode of operation.

Further, a reset button 4386 is provided to permit the operator to reset the timer and interlock circuits described in conjunction with the PCB 700 and PCB 900 circuits. The closure of the switch 4386 provides an alternating current signal to a pair of output circuits 4390, 4392, the circuits 4390, 4392 being identical to the circuit 4376. Thus, a reset signal is provided to the PCB 700 and PCB 900 circuits.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a control system for an electrochemical workpiece processing apparatus and including programming means, having a tape reader, wherein the workpiece is sequenced between or among a plurality of work stations in response to commands generated by the programming means with each of the work stations having a preselected address and with at least one of the work stations having a plurality of positions and with that one of the work stations having a preselected main address, with each of the plurality of positions having a separate subaddress, said system comprising: binary coded decimal address storage means for storing the main address and having a predetermined plurality of possible subaddresses sequentially derived from the main address, storage circuit means for storing information as to which of said predetermined subaddresses are used, and which subaddresses are not used and being selectively settable as to which are to be used or not, and means connected to said storage means for incrementing said storage means in response to an indication of whether a subaddress has been selectively set to be used or not used, including a binary coded decimal-to-decimal converter circuit having a digital output circuit for at least some digits between 0 and N, N being an integer, with each said subaddress having a corresponding digit in said digital output circuit, output gate means having an input circuit adapted to be connected to each said digital output circuit, and circuit means interconnecting said digital output circuit to said input circuit of said output gate means in response to said indication of whether a digit, and hence a corresponding subaddress, was selectively set to be used or not used, and pulse circuit means for providing incrementing pulses to said storage means sequentially through each of said predetermined subaddresses, said gate means enabling said pulsing means when a digit and hence a corresponding subaddress is not used and disabling said pulse means when a digit and hence a corresponding subaddress is used.

2. The control system of claim 105 with said programming means including a programmed tape whereby the workpiece is sequenced through a first plurality of work stations in response to commands generated by the programming means as programmed on said tape, alternate cycle means for providing an alternate cycle sequence in addition to and a different order from that as set forth on said tape for said first plurality of work stations for the work piece including designating indicia means formed on said programming means and hence on said tape for designating interruption of processing as per said tape and processing in accordance with said alternate cycle and indicating completion of said alternate cycle and reinitiation of processing in accordance with the program on said main tape, and control circuit means responsive to said designating means to control said work piece in accordance with said alternate cycle.

3. The improvement of claim 2 wherein said control circuit means includes gate means to decode said designating means.

4. The improvement of claim 3 wherein said control circuit means further includes bistable circuit means having first and second stable states, said state being selected by said designating means.

5. The improvement of claim 4 further including means for decoding instruction designating characters, said instruction designating characters setting off said alternate cycle.

6. The improvement of claim 3 wherein said alternate cycle program energizes said control circuit means, said control circuit means being deenergized during the sequencing via the commands on said programmed tape.

7. The system of claim 1 wherein said incrementing means includes an and-function gate circuit, said and-function gate including said input from said converter circuit.

8. The system of claim 7, wherein said and-function gate is enabled by said converter circuit as a function of whether a digit is not used.

9. The system of claim 8 wherein said and-function gate includes an input from said pulse circuit means.

10. The system of claim 9 wherein said binary coded decimal-to-decimal converter circuit output is connected to the input circuit of said output gate means by removable pins.

* * * * *

UNITED STATES PATENT AND TRADEMARK OFFICE
CERTIFICATE OF CORRECTION

PATENT NO. : 4,005,349
DATED : January 25, 1977
INVENTOR(S) : Michael A. Brian

It is certified that error appears in the above-identified patent and that said Letters Patent are hereby corrected as shown below:

In the references cited, insert --3,402,836  9/1968  Debrey et al
    214-16.4--.
In the references cited, insert --3,812,474  5/1974  Linn et al
    340/172.5--.
Column 1, line 42, after "transfer" insert --of--.
Columns 1 and 2, Chart line 3, delete ": Read Flag Switches & Reset
    Block Ctr." and substitute therefor --!  Read Flag Switches
    & Reset Block Ctr.--.
Columns 1 and 2, Chart line 5, first column, below " " " and above "$"
    insert --#--.
Columns 3 and 4, Chart line 20, delete "0 Tape Home" and substitute
    therefor --@ Tape Home--.

Column 16, approximately line 41, Chart, delete "17 L05 45 R3"
    and substitute therefor --17 L05 45 R3*#--.
Column 19, line 18, before "code" insert --@--.
Column 19, line 22, after "an" insert --@--.
Column 21, line 3, delete "input" and substitute therefor --inputs--.
Column 21, line 35, delete "signal" and substitute therefor --single--.
Column 25, line 24, delete "10" and substitute therefor --$\overline{10}$--
Column 25, line 29, delete "823" and substitute therefor --828--.
Column 25, line 54, delete "responde" and substitute therefor --response--.
Column 27, line 34, after "inverter" insert --circuit--.
Column 28, line 36, after "address" insert --bit--.
Column 30, line 17, delete "1083" and substitute therefor --1088--.
Column 31, line 15, after "the" insert --#--.
Column 32, line 16, delete "number" and substitute therefor --#--.
Column 32, line 43 and 44, delete "ccircuit" and substitute therefor
    --circuit--.

UNITED STATES PATENT AND TRADEMARK OFFICE
CERTIFICATE OF CORRECTION

PATENT NO. : 4,005,349
DATED : January 25, 1977
INVENTOR(S) : Michael A. Brian

It is certified that error appears in the above-identified patent and that said Letters Patent are hereby corrected as shown below:

Column 32, line 50, delete "in" first occurrence and substitute therefor --is--.
Column 32, line 67, delete "1303" and substitute therefor --1308--.
Column 34, line 38, after "input" insert --circuit--.
Column 35, line 60, after "and" insert --#--.
Column 37, line 13, after "the" insert --#--.
Column 37, line 37, delete "532" and substitute therefor --1532--.
Column 37, line 42, after "the" insert --#--.
Column 38, line 16, delete "1532" and substitute therefor --1582--.
Column 38, line 27, delete "a" and substitute therefor --an--.
Column 42, line 24, delete "aterminal" and substitute therefor --terminal--.
Column 43, line 31, delete "addressd" and substitute therefor --addressed--
Column 44, line 27, delete "imput" and substitute therefor --input--.
Column 45, line 48, delete "seer" and substitute therefor --seen--.
Column 48, lines 10 and 11, delete "Thus, the up and down circuits operate down output terminal 2032."
Column 49, line 31, delete "gat" and substitute therefor --gate--.
Column 49, line 55, after "continue" insert --its--.
Column 52, line 21, delete "singal" and substitute therefor --single--.
Column 53, line 5, after "high" insert --thereby--.
Column 53, line 27, after "this" insert --high--.
Column 53, line 48, delete "." and substitute therefor --,--.
Column 54, line 33, after "the" insert --input--.
Column 55, line 3, delete "the" second occurrence and substitute therefor --this--.
Column 55, line 65, delete "the" first occurrence and substitute therefor --be--.

UNITED STATES PATENT AND TRADEMARK OFFICE
CERTIFICATE OF CORRECTION

PATENT NO. : 4,005,349
DATED : January 25, 1977
INVENTOR(S) : Michael A. Brian

It is certified that error appears in the above-identified patent and that said Letters Patent are hereby corrected as shown below:

Column 60, line 6, delete "Thus" and substitute therefor --This--.
Column 64, line 26, delete "signal" and substitute therefor --single--.
Column 65, line 11, delete "2972" and substitute therefor --3972--.
Column 65, line 37, delete "terminals" and substitute therefor --terminal--.
Column 66, line 47, after "54" and before "reset" insert --.--.
Column 66, line 64, delete "electromechanical" and substitute therefor --electrochemical--.
Column 67, line 4, delete "The" and substitute therefor --This--.
Column 67, line 13, delete "th" and substitute therefor --the--.
Column 67, line 13, delete "[,],".
Column 67, line 23, delete "]" and substitute therefor --!--.
Column 67, line 42, delete "[" and substitute therefor --!--.
Column 67, line 60, delete "]" and substitute therefor --[--.
Column 68, line 59, delete "tims" and substitute therefor --times--.
Column 70, line 30, delete "11/N" and substitute therefor --H/N--.
Column 72, line 43, delete "tbe" and substitute therefor --the--.
Column 72, line 62, delete "the" third occurrence and substitute therefor --this--.
Column 72, line 68, delete ". The" and substitute therefor --, the--.
Column 74, line 46, delete "4112" and substitute therefor --4122--.

UNITED STATES PATENT AND TRADEMARK OFFICE
CERTIFICATE OF CORRECTION

PATENT NO. : 4,005,349
DATED : January 25, 1977
INVENTOR(S) : Michael A. Brian

It is certified that error appears in the above-identified patent and that said Letters Patent are hereby corrected as shown below:

The following notations should all be listed within quotes:

Column 42, line 33, "on any station"
Column 43, line 17, "on any station" and "on auxiliary stop"
Column 43, line 18, "on standard stop"
Column 45, line 22, "on standard stop"
Column 45, line 24 and 25 "on specified station"
Column 45, line 41, "on specified station"
Column 45, line 44, "on specified station"
Column 46, line 20 and 21, "on specified station signal"
Column 46, line 21 and 22, "on auxiliary stop"
Column 46, line 41, "slow only"
Column 46, line 47, "slow only"
Column 46, line 54, "reset slow only"
Column 47, line 54, "hoist is up"
Column 48, line 16, "down speed change"
Column 48, line 18, "up speed change"
Column 48, line 21, "down speed change"
Column 48, line 42, "hoist is down"
Column 49, line 10, "on standard stop"
Column 49, line 11, "on auxiliary stop"
Column 49, line 15, "stop at the next intermediate stop"
Column 49, line 24, "down speed change"
Column 49, line 48, "down speed change"
Column 49, line 55, "up speed change"
Column 49, line 66, "hoist is up"
Column 50, line 6 and 7, "stop next intermediate stop"
Column 50, line 10 and 11, "stop next intermediate stop"
Column 50, line 37, "stop next intermediate stop"

UNITED STATES PATENT AND TRADEMARK OFFICE
CERTIFICATE OF CORRECTION

PATENT NO. : 4,005,349
DATED : January 25, 1977
INVENTOR(S) : Michael A. Brian

It is certified that error appears in the above-identified patent and that said Letters Patent are hereby corrected as shown below:

Column 50, line 44 and 45, "stop at the next intermediate stop"
Column 50, line 61 and 62 "on lower intermediate stop"
Column 51, line 44, "on standard stop"
Column 51, line 45, "on auxiliary stop"
Column 51, line 58, "not transferring"
Column 51, line 68, "automatic on"
Column 52, line 16, "tape reader stopped"
Column 52, line 24, "not lifting"
Column 52, line 33, "slow only"
Column 52, line 34, "hoist is down"
Column 52, line 35, "hoist is up"
Column 52, line 36, "down speed change"
Column 52, line 37, "up speed change"
Column 52, line 38, "not transferring input"
Column 52, line 39, "on specified station"
Column 52, line 40 and 41, "on standard stop"
Column 53, line 1, "on standard stop"
Column 53, line 12, "down speed change"
Column 53, line 27, "run-stop"
Column 53, line 43, "down speed change"
Column 53, line 57 and 58, "up speed change"
Column 54, line 1 and 2, "hoist is up"
Column 54, line 17, "lifts OK automatic"
Column 54, line 59, "on upper intermediate stop speed change"
Column 55, line 1 and 2, "on upper intermediate stop"
Column 55, line 11, "on upper intermediate stop"
Column 55, line 17, "lifts OK automatic"

UNITED STATES PATENT AND TRADEMARK OFFICE
CERTIFICATE OF CORRECTION

PATENT NO. : 4,005,349
DATED : January 25, 1977
INVENTOR(S) : Michael A. Brian

It is certified that error appears in the above-identified patent and that said Letters Patent are hereby corrected as shown below:

Column 55, line 25 and 26, "reset slow only"
Column 55, line 38 and 39, "on the upper intermediate stop speed change"
Column 55, line 67 and 68, "inhibit (this lift)"
Column 57, line 12 and 13, "all complete"
Column 57, line 53, "all complete"
Column 57, line 63, "inhibit to add register"
Column 59, line 1, "all complete"
Column 59, line 3 and 4, "all complete"
Column 65, line 6, "& interlock active"
Column 65, line 10, "interlock I"
Column 69, line 9 and 10, "alternate cycle on"
Column 72, line 49, "return"
Column 72, line 63, "return"
Column 78, line 25, "stop next stop"
Column 78, line 27, "stop next"
Column 78, line 34 and 35, "stop next"
Column 78, line 35, "stop next"
Column 78, line 36, "stop next"

Signed and Sealed this

Twenty-seventh Day of June 1978

[SEAL]

Attest:

RUTH C. MASON
Attesting Officer

DONALD W. BANNER
Commissioner of Patents and Trademarks